(12) United States Patent
Klasen-Memmer et al.

(10) Patent No.: US 9,777,216 B2
(45) Date of Patent: Oct. 3, 2017

(54) LIQUID CRYSTALLINE MEDIUM

(75) Inventors: Melanie Klasen-Memmer, Heuchelheim (DE); Matthias Bremer, Darmstadt (DE); Konstantin Schneider, Huenstetten (DE)

(73) Assignee: MERCK PATENT GESELLSCHAFT MIT BESCHRANKTER HAFTUNG, Darmstadt (DE)

( * ) Notice: Subject to any disclaimer, the term of this patent is extended or adjusted under 35 U.S.C. 154(b) by 193 days.

(21) Appl. No.: 13/577,713

(22) PCT Filed: Jan. 31, 2011

(86) PCT No.: PCT/EP2011/000427
§ 371 (c)(1),
(2), (4) Date: Aug. 8, 2012

(87) PCT Pub. No.: WO2011/098224
PCT Pub. Date: Aug. 18, 2011

(65) Prior Publication Data
US 2012/0305843 A1   Dec. 6, 2012

(30) Foreign Application Priority Data
Feb. 9, 2010 (DE) .......................... 10 2010 007 426

(51) Int. Cl.
*G02F 1/1333* (2006.01)
*C09K 19/06* (2006.01)
*C09K 19/30* (2006.01)

(52) U.S. Cl.
CPC .......... *C09K 19/06* (2013.01); *C09K 19/3048* (2013.01)

(58) Field of Classification Search
CPC .. C09K 19/06; C09K 19/3048; C09K 19/062; G02F 1/1333
USPC .............. 252/299.01, 299.6, 299.61, 299.63, 252/299.66; 428/1.1; 349/182
See application file for complete search history.

(56) References Cited

U.S. PATENT DOCUMENTS

| 5,236,620 A | 8/1993 | Reiffenrath et al. |
|---|---|---|
| 6,366,330 B1* | 4/2002 | Khan et al. ............. 252/299.61 |
| 7,465,479 B2 | 12/2008 | Bremer et al. |
| 7,731,865 B2 | 6/2010 | Bernatz et al. |
| 7,767,280 B2 | 8/2010 | Klasen-Memmer et al. |
| 8,114,310 B2 | 2/2012 | Bernatz et al. |
| 2003/0160210 A1 | 8/2003 | Bremer et al. |
| 2008/0191167 A1 | 8/2008 | Klasen-Memmer et al. |
| 2009/0103011 A1 | 4/2009 | Bernatz et al. |
| 2009/0324853 A1 | 12/2009 | Bernatz et al. |
| 2010/0304049 A1 | 12/2010 | Bernatz et al. |
| 2012/0326084 A1* | 12/2012 | Klasen-Memmer et al. ........... 252/299.61 |

FOREIGN PATENT DOCUMENTS

| DE | 102 57 711 A1 | 7/2003 |
|---|---|---|
| JP | 2003261511 A | 9/2003 |
| JP | 2009102639 A | 5/2009 |
| WO | 2009030318 A1 | 3/2009 |

OTHER PUBLICATIONS

International Search Report, dated May 16, 2011, issued in corresponding PCT/EP2011/000427.
Kitagawa, H. et al., "Encapsulated-guest rotation in a self-assembled heterocapsule directed toward a supramolecular gyroscope," PNAS, 2009, vol. 106, No. 26.
Hoo et al. "Electro-optical properties of Liquid Crystals," Optics and Nonlinear Optics of Liquid Crystals, 1993, pp. 167-170.
English Translation of Office Action for related TW100104178 dated Oct. 20, 2014.

* cited by examiner

*Primary Examiner* — Geraldina Visconti
(74) *Attorney, Agent, or Firm* — Millen, White, Zelano and Branigan, P.C.

(57) ABSTRACT

The invention relates to a liquid-crystalline medium which comprises at least one compound of the formula I,

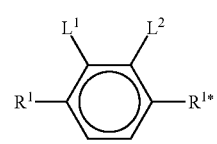

and to the use thereof for an active-matrix display, in particular based on the VA, PSA, PS-VA, PALC, FFS or IPS effect.

14 Claims, No Drawings

LIQUID CRYSTALLINE MEDIUM

The invention relates to a liquid-crystalline medium which comprises at least one compound of the formula I,

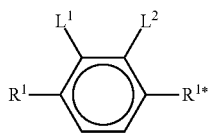

I in which
R$^1$ and R$^{1*}$ each, independently of one another, denote an alkyl or alkoxy radical having 1 to 15 C atoms, where, in addition, one or more CH$_2$ groups in these radicals may each be replaced, independently of one another, by —C≡C—, —CF$_2$O—, —CH═CH—,

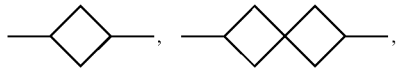

—O—, —CO—O—, —O—CO— in such a way that O atoms are not linked directly to one another, and in which, in addition, one or more H atoms may be replaced by halogen, and
L$^1$ and L$^2$ each, independently of one another, denote F, Cl, CF$_3$ or CHF$_2$.

Media of this type can be used, in particular, for electro-optical displays having active-matrix addressing based on the ECB effect and for IPS (in-plane switching) displays or FFS (fringe field switching) displays.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants K$_3$/K$_1$, high values for the optical anisotropy Δn and values for the dielectric anisotropy of Δ∈≤−0.5 in order to be suitable for use in high-information display elements based on the ECB effect. Electro-optical display elements based on the ECB effect have a homeotropic edge alignment (VA technology=vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (inplane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements.

Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electrooptical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORI-MACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

There thus continues to be a great demand for MLC displays having very high specific resistance at the same time as a large working-temperature range, short response times and a low threshold voltage with the aid of which various grey shades can be produced.

The disadvantage of the frequently-used MLC-TN displays is due to their comparatively low contrast, the relatively high viewing-angle dependence and the difficulty of generating grey shades in these displays.

VA displays have significantly better viewing-angle dependencies and are therefore principally used for televisions and monitors. However, there continues to be a need here to improve the response times, in particular with respect to the use of televisions having frame rates (image change frequency/repetition rates) of greater than 60 Hz. At the same time, however, the properties, such as, for example, the low-temperature stability, must not be impaired.

The invention is based on the object of providing liquid-crystal mixtures, in particular for monitor and TV applications, which are based on the ECB effect or on the IPS or FFS effect, which do not have the above-mentioned disadvantages or only do so to a reduced extent. In particular, it must be ensured for monitors and televisions that they also operate at extremely high and extremely low temperatures and at the same time have short response times and at the same time have improved reliability behaviour, in particular have no or significantly reduced image sticking after long operating times.

Surprisingly, it is possible to improve the rotational viscosities and thus the response times if polar compounds of the general formula I are used in liquid-crystal mixtures, in particular in LC mixtures having negative dielectric anisotropy, preferably for VA displays.

So-called monocyclic compounds (compounds having one ring) generally cannot be used in nematic liquid-crystal mixtures owing to their poor phase properties and low clearing points. However, the compounds of the formula I have, surprisingly, simultaneously very low rotational viscosities and high absolute values of the dielectric anisotropy. It is therefore possible to prepare liquid-crystal mixtures, preferably VA mixtures, which have short response times, at the same time good phase properties and good low-temperature behaviour.

The invention thus relates to a liquid-crystalline medium which comprises at least one compound of the formula I. The present invention likewise relates to compounds of the formula I.

The mixtures according to the invention preferably exhibit very broad nematic phase ranges having clearing points ≥70° C., preferably ≥75° C., in particular ≥80° C., very favourable values for the capacitive threshold, relatively high values for the holding ratio and at the same time very good low-temperature stabilities at −20° C. and −30° C., as well as very low rotational viscosities and short response times. The mixtures according to the invention are furthermore distinguished by the fact that, in addition to the improvement in the rotational viscosity $\gamma_1$, relatively high values of the elastic constant $K_{33}$ for improving the response times can be observed.

Some preferred embodiments of the mixtures according to the invention are indicated below.

In the compounds of the formula I, $R^1$ and $R^{1*}$ each, independently of one another, preferably denote straight-chain alkoxy, in particular $OC_2H_5$, $OC_3H_7$, $OC_4H_9$, $OC_5H_{11}$, $OC_6H_{13}$, furthermore alkenyloxy, in particular $OCH_2CH=CH_2$, $OCH_2CH=CHCH_3$, $OCH_2CH=CHC_2H_5$, furthermore alkyl, in particular $n-C_3H_7$, $n-C_4H_9$, $n-C_5H_{11}$, $n-C_6H_{13}$.

Preferred compounds of the formula I are the compounds of the formulae I-1 to I-10,

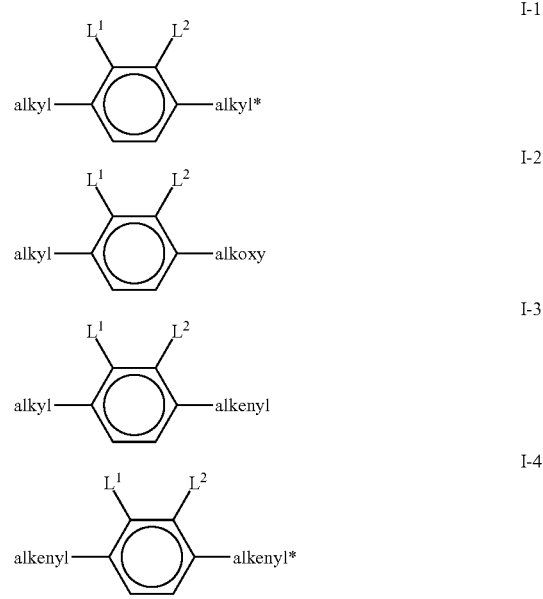

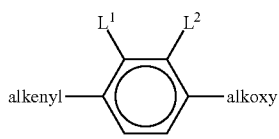
I-5

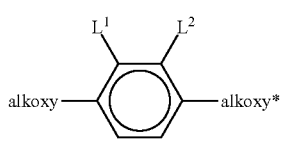
I-6

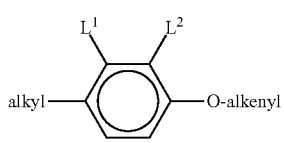
I-7

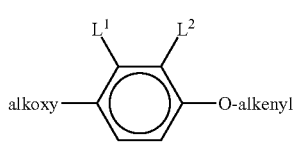
I-8

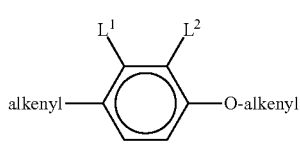
I-9

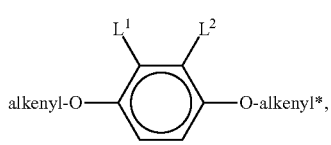
I-10 in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-8 C atoms, and $L^1$ and $L^2$ each, independently of one another, denote F or Cl.

In the compounds of the formulae I-1 to I-10, $L^1$ and $L^2$ each, independently of one another, preferably denote F or Cl, in particular F. Particular preference is given to the compounds of the formula I-6. In the formula I-6, preferably $L^1=L^2=F$.

The mixture according to the invention very particularly preferably comprises at least one compound of the formula I-6A or I-6B:

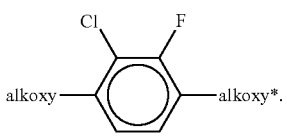
I-6A

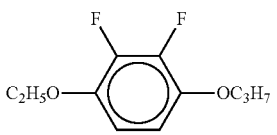
I-6B

The mixtures according to the invention very particularly preferably comprise at least one compound from the following group:

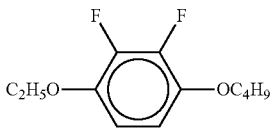
I-6A-1

I-6A-2

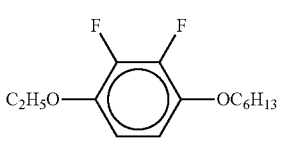
I-6A-3

$$\text{I-6A-4}$$
$C_2H_5O-\phantom{x}-OC_6H_{13}$ $$\text{I-6A-5}$$
$C_3H_7O-\phantom{x}-OC_3H_7$ $$\text{I-6A-6}$$
$C_3H_7O-\phantom{x}-OC_4H_9$ $$\text{I-6A-7}$$
$C_3H_7O-\phantom{x}-OC_5H_{11}$ $$\text{I-6A-8}$$
$C_3H_7O-\phantom{x}-OC_6H_{13}$ $$\text{I-6A-9}$$
$C_4H_9O-\phantom{x}-OC_4H_9$ -continued
I-6A-10 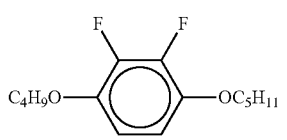
I-6A-11 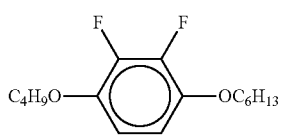
I-6A-12 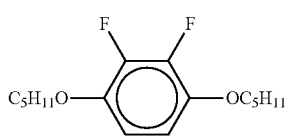
I-6A-13 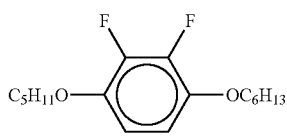
I-6A-14 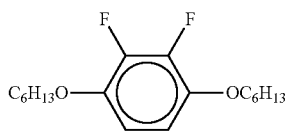
I-8A-1 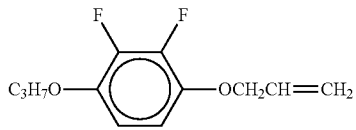
I-8A-2 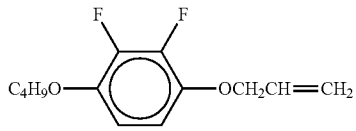
I-8A-3 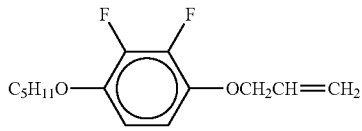
I-8A-4 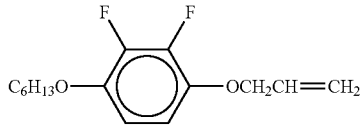
I-8A-5 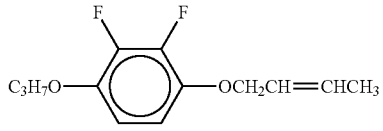
I-8A-6 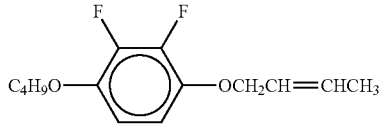
I-8A-7 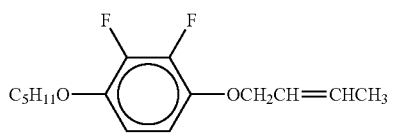
I-8A-8 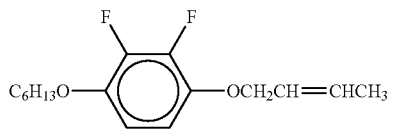
I-8A-9 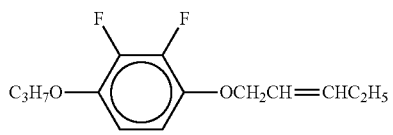
I-8A-10 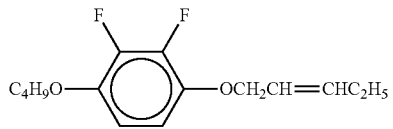
I-8A-11 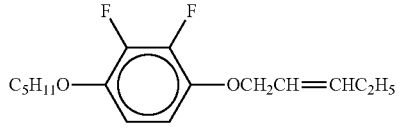
I-8A-12 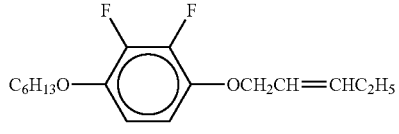
In the compounds of the formula I and the sub-formulae, $L^1$ and $L^2$ each, independently of one another, preferably denote F or Cl, in particular F. $R^1$ and $R^{1*}$ preferably both denote alkoxy.
The compounds of the formula I can be prepared, for example, as follows:
Scheme 1
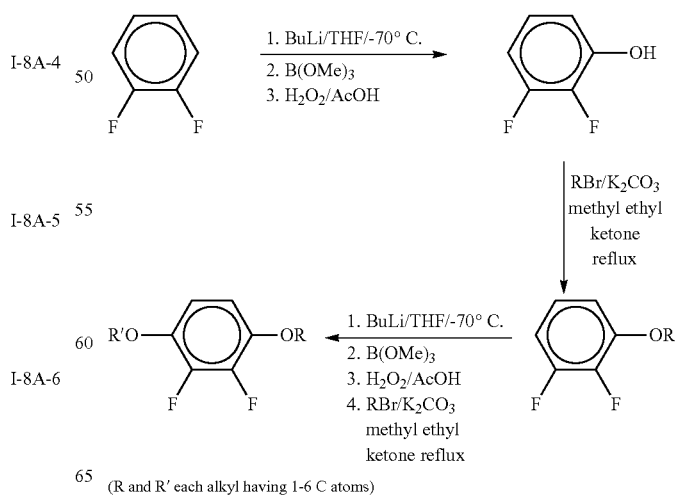
(R and R' each alkyl having 1-6 C atoms)

Scheme 2

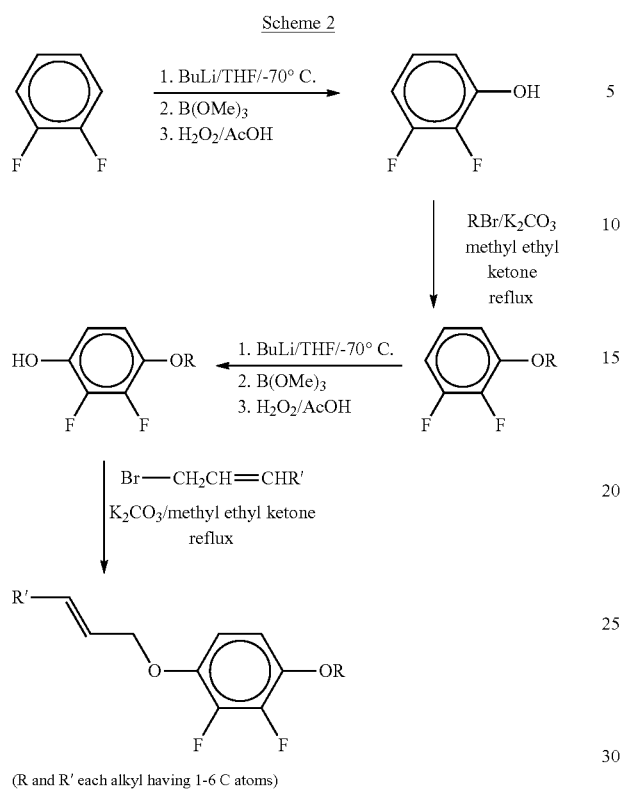

(R and R' each alkyl having 1-6 C atoms)

The present invention likewise relates to the compounds of the formulae I-6A-1 to I-6A-14 and I-8A-1 to I-8A-12.

The media according to the invention preferably comprise one, two, three, four or more, preferably one, two or three, compounds of the formula I.

The compounds of the formula I are preferably employed in the liquid-crystalline medium in amounts of ≥1% by weight, preferably ≥5% by weight, based on the mixture as a whole. Particular preference is given to liquid-crystalline media which comprise 2-15% by weight of one or more compounds of the formula I.

Preferred embodiments of the liquid-crystalline medium according to the invention are indicated below:

a) Liquid-crystalline medium which additionally comprises one or more compounds selected from the group of the compounds of the formulae IIA, IIB and IIC:

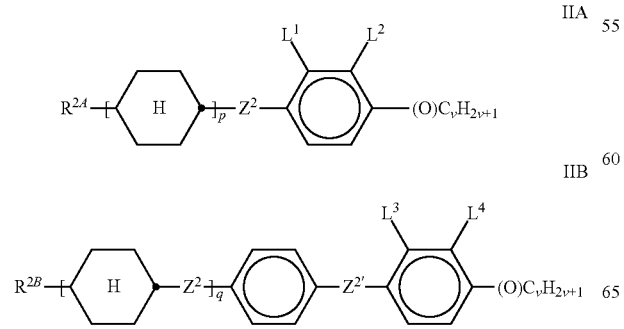

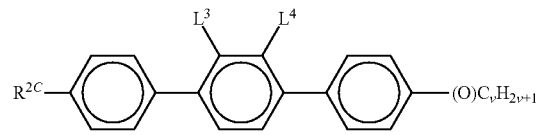

in which
R$^{2A}$, R$^{2B}$ and R$^{2C}$ each, independently of one another, denote H, an alkyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

—C≡C—, —CF$_2$O—, —OCF$_2$—, —OC—O— or —O—CO— in such a way that O atoms are not linked directly to one another,
L$^{1-4}$ each, independently of one another, denote F, Cl, CF$_3$ or CHF$_2$,
Z$^2$ and Z$^{2'}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O—,
p denotes 1 or 2,
q denotes 0 or 1, and
v denotes 1 to 6.

In the compounds of the formulae IIA and IIB, Z$^2$ may have identical or different meanings. In the compounds of the formula IIB, Z$^2$ and Z$^{2'}$ may have identical or different meanings.

In the compounds of the formulae IIA, IIB and IIC, R$^{2A}$, R$^{2B}$ and R$^{2C}$ each preferably denote alkyl having 1-6 C atoms, in particular CH$_3$, C$_2$H$_5$, n-C$_3$H$_7$, n-C$_4$H$_9$, n-C$_5$H$_{11}$.

In the compounds of the formulae IIA and IIB, L$^1$, L$^2$, L$^3$ and L$^4$ preferably denote L$^1$=L$^2$=F and L$^3$=L$^4$=F, furthermore L=F and L$^2$=Cl, L$^1$=Cl and L$^2$=F, L$^3$=F and L$^4$=Cl, L$^3$=Cl and L$^4$=F. Z$^2$ and Z$^{2'}$ in the formulae IIA and IIB preferably each, independently of one another, denote a single bond, furthermore a —C$_2$H$_4$— bridge. If in the formula IIB Z$^2$=—C$_2$H$_4$—, Z$^{2'}$ is preferably a single bond or, if Z$^{2'}$=—C$_2$H$_4$—, Z$^2$ is preferably a single bond. In the compounds of the formulae IIA and IIB, (O)C$_v$H$_{2v+1}$ preferably denotes OC$_v$H$_{2v+1}$, furthermore C$_v$H$_{2v+1}$. In the compounds of the formula IIC, (O)C$_v$H$_{2v+1}$ preferably denotes C$_v$H$_{2v+1}$. In the compounds of the formula IIC, L$^3$ and L$^4$ preferably each denote F.

Preferred compounds of the formulae IIA, IIB and IIC are indicated below:

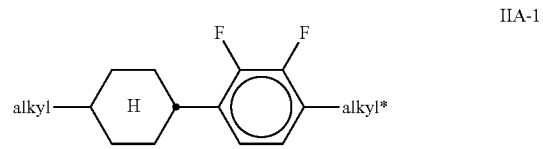

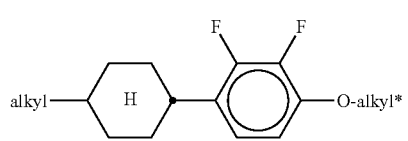
IIA-2
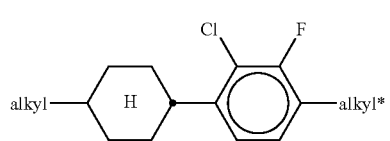
IIA-3
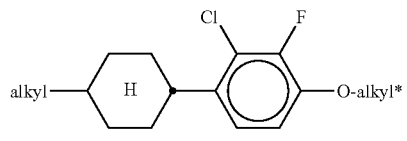
IIA-4
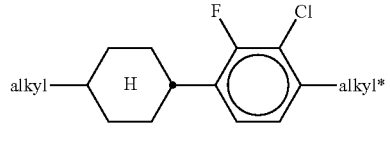
IIA-5
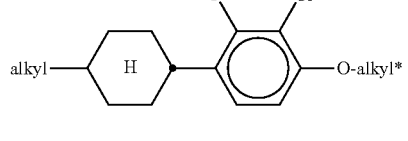
IIA-6
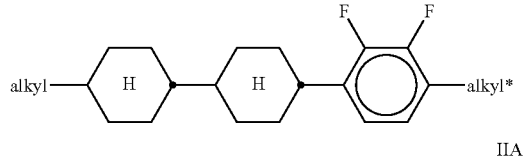
IIA-7
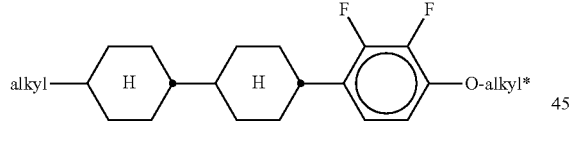
IIA-8
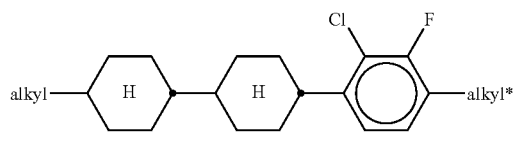
IIA-9
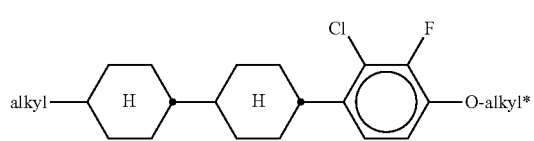
IIA-10
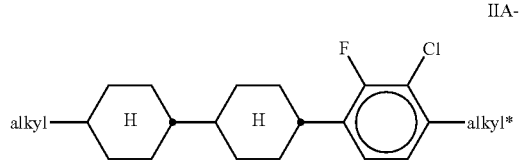
IIA-11
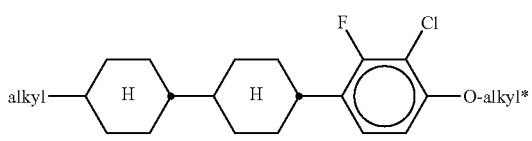
IIA-12
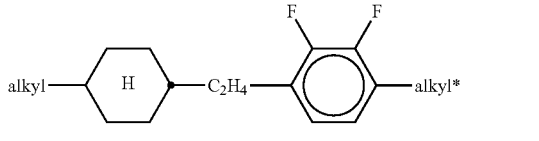
IIA-13
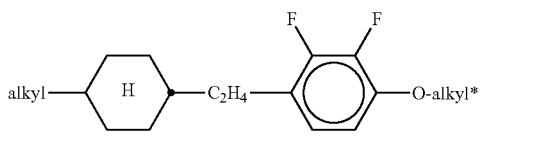
IIA-14
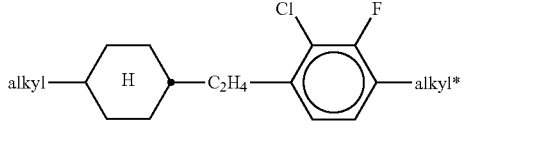
IIA-15
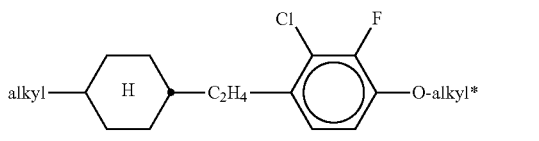
IIA-16
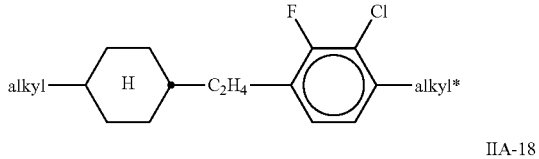
IIA-17
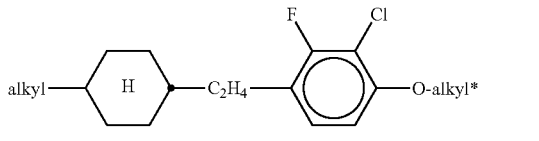
IIA-18
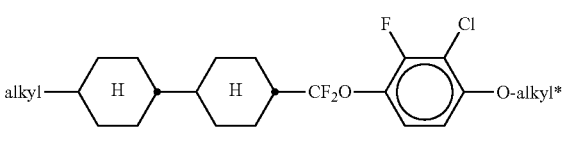
IIA-19
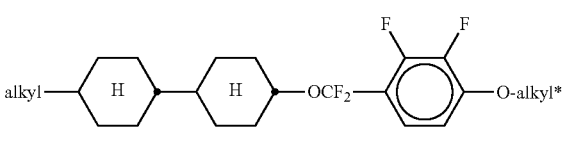
IIA-20
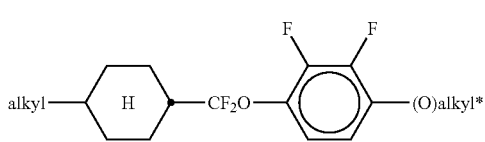
IIA-21

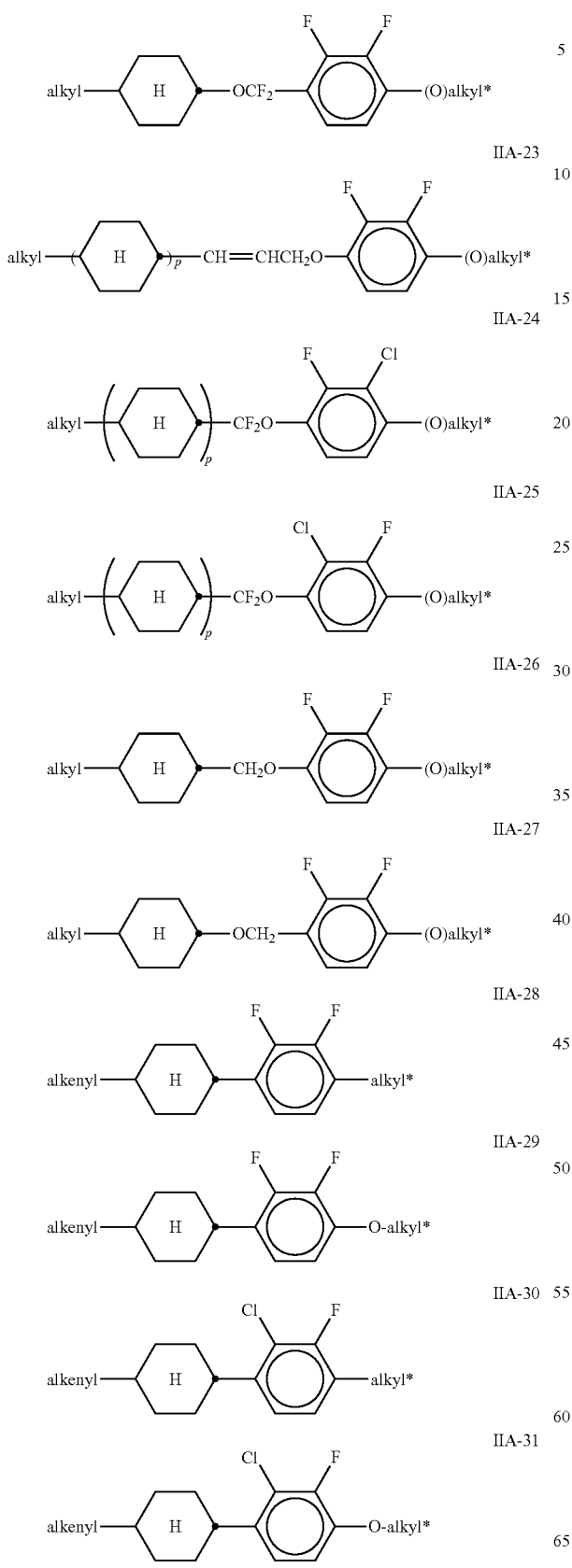

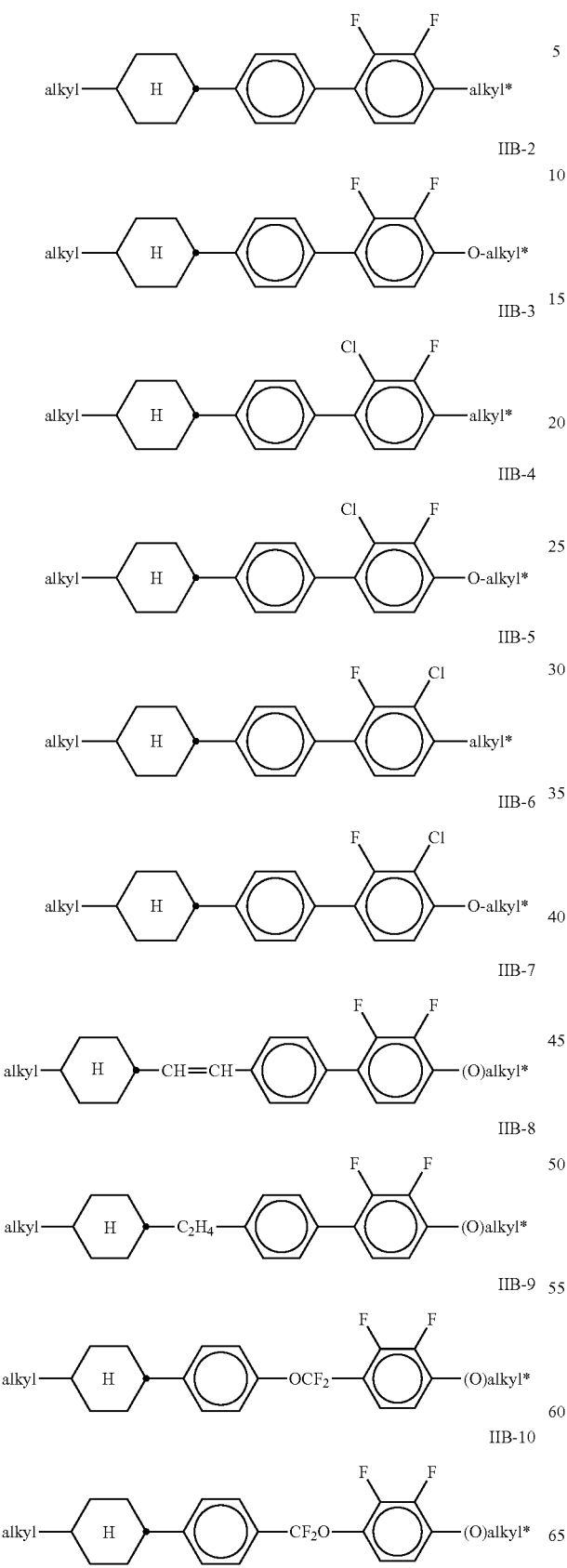
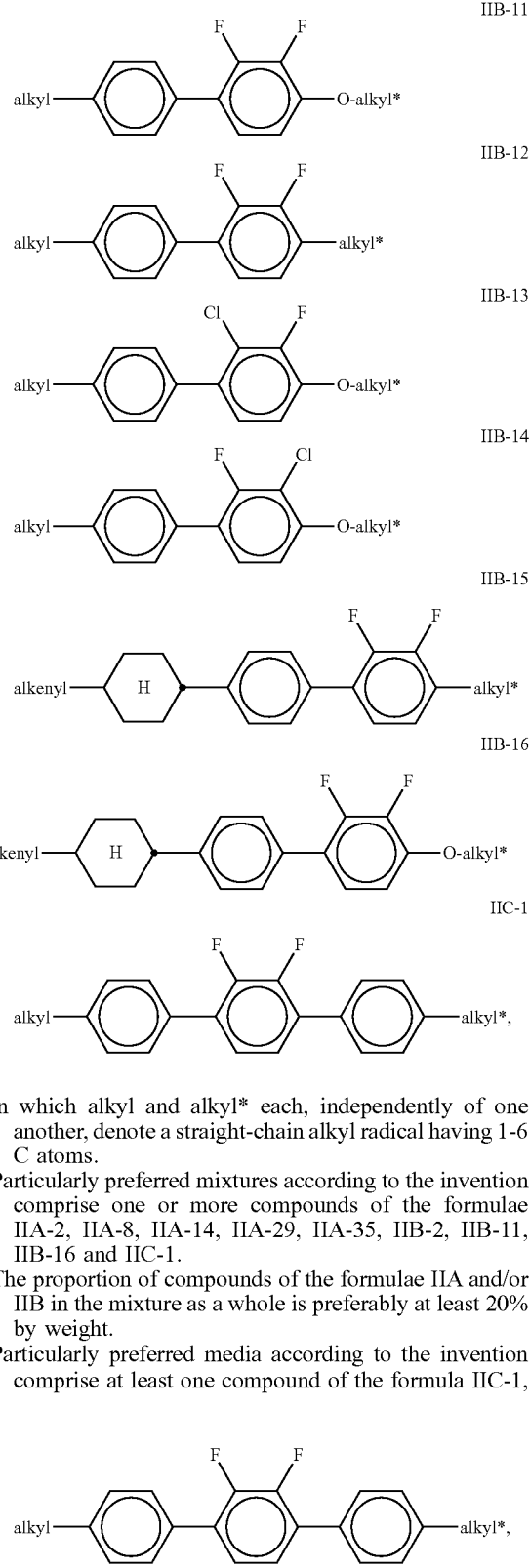

in which alkyl and alkyl* each, independently of one another, denote a straight-chain alkyl radical having 1-6 C atoms.

Particularly preferred mixtures according to the invention comprise one or more compounds of the formulae IIA-2, IIA-8, IIA-14, IIA-29, IIA-35, IIB-2, IIB-11, IIB-16 and IIC-1.

The proportion of compounds of the formulae IIA and/or IIB in the mixture as a whole is preferably at least 20% by weight.

Particularly preferred media according to the invention comprise at least one compound of the formula IIC-1,

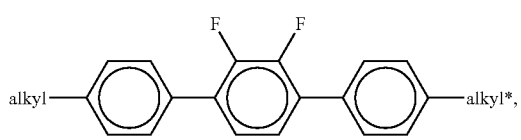

in which alkyl and alkyl* have the meanings indicated above, preferably in amounts of >3% by weight, in particular >5% by weight and particularly preferably 5-25% by weight.

b) Liquid-crystalline medium which additionally comprises one or more compounds of the formula III,

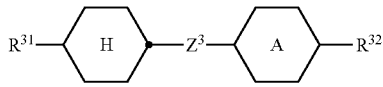   III in which
R$^{31}$ and R$^{32}$ each, independently of one another, denote a straight-chain alkyl, alkoxyalkyl or alkoxy radical having up to 12 C atoms, and

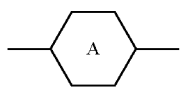

denotes

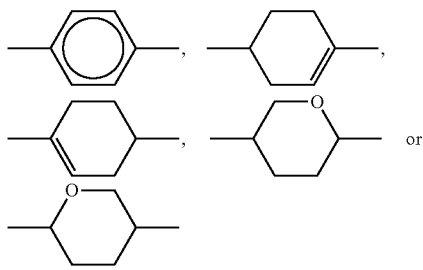 or

Z$^3$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —C$_4$F$_4$—, —CF=CF—.

Preferred compounds of the formula III are indicated below:

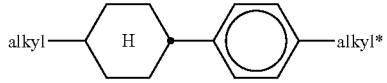 IIIa

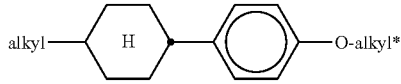 IIIb

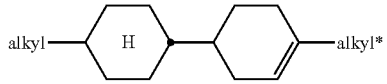 IIIc

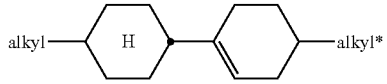 IIId in which
alkyl and
alkyl* each, independently of one another, denote a straight-chain alkyl radical having 1-6 C atoms.

The medium according to the invention preferably comprises at least one compound of the formula IIIa and/or formula IIIb.

The proportion of compounds of the formula III in the mixture as a whole is preferably at least 5% by weight.

c) Liquid-crystalline medium additionally comprising a compound of the formula

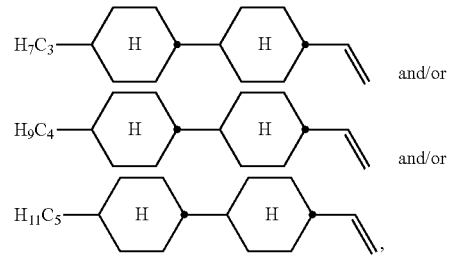

preferably in total amounts of ≥5% by weight, in particular ≥10% by weight.

Preference is furthermore given to mixtures according to the invention comprising the compound

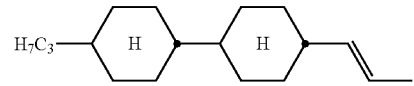

d) Liquid-crystalline medium which additionally comprises one or more tetracyclic compounds of the formulae

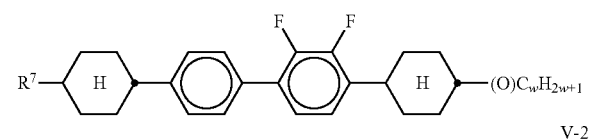 V-1

 V-2

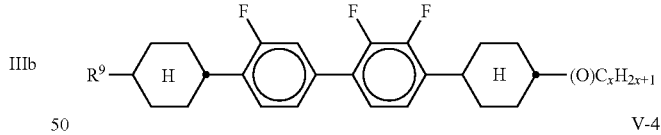 V-3

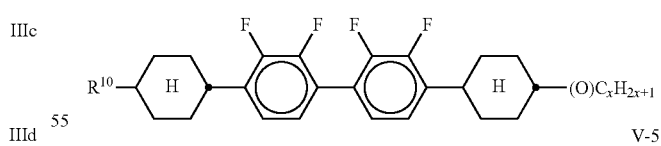 V-4

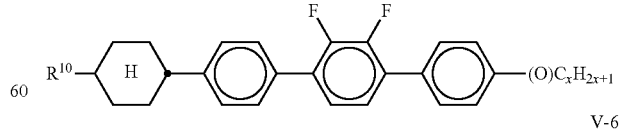 V-5

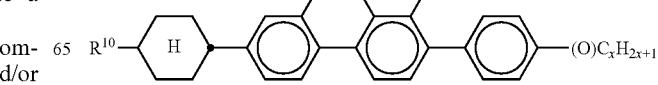 V-6

-continued

V-7
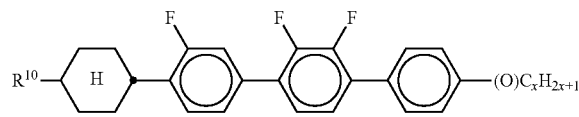

V-8
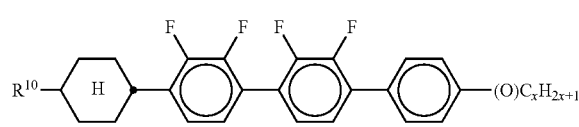

V-9
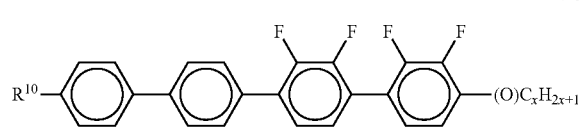

in which
R$^{7-10}$ each, independently of one another, have one of the meanings indicated for R$^{2A}$ in Claim 2, and
w and x each, independently of one another, denote 1 to 6.

Particular preference is given to mixtures comprising at least one compound of the formula V-9.

e) Liquid-crystalline medium which additionally comprises one or more compounds of the formulae Y-1 to Y-6, Y-1
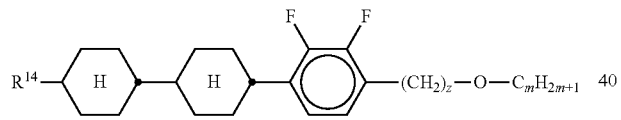

Y-2
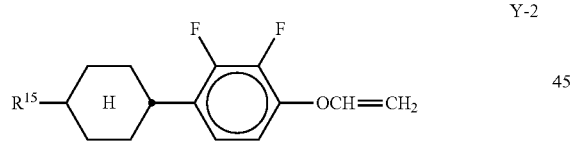

Y-3
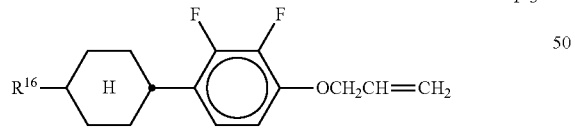

Y-4
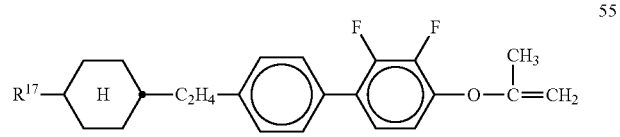

Y-5
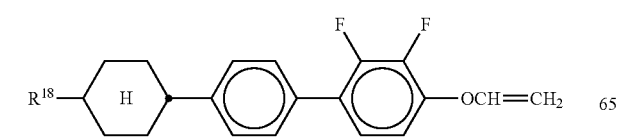

-continued

Y-6
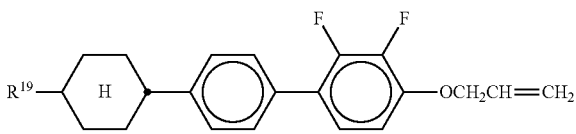

in which R$^{14}$-R$^{19}$ each, independently of one another, denote an alkyl or alkoxy radical having 1-6 C atoms; z and m each, independently of one another, denote 1-6; x denotes 0, 1, 2 or 3.

The medium according to the invention particularly preferably comprises one or more compounds of the formulae Y-1 to Y-6, preferably in amounts of ≥5% by weight.

f) Liquid-crystalline medium additionally comprising one or more fluorinated terphenyls of the formulae T-1 to T-21, T-1
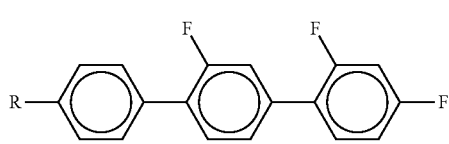

T-2
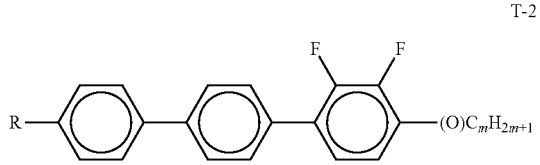

T-3
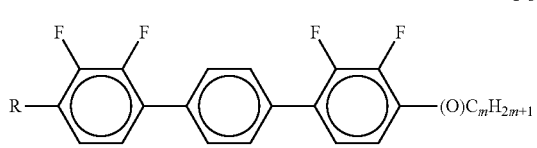

T-4
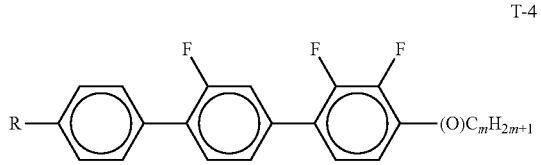

T-5
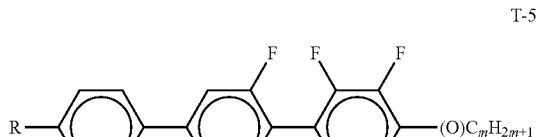

T-6
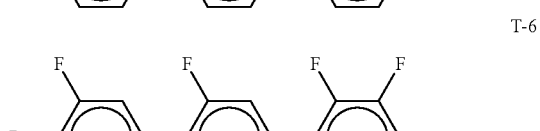

T-7
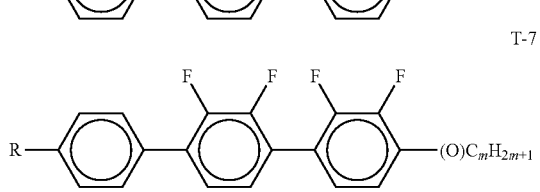

T-8
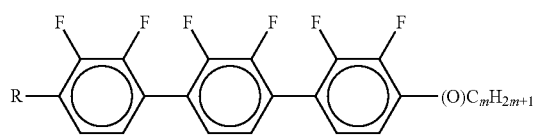

T-9
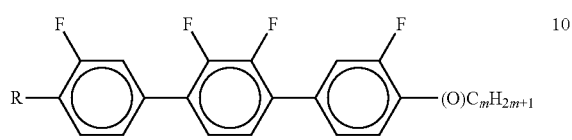

T-10
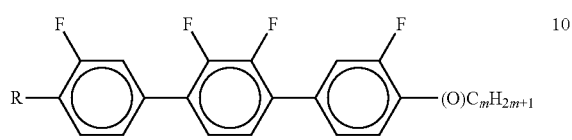

T-11
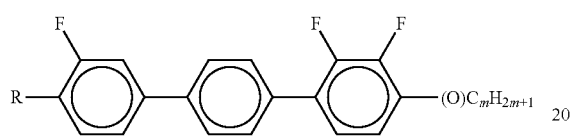

T-12
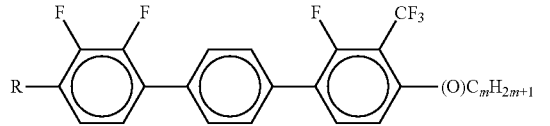

T-13
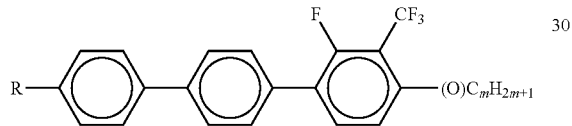

T-14
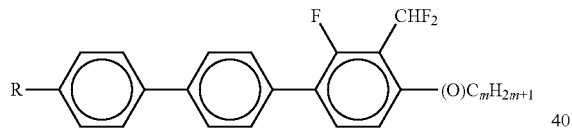

T-15
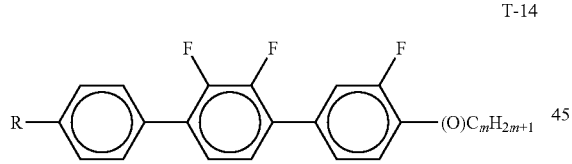

T-16
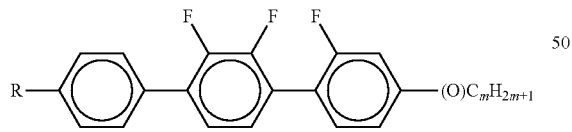

T-17
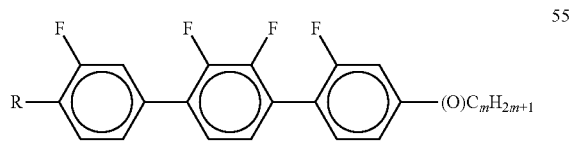

T-18
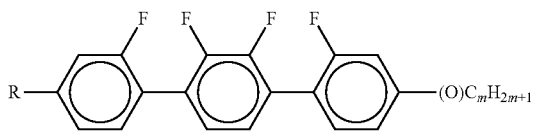

T-19
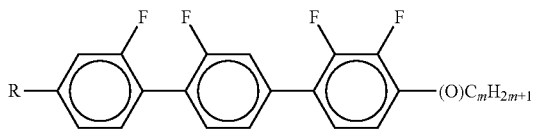

T-20
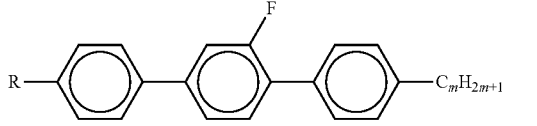

T-21
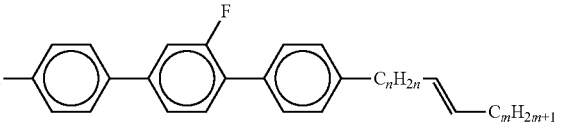

in which
R denotes a straight-chain alkyl or alkoxy radical having 1-7 C atoms, and m=0, 1, 2, 3, 4, 5 or 6 and n denotes 0, 1, 2, 3 or 4.

R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-21 in amounts of 2-30% by weight, in particular 5-20% by weight.

Particular preference is given to compounds of the formulae T-1, T-2, T-20 and T-21. In these compounds, R preferably denotes alkyl, furthermore alkoxy, each having 1-5 C atoms. In the compounds of the formula T-20, R preferably denotes alkyl or alkenyl, in particular alkyl. In the compound of the formula T-21, R preferably denotes alkyl.

The terphenyls are preferably employed in the mixtures according to the invention if the Δn value of the mixture is to be ≥0.1. Preferred mixtures comprise 2-20% by weight of one or more terphenyl compounds selected from the group of the compounds T-1 to T-21.

g) Liquid-crystalline medium additionally comprising one or more biphenyls of the formulae B-1 to B-3, B-1
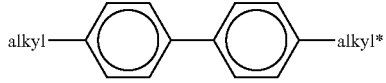

B-2
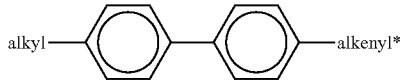

B-3
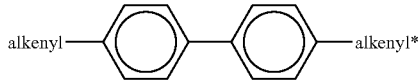

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

The proportion of the biphenyls of the formulae B-1 to B-3 in the mixture as a whole is preferably at least 3% by weight, in particular ≥5% by weight.

Of the compounds of the formulae B-1 to B-3, the compounds of the formula B-2 are particularly preferred.

Particularly preferred biphenyls are

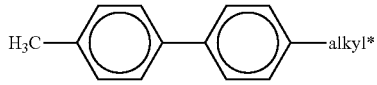
B-1a

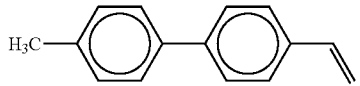
B-2a

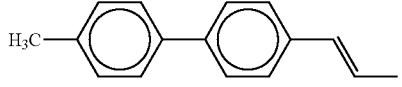
B-2b

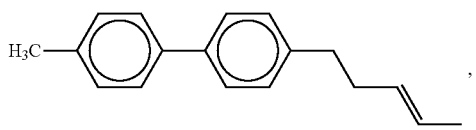
B-2c in which alkyl* denotes an alkyl radical having 1-6 C atoms. The medium according to the invention particularly preferably comprises one or more compounds of the formulae B-1a and/or B-2c.

h) Liquid-crystalline medium comprising at least one compound of the formulae Z-1 to Z-7,

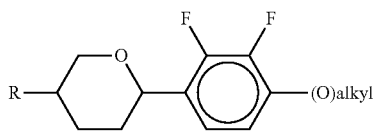
Z-1

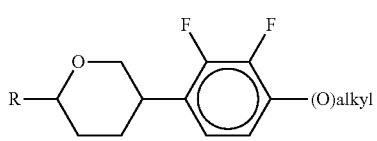
Z-2

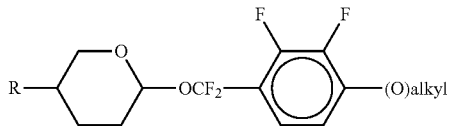
Z-3

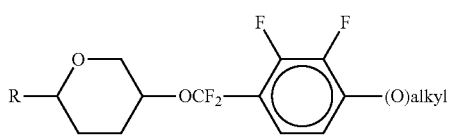
Z-4

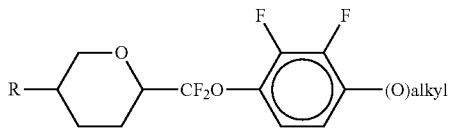
Z-5

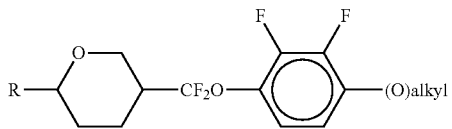
Z-6

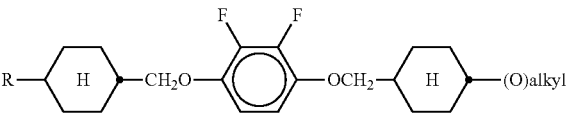
Z-7 in which R and alkyl have the meanings indicated above.

i) Liquid-crystalline medium comprising at least one compound of the formulae O-1 to O-16,

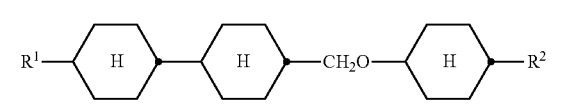
O-1

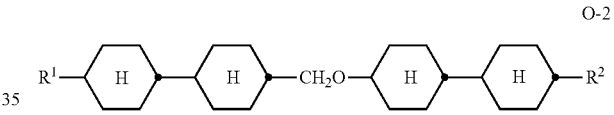
O-2

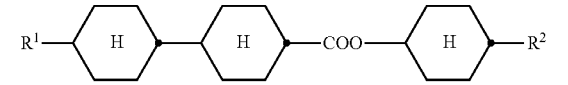
O-3

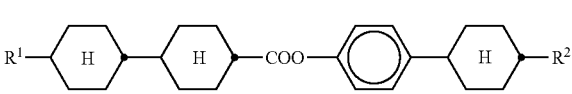
O-4

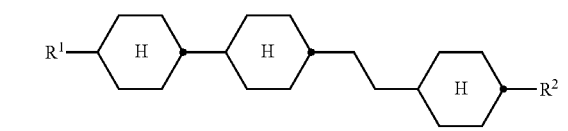
O-5

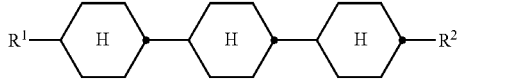
O-6

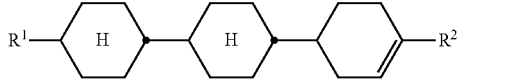
O-7

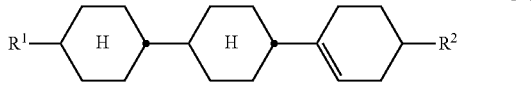
O-8

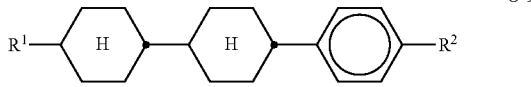
O-9

-continued

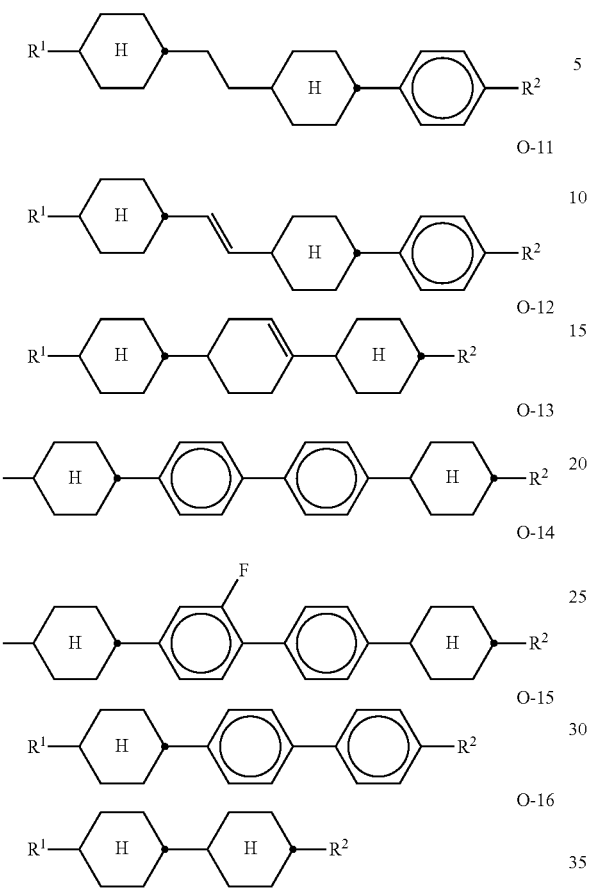

in which $R^1$ and $R^2$ have the meanings indicated for $R^{2A}$. $R^1$ and $R^2$ preferably each, independently of one another, denote straight-chain alkyl.

Preferred media comprise one or more compounds of the formulae O-1, O-3, O-4, O-5, O-9, O-13, O-14, O-15 and/or O-16.

Mixtures according to the invention very particularly preferably comprise the compounds of the formula O-9, O-15 and/or O-16, in particular in amounts of 5-30%.

Preferred compounds of the formulae O-15 and O-16 are indicated below:

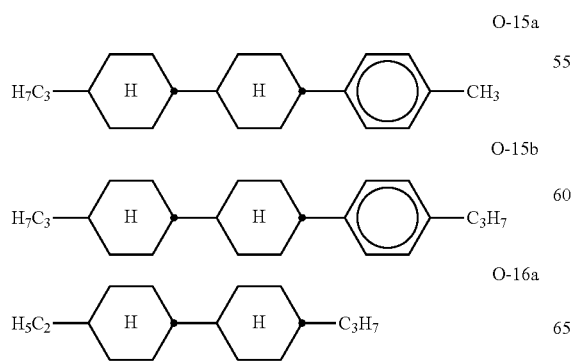

-continued

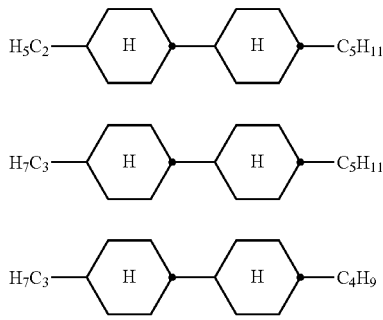

The medium according to the invention particularly preferably comprises the tricyclic compounds of the formula O-15a and/or of the formula O-15b in combination with one or more bicyclic compounds of the formulae O-16a to O-16d. The total proportion of the compounds of the formulae O-15a and/or O-15b in combination with one or more compounds selected from the bicyclic compounds of the formulae O-16a to O-16d is 5-40%, very particularly preferably 15-35%.

Very particularly preferred mixtures comprise compounds O-15a and O-16a:

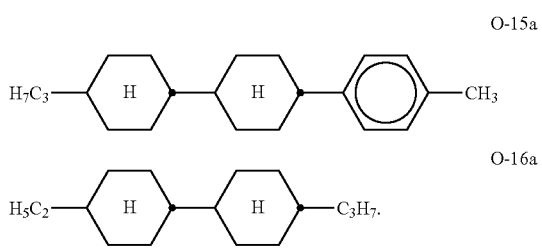

Compounds O-15a and O-16a are preferably present in the mixture in a concentration of 15-35%, particularly preferably 15-25% and especially preferably 18-22%, based on the mixture as a whole.

Very particularly preferred mixtures comprise compounds O-15b and O-16a:

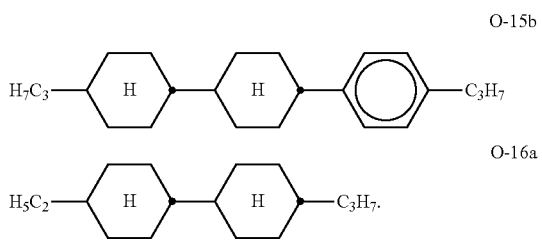

Compounds O-15b and O-16a are preferably present in the mixture in a concentration of 15-35%, particularly preferably 15-25% and especially preferably 18-22%, based on the mixture as a whole.

Very particularly preferred mixtures comprise the following three compounds:

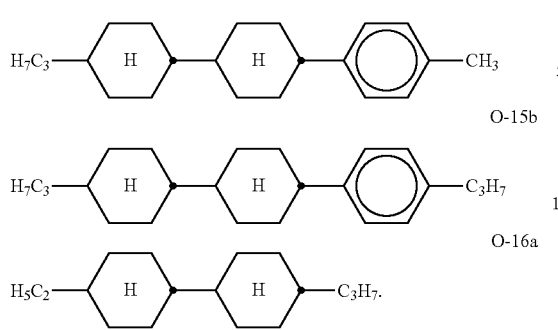

Compounds O-15a, O-15b and O-16a are preferably present in the mixture in a concentration of 15-35%, particularly preferably 15-25% and especially preferably 18-22%, based on the mixture as a whole.

j) Preferred liquid-crystalline media according to the invention comprise one or more substances which contain a tetrahydronaphthyl or naphthyl unit, such as, for example, the compounds of the formulae N-1 to N-5,

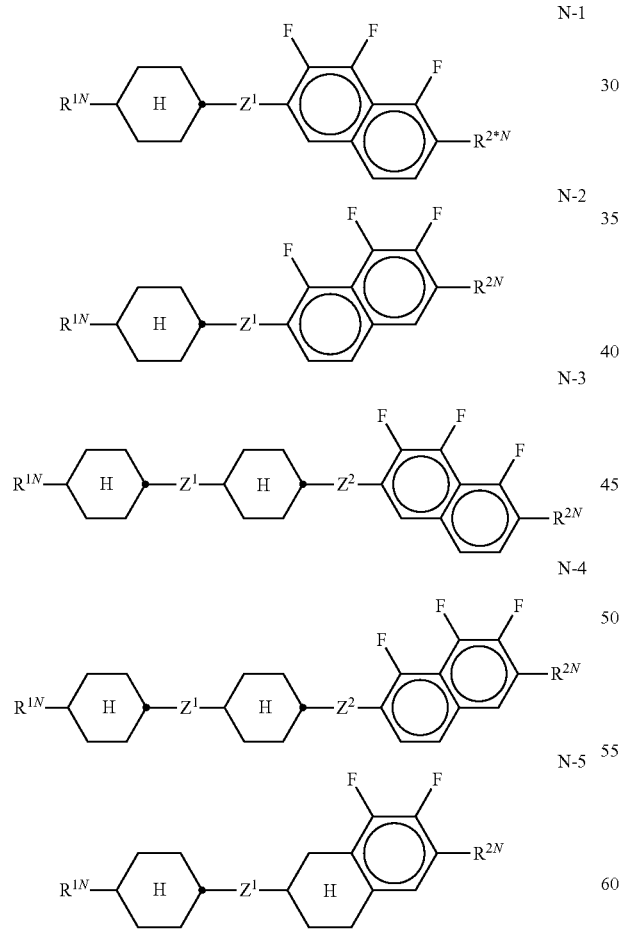

in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=$CHCH_2CH_2$—, —$CH_2CH_2$CH=CH—, —$CH_2O$—, —$OCH_2$—, —COO—, —OCO—, —$C_2F_4$—, —CF=CF—, —CF=CH—, —CH=CF—, —$CF_2O$—, —$OCF_2$—, —$CH_2$— or a single bond.

k) Preferred mixtures comprise one or more compounds selected from the group of the difluorodibenzochroman compounds of the formula BC, chromans of the formula CR, fluorinated phenanthrenes of the formulae PH-1 and PH-2, fluorinated dibenzofurans of the formula BF,

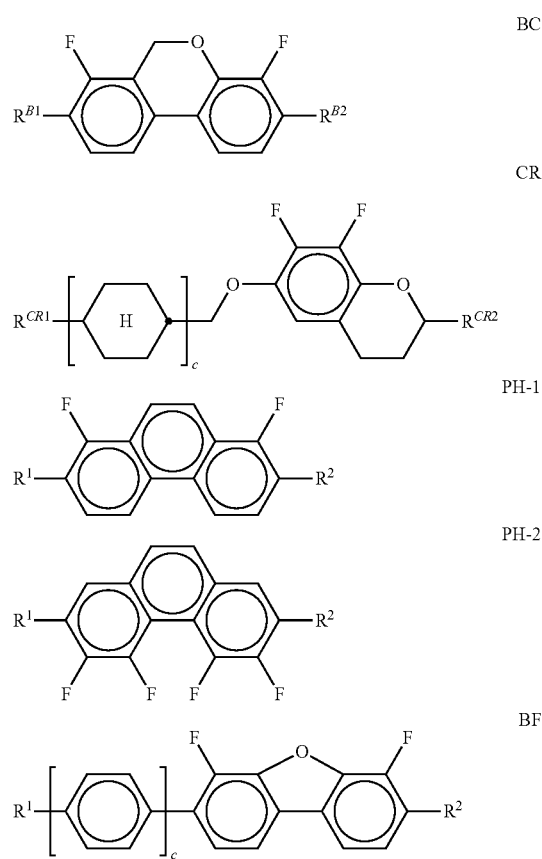

in which $R^{B1}$, $R^{B2}$, $R^{CR1}$, $R^{CR2}$, $R^1$, $R^2$ each, independently of one another, have the meaning of $R^{2A}$. c is 0, 1 or 2.

The mixtures according to the invention preferably comprise the compounds of the formulae BC, CR, PH-1, PH-2 and/or BF in amounts of 3 to 20% by weight, in particular in amounts of 3 to 15% by weight. Particularly preferred compounds of the formulae BC and CR are the compounds BC-1 to BC-7 and CR-1 to CR-5,

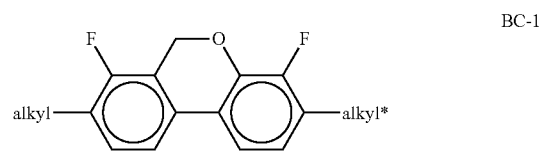

-continued

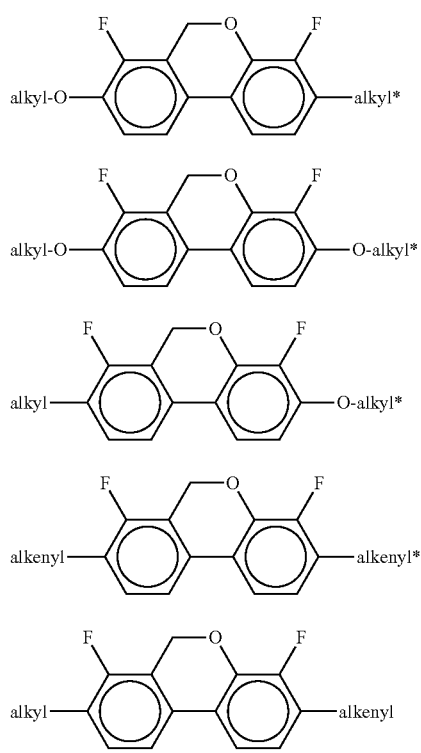

BC-2
BC-3
BC-4
BC-5
BC-6
BC-7
CR-1
CR-2
CR-3
CR-4

-continued

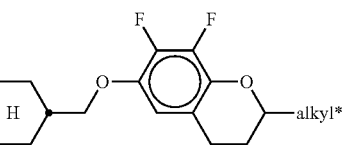

CR-5 in which
alkyl and alkyl* each, independently of one another, denote a straight-chain alkyl radical having 1-6 C atoms, and
alkenyl and
alkenyl* each, independently of one another, denote a straight-chain alkenyl radical having 2-6 C atoms.
Very particular preference is given to mixtures comprising one, two or three compounds of the formula BC-2.

l) Preferred mixtures comprise one or more indane compounds of the formula In,

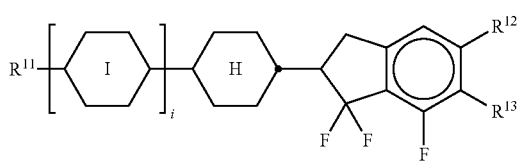

In in which
$R^{11}$, $R^{12}$,
$R^{13}$ each, independently of one another, denote a straight-chain alkyl, alkoxy, alkoxyalkyl or alkenyl radical having 1-6 C atoms,
$R^{12}$ and $R^{13}$ additionally denote halogen, preferably F,

denotes

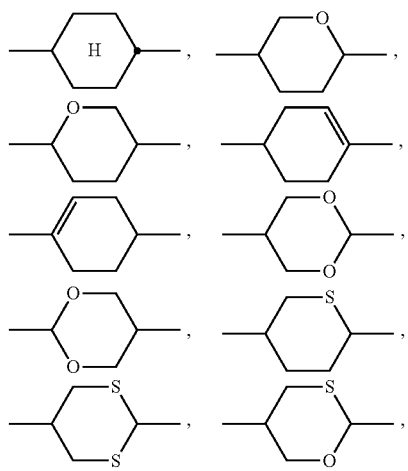

i denotes 0, 1 or 2.

Preferred compounds of the formula In are the compounds of the formulae In-1 to In-16 indicated below:

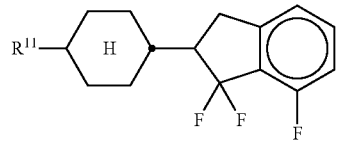
In-1

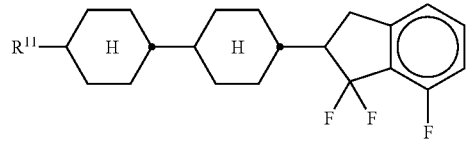
In-2

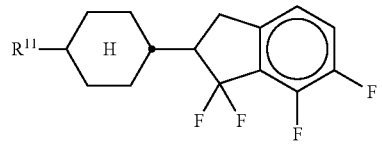
In-3

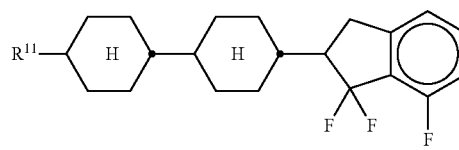
In-4

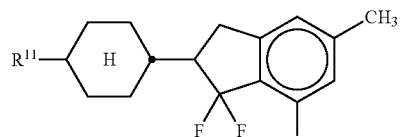
In-5

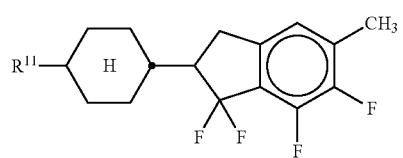
In-6

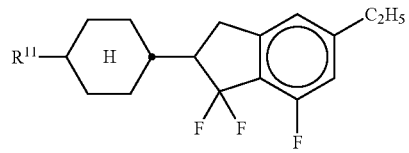
In-7

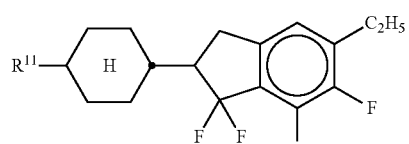
In-8

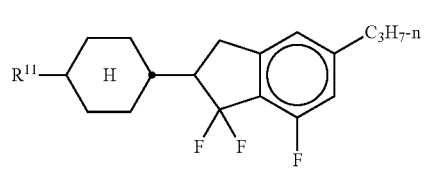
In-9

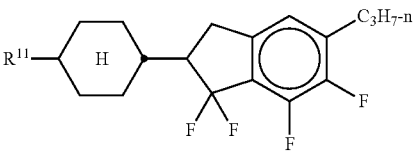
In-10

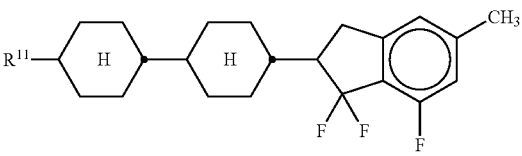
In-11

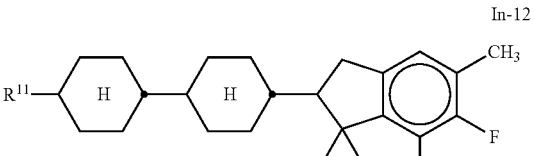
In-12

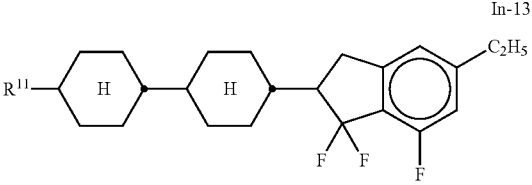
In-13

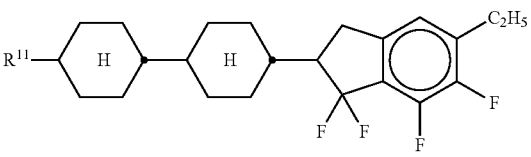
In-14

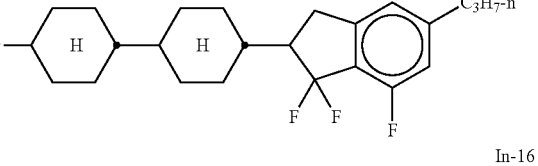
In-15

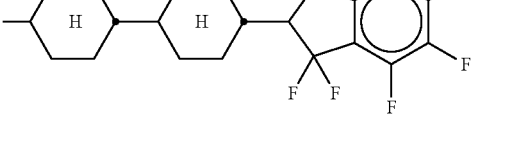
In-16

Particular preference is given to the compounds of the formulae In-1, In-2, In-3 and In-4.

The compounds of the formula In and the sub-formulae In-1 to In-16 are preferably employed in the mixtures according to the invention in concentrations ≥5% by weight, in particular 5-30% by weight and very particularly preferably 5-25% by weight.

m) Preferred mixtures additionally comprise one or more compounds of the formulae L-1 to L-11,

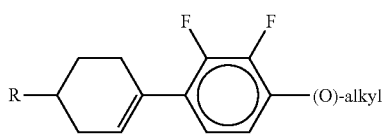
L-1

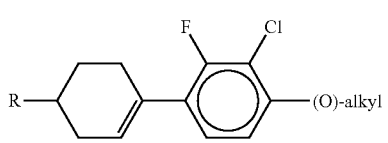
L-2

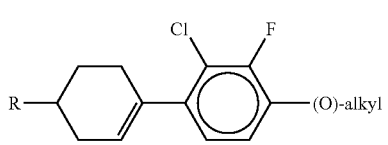
L-3

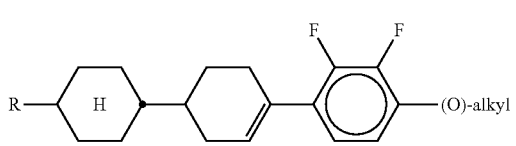
L-4

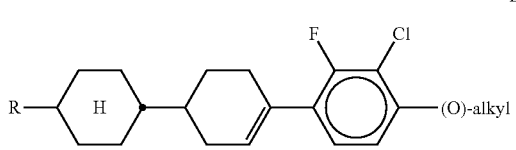
L-5

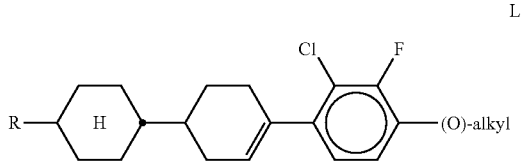
L-6

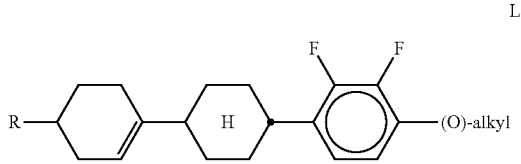
L-7

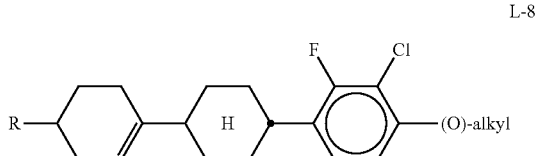
L-8

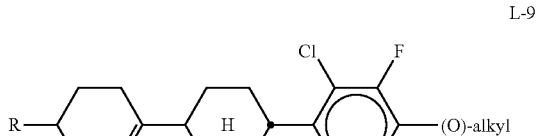
L-9

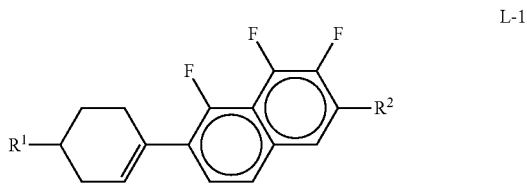
L-10

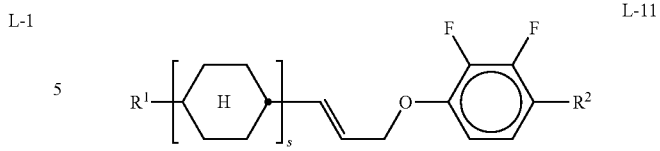
L-11 in which

R, $R^1$ and $R^2$ each, independently of one another, have the meanings indicated for $R^{2,4}$ in Claim 2, and alkyl denotes an alkyl radical having 1-6 C atoms. s denotes 1 or 2.

Particular preference is given to the compounds of the formulae L-1 and L-4, in particular L-4.

The compounds of the formulae L-1 to L-11 are preferably employed in concentrations of 5-50% by weight, in particular 5-40% by weight and very particularly preferably 10-40% by weight.

Particularly preferred mixture concepts are indicated below: (the acronyms used are explained in Table A. n and m here each denote, independently of one another, 1-6).

The mixtures according to the invention preferably comprise
the compound of the formula I in which $L^1=L^2=F$ and $R^1=R^{1*}$=alkoxy,
CPY-n-Om, in particular CPY-2-O2, CPY-3-O2 and/or CPY-5-O2, preferably in concentrations >5%, in particular 10-30%, based on the mixture as a whole, and/or
CY-n-Om, preferably CY-3-O2, CY-3-O4, CY-5-O2 and/or CY-5-O4, preferably in concentrations >5%, in particular 15-50%, based on the mixture as a whole, and/or
CCY-n-Om, preferably CCY-4-O2, CCY-3-O2, CCY-3-O3, CCY-3-O1 and/or CCY-5-O2, preferably in concentrations >5%, in particular 10-30%, based on the mixture as a whole, and/or
CLY-n-Om, preferably CLY-2-O4, CLY-3-O2 and/or CLY-3-O3, preferably in concentrations >5%, in particular 10-30%, based on the mixture as a whole, and/or
CK-n-F, preferably CK-3-F, CK-4-F and/or CK-5-F, preferably in concentrations of >5%, in particular 5-25%, based on the mixture as a whole.

Preference is furthermore given to mixtures according to the invention which comprise the following mixture concepts:
(n and m each denote, independently of one another, 1-6.)
CPY-n-Om and CY-n-Om, preferably in concentrations of 10-80%, based on the mixture as a whole, and/or
CPY-n-Om and CK-n-F, preferably in concentrations of 10-70%, based on the mixture as a whole, and/or
CPY-n-Om and CLY-n-Om, preferably in concentrations of 10-80%, based on the mixture as a whole.

The invention furthermore relates to an electro-optical display having active-matrix addressing based on the ECB, VA, PS-VA, IPS or FFS effect, characterised in that it contains, as dielectric, a liquid-crystalline medium according to one or more of Claims 1 to 9.

The liquid-crystalline medium according to the invention preferably has a nematic phase from ≤20° C. to ≥70° C., particularly preferably from ≤30° C. to ≥80° C., very particularly preferably from ≤40° C. to ≥90° C.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 $mm^2 \cdot s^{-1}$ at 20° C.

The values of the birefringence Δn in the liquid-crystal mixture are generally between 0.07 and 0.16, preferably between 0.08 and 0.12.

The liquid-crystal mixture according to the invention has a Δ∈ of −0.5 to −8.0, in particular −2.5 to −6.0, where Δ∈ denotes the dielectric anisotropy. The rotational viscosity $\gamma_1$ at 20° C. is preferably ≤165 mPa·s, in particular ≤140 mPa·s.

The liquid-crystal media according to the invention have relatively low values for the threshold voltage ($V_0$). They are preferably in the range from 1.7 V to 3.0 V, particularly preferably ≤2.5 V and very particularly preferably ≤2.3 V.

For the present invention, the term "threshold voltage" relates to the capacitive threshold ($V_0$), also known as the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a Δ∈>1.5, the term "dielectrically neutral compounds" denotes those having −1.5≤Δ∈≤1.5 and the term "dielectrically negative compounds" denotes those having Δ∈<−1.5. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA, ASV, PSA (polymer sustained VA) and PS-VA (polymer stabilized VA). They are furthermore suitable for IPS (in-plane switching) and FFS (fringe field switching) applications having negative Δ∈.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≤0.5. Besides one or more compounds of the formula I, it preferably comprises the compounds of the formulae IIA, IIB and/or IIC, furthermore compounds of the formula III.

The proportion of component A is preferably between 45 and 100%, in particular between 60 and 100%.

For component A, one (or more) individual compound(s) which has (have) a value of Δ∈≤0.8 is (are) preferably selected. This value must be more negative, the smaller the proportion A in the mixture as a whole.

Component B has pronounced nematogeneity and a flow viscosity of not greater than 30 $mm^2 \cdot s^{-1}$, preferably not greater than 25 $mm^2 \cdot s^{-1}$, at 20° C.

Particularly preferred individual compounds in component B are extremely low-viscosity nematic liquid crystals having a flow viscosity of not greater than 18 $mm^2 \cdot s^{-1}$, preferably not greater than 12 $mm^2 \cdot s^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of Δ∈≤21.5. These so-called positive compounds are generally present in a mixture of negative dielectric anisotropy in amounts of ≤20% by weight, based on the mixture as a whole.

A multiplicity of suitable materials is known to the person skilled in the art from the literature. Particular preference is given to compounds of the formula III.

In addition, these liquid-crystal phases may also comprise more than 18 components, preferably 18 to 25 components.

Besides one or more compounds of the formula I, the phases preferably comprise 4 to 15, in particular 5 to 12, and particularly preferably <10, compounds of the formulae IIA, IIB and/or IIC and optionally III.

Besides compounds of the formula I and the compounds of the formulae IIA, IIB and/or IIC and optionally III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula IV $$R^{20}\text{-L-G-E-}R^{21} \qquad \qquad IV$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G denotes —CH=CH— —N(O)=N—
—CH=CQ- —CH=N(O)—
—C≡C— —CH$_2$—CH$_2$—
—CO—O— —CH$_2$—O—
—CO—S— —CH$_2$—S—
—CH=N— —COO-Phe-COO—
—CF$_2$O— —CF=CF—
—OCF$_2$— —OCH$_2$—
—(CH$_2$)$_4$— —(CH$_2$)$_3$O— or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, NO$_2$, NCS, CF$_3$, SF$_5$, OCF$_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

Polymerisable compounds, so-called reactive mesogens (RMs), for example as disclosed in U.S. Pat. No. 6,861,107, may furthermore be added to the mixtures according to the invention in concentrations of preferably 0.12-5% by weight, particularly preferably 0.2-2% by weight, based on the mixture.

These mixtures may optionally also comprise an initiator, as described, for example, in U.S. Pat. No. 6,781,665. The initiator, for example Irganox-1076 from Ciba, is preferably added to the mixture comprising polymerisable compounds in amounts of 0-1%. Mixtures of this type can be used for so-called polymer-stabilised VA modes (PS-VA) or PSA (polymer sustained VA), in which polymerisation of the reactive mesogens is intended to take place in the liquid-crystalline mixture. The prerequisite for this is that the liquid-crystal mixture does not itself comprise any polymerisable components.

In a preferred embodiment of the invention, the polymerisable compounds are selected from the compounds of the formula M,

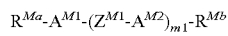     M in which the individual radicals have the following meanings:

$R^{Ma}$ and $R^{Mb}$ each, independently of one another, denote P, P-Sp-, H, halogen, SF$_5$, NO$_2$, an alkyl, alkenyl or alkynyl group, where at least one of the radicals $R^{Ma}$ and $R^{Mb}$ preferably denotes or contains a group P or P-Sp-, P denotes a polymerisable group, Sp denotes a spacer group or a single bond, $A^{M1}$ and $A^{M2}$ each, independently of one another, denote an aromatic, heteroaromatic, alicyclic or heterocyclic group, preferably having 4 to 25 ring atoms, preferably C atoms, which may also encompass or contain fused rings, and which may optionally be mono- or polysubstituted by L, L denotes P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, preferably P, P-Sp-, H, OH, CH$_2$OH, halogen, SF$_5$, NO$_2$, an alkyl, alkenyl or alkynyl group, $Y^1$ denotes halogen, $Z^{M1}$ denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—, —COO—, —OCO—CH=CH—, CR$^0$R$^{00}$ or a single bond, $R^0$ and $R^{00}$ each, independently of one another, denote H or alkyl having 1 to 12 C atoms, $R^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms, m1 denotes 0, 1, 2, 3 or 4, and n1 denotes 1, 2, 3 or 4, where at least one, preferably one, two or three, particularly preferably one or two, from the group $R^{Ma}$, $R^{Mb}$ and the substituents L present denotes a group P or P-Sp- or contains at least one group P or P-Sp-.

Particularly preferred compounds of the formula M are those in which $R^{Ma}$ and $R^{Mb}$ each, independently of one another, denote P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where at least one of the radicals $R^{Ma}$ and $R^{Mb}$ preferably denotes or contains a group P or P-Sp-, $A^{M1}$ and $A^{M2}$ each, independently of one another, denote 1,4-phenylene, naphthalene-1,4-diyl, naphthalene-2,6-diyl, phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicyclo[1.1.1]-pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P denotes a polymerisable group, $Y^1$ denotes halogen, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Very particular preference is given to compounds of the formula M in which one of $R^{Ma}$ and $R^{Mb}$ or both denote(s) P or P-Sp-.

Suitable and preferred RMs for use in liquid-crystalline media and PS-VA displays or PSA displays according to the invention are selected, for example, from the following formulae:

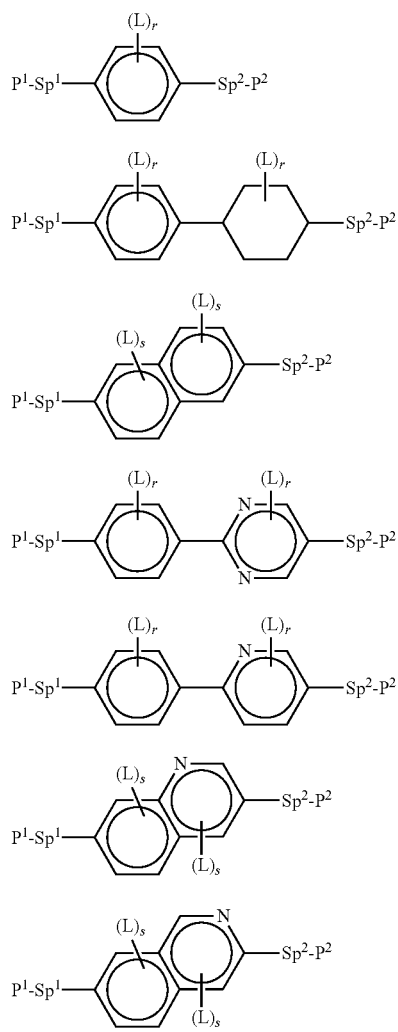

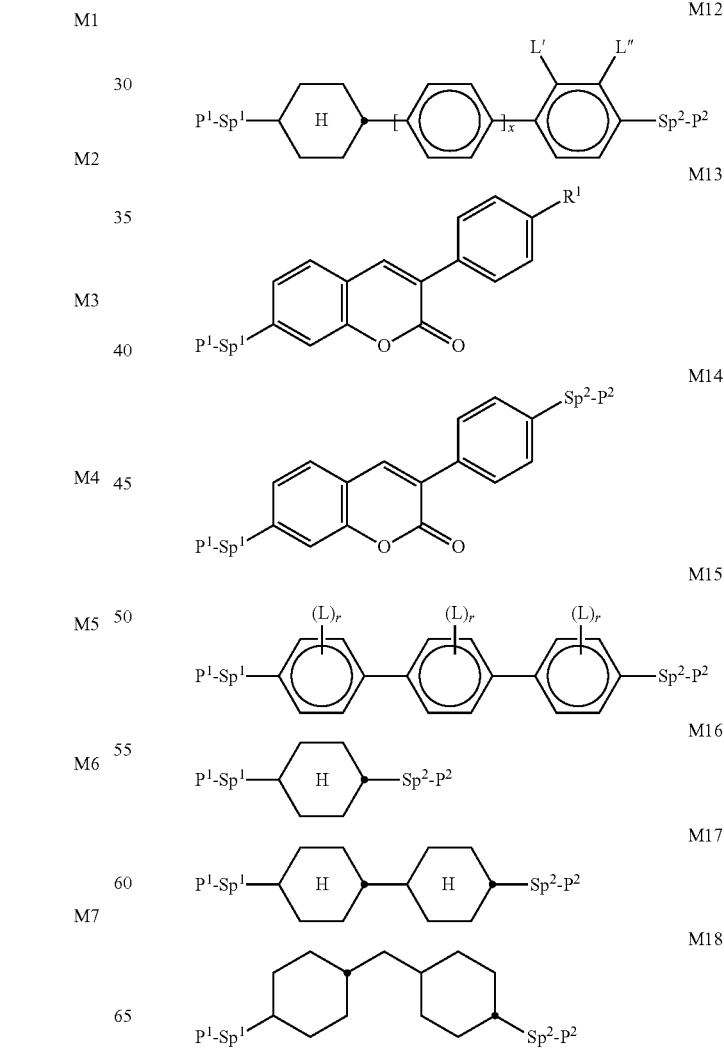

-continued

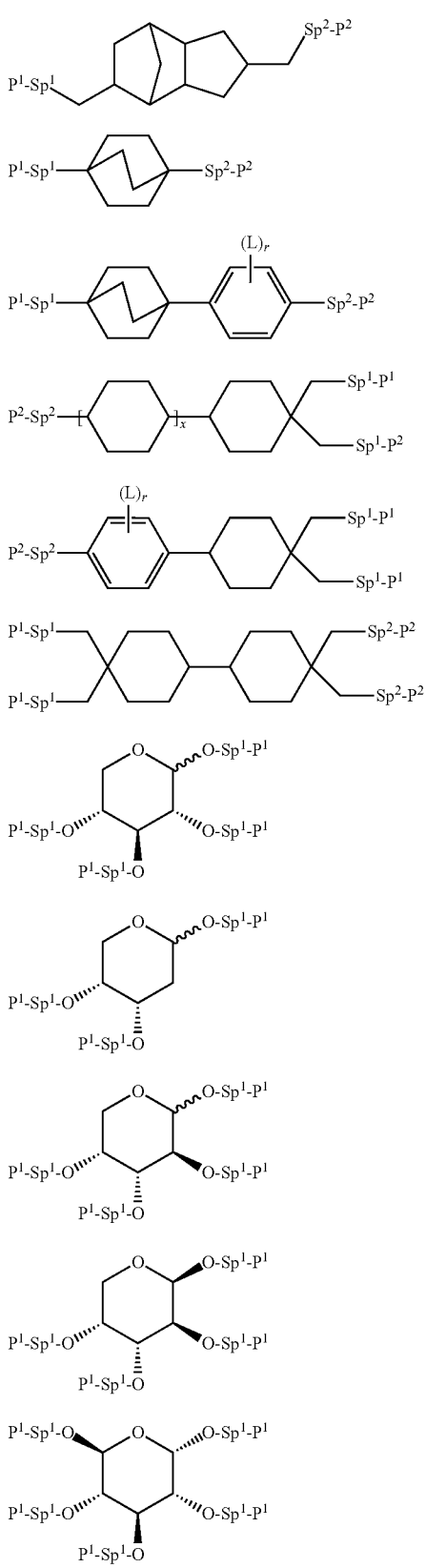

in which the individual radicals have the following meanings:

P$^1$ and P$^2$ each, independently of one another, denote a polymerisable group, preferably having one of the meanings indicated above and below for P, particularly preferably an acrylate, methacrylate, fluoroacrylate, oxetane, vinyloxy or epoxy group, Sp$^1$ and Sp$^2$ each, independently of one another, denote a single bond or a spacer group, preferably having one of the meanings indicated above and below for Sp, and particularly preferably —(CH$_2$)$_{p1}$—, —(CH$_2$)$_{p1}$—O—, —(CH$_2$)$_{p1}$—CO—O— or —(CH$_2$)$_{p1}$—O—CO—O—, in which p1 is an integer from 1 to 12, and where the linking of the last-mentioned groups to the adjacent ring takes place via the O atom, where one of the radicals P$^1$-Sp$^1$- and P$^2$-Sp$^2$- may also denote R$^{aa}$, R$^{aa}$ denotes H, F, Cl, CN or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P$^1$-Sp$^1$-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), R$^0$, R$^{00}$ each, independently of one another and on each occurrence identically or differently, denote H or alkyl having 1 to 12 C atoms, R$^y$ and R$^z$ each, independently of one another, denote H, F, CH$_3$ or CF$_3$, Z$^{M1}$ denotes —O—, —CO—, —C(R$^y$R$^z$)— or —CF$_2$CF$_2$—, Z$^{M2}$ and Z$^{M3}$ each, independently of one another, denote —CO—O—, —O—CO—, —CH$_2$O—, —OCH$_2$—, —CF$_2$O—, —OCF$_2$— or —(CH$_2$)$_n$—, where n is 2, 3 or 4, L on each occurrence, identically or differently, denotes F, Cl, CN, or straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, and x denotes 0 or 1.

Suitable polymerisable compounds are listed, for example, in Table D.

The liquid-crystalline media in accordance with the present application preferably comprise in total 0.1 to 10%, preferably 0.2 to 4.0%, particularly preferably 0.2 to 2.0%, of polymerisable compounds.

Particular preference is given to the polymerisable compounds of the formula M.

The mixtures according to the invention may furthermore comprise conventional additives, such as, for example, stabilisers, antioxidants, UV absorbers, nanoparticles, microparticles, etc.

The structure of the liquid-crystal displays according to the invention corresponds to the usual geometry, as described, for example, in EP-A 0 240 379.

The following examples are intended to explain the invention without limiting it. Above and below, percent data denote percent by weight; all temperatures are indicated in degrees Celsius.

Throughout the patent application, 1,4-cyclohexylene rings and 1,4-phenylene rings are depicted as follows:

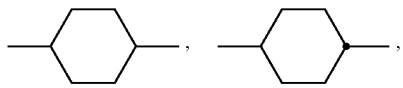

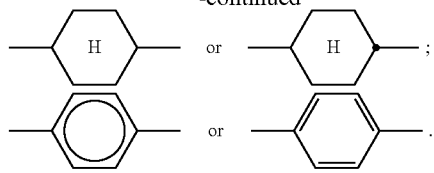

Besides the compounds of the formulae IIA and/or IIB and/or IIC, one or more compounds of the formula I, the mixtures according to the invention preferably comprise one or more of the compounds from Table A indicated below.

TABLE A

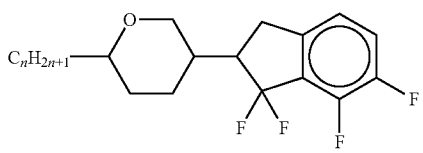

AIK-n-F

BCH-nm

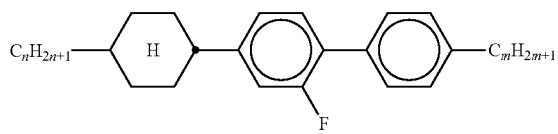

BCH-nmF

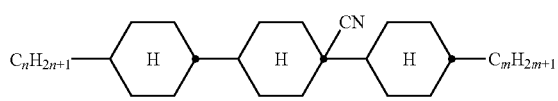

BCN-nm

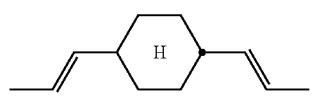

C-1V-V1

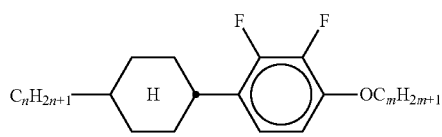

CY-n-Om

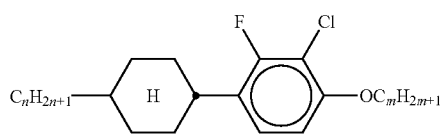

CY(F,Cl)-n-Om

TABLE A-continued
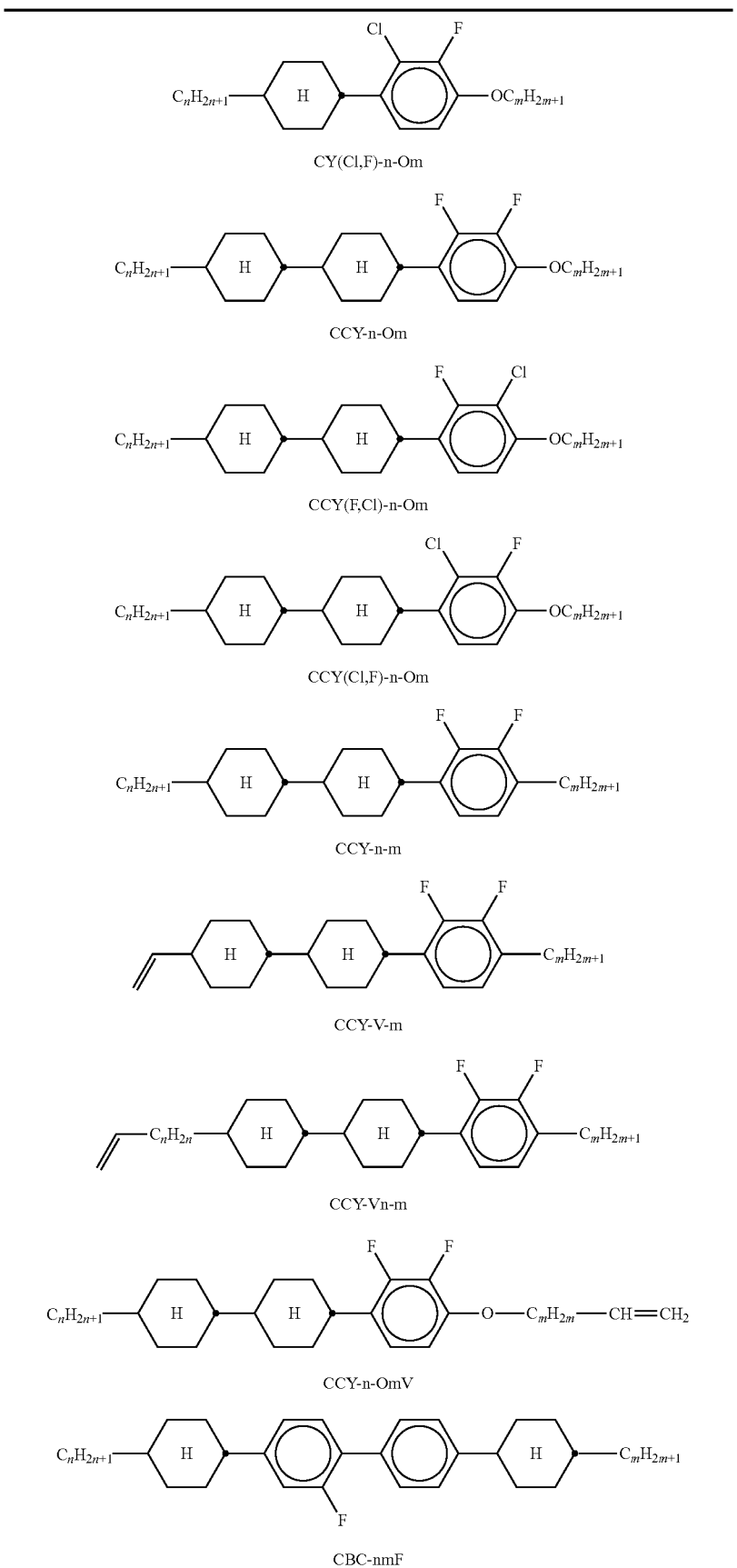

TABLE A-continued
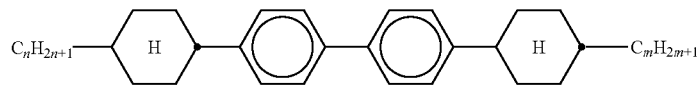
CBC-nm
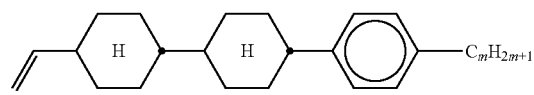
CCP-V-m
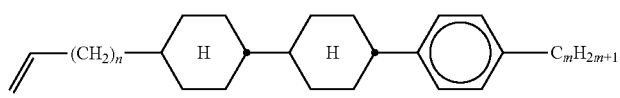
CCP-Vn-m
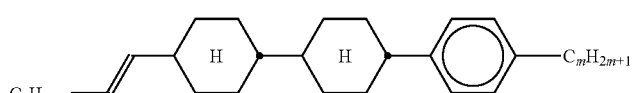
CCP-nV-m
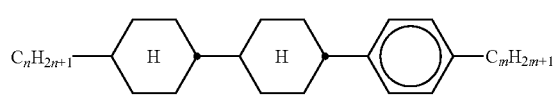
CCP-n-m
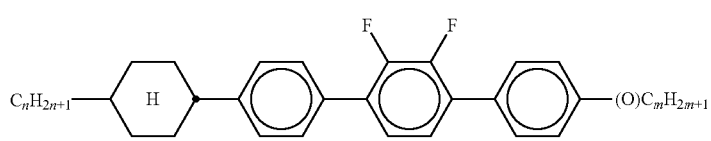
CPYP-n-(O)m
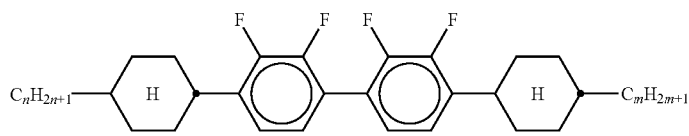
CYYC-n-m
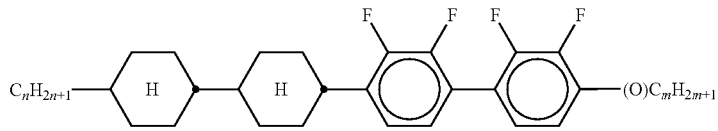
CCYY-n-(O)m
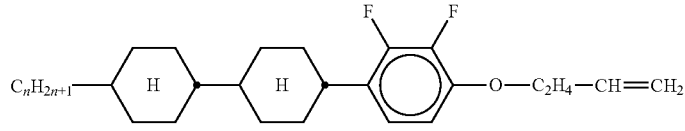
CCY-n-O2V
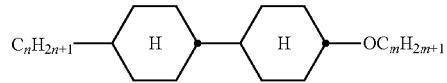
CCH-nOm TABLE A-continued
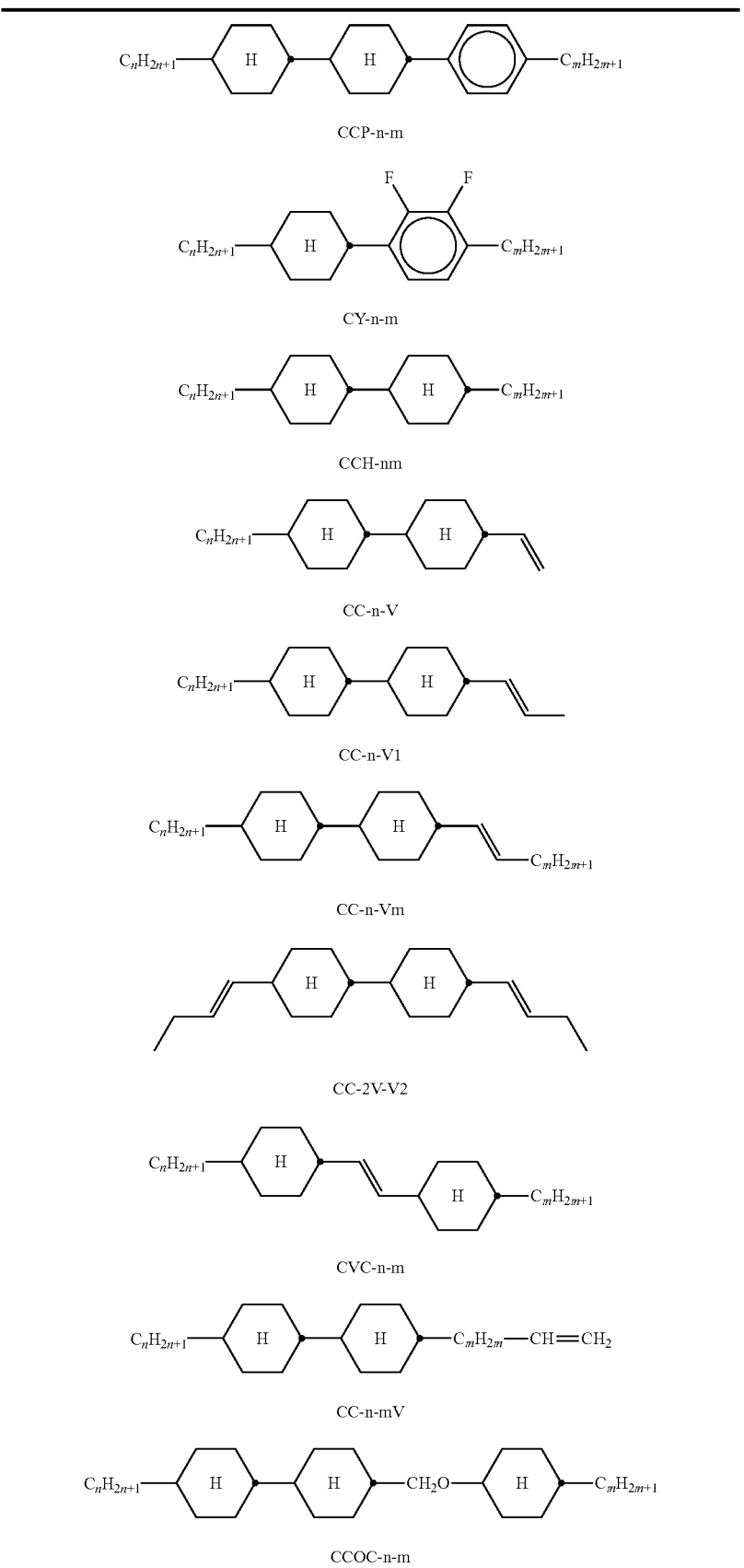

TABLE A-continued
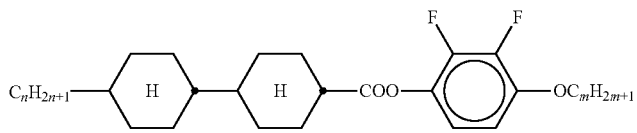
CP-nOmFF
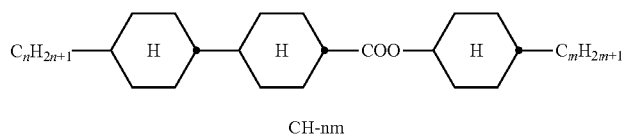
CH-nm
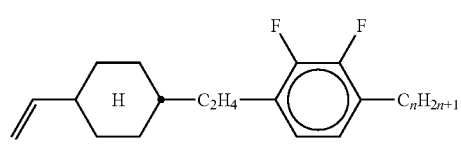
CEY-V-n
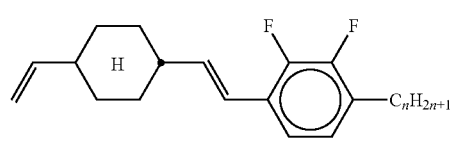
CVY-V-n
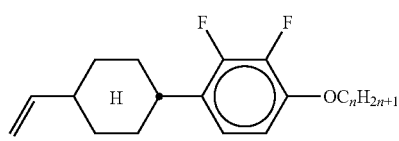
CY-V-On
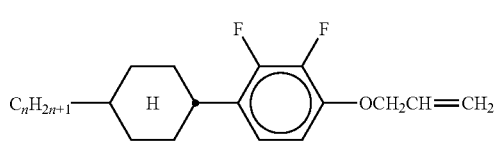
CY-n-O1V
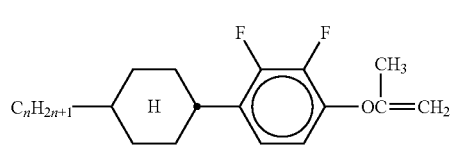
CY-n-OC(CH₃)=CH₂
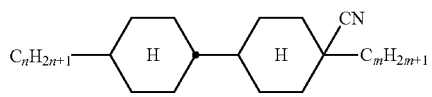
CCN-nm
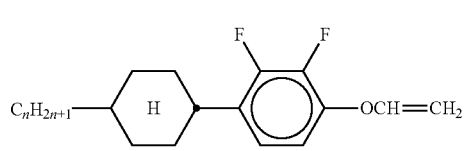
CY-n-OV TABLE A-continued
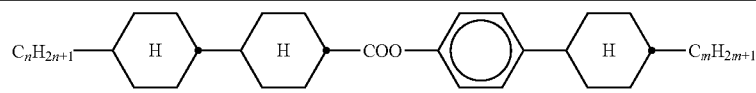
CCPC-nm
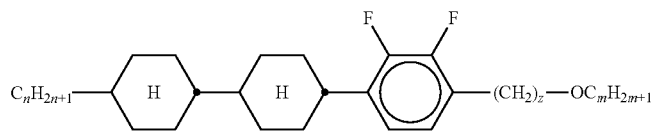
CCY-n-zOm
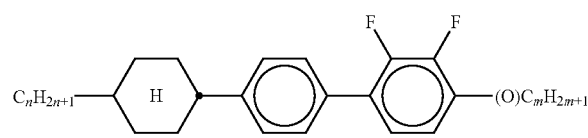
CPY-n-(O)m
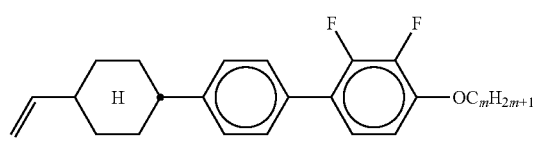
CPY-V-Om
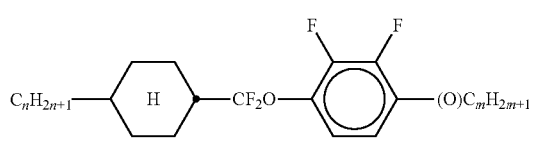
CQY-n-(O)m
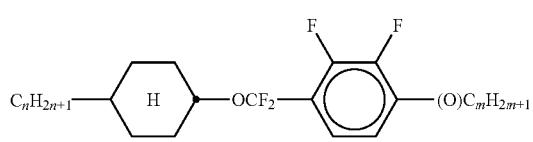
CQIY-n-(O)m
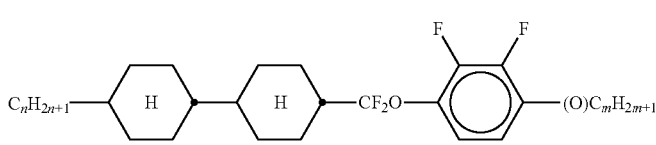
CCQY-n-(O)m
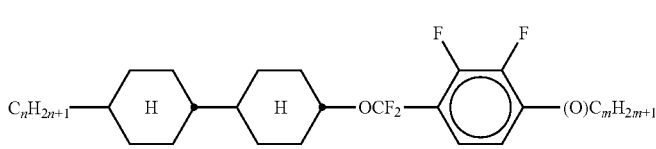
CCQIY-n-(O)m
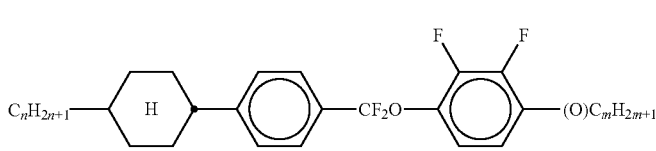
CPQY-n-(O)m TABLE A-continued
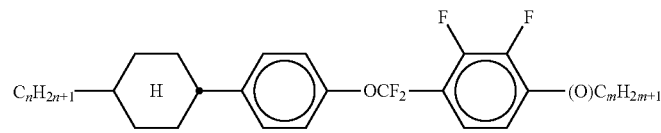
CPQIY-n-(O)m
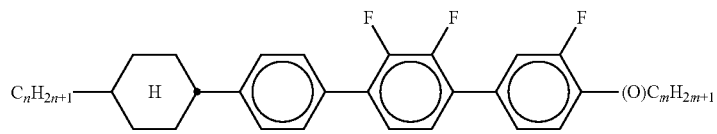
CPYG-n-(O)m
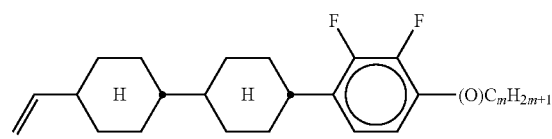
CCY-V-Om
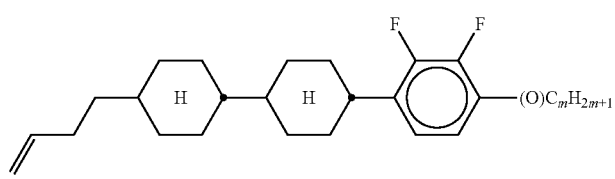
CCY-V2-(O)m
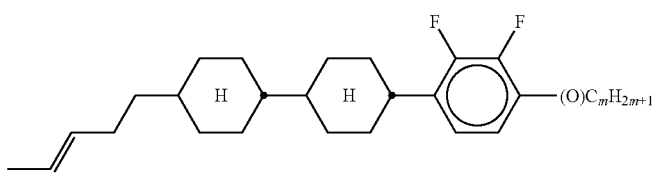
CCY-1V2-(O)m
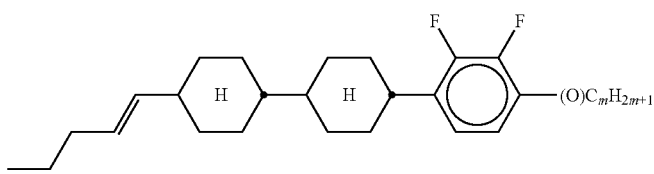
CCY-3V-(O)m
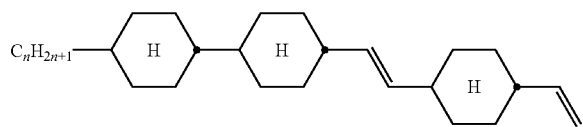
CCVC-n-V
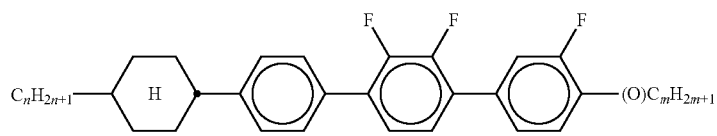
CPYG-n-(O)m TABLE A-continued
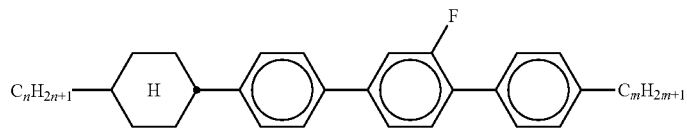
CPGP-n-m
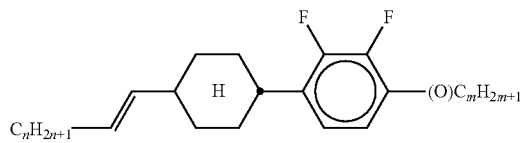
CY-nV-(O)m
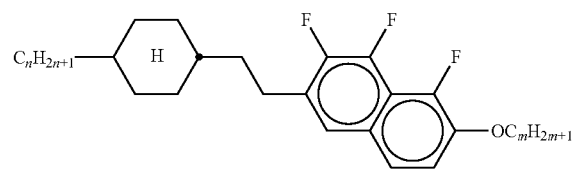
CENaph-n-Om
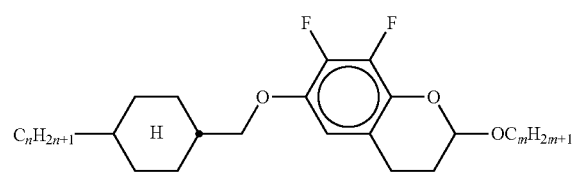
COChrom-n-Om
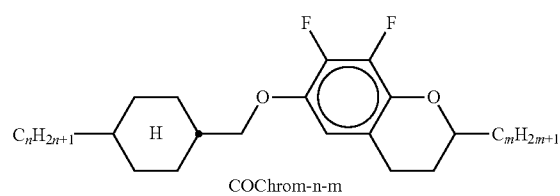
COChrom-n-m
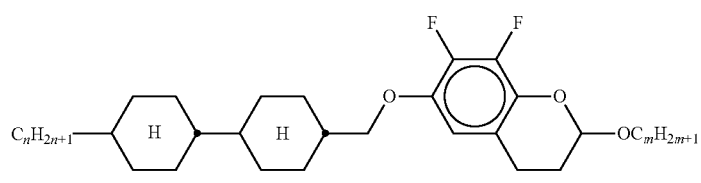
CCOChrom-n-Om
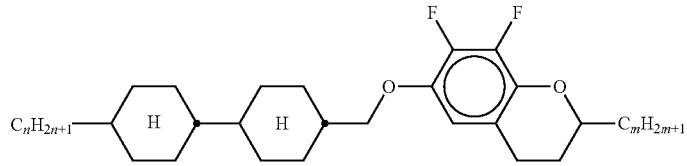
CCOChrom-n-m
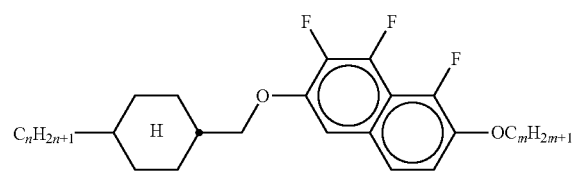
CONaph-n-Om TABLE A-continued
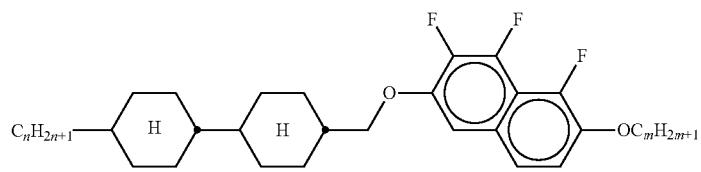
CCONaph-n-Om
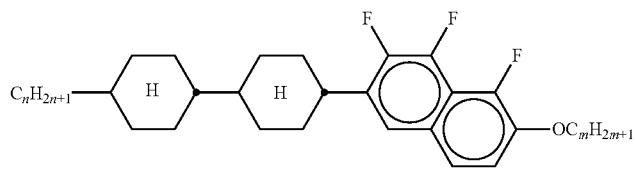
CCNaph-n-Om
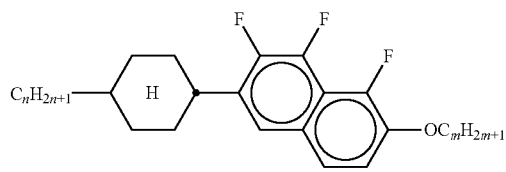
CNaph-n-Om
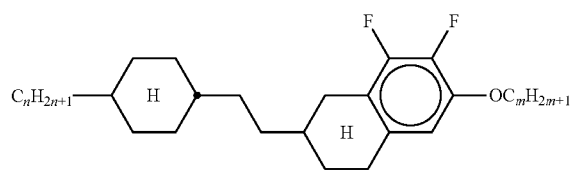
CETNaph-n-Om
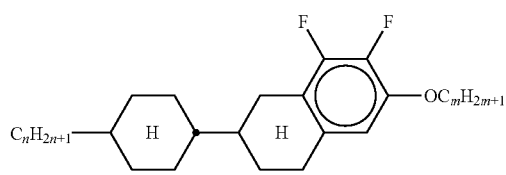
CTNaph-n-Om
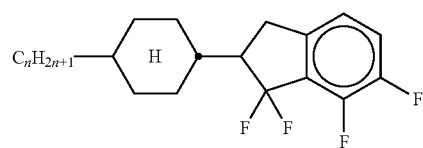
CK-n-F
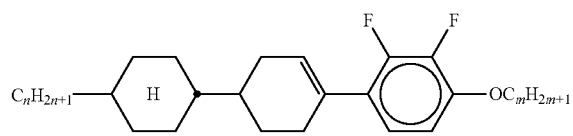
CLY-n-Om TABLE A-continued
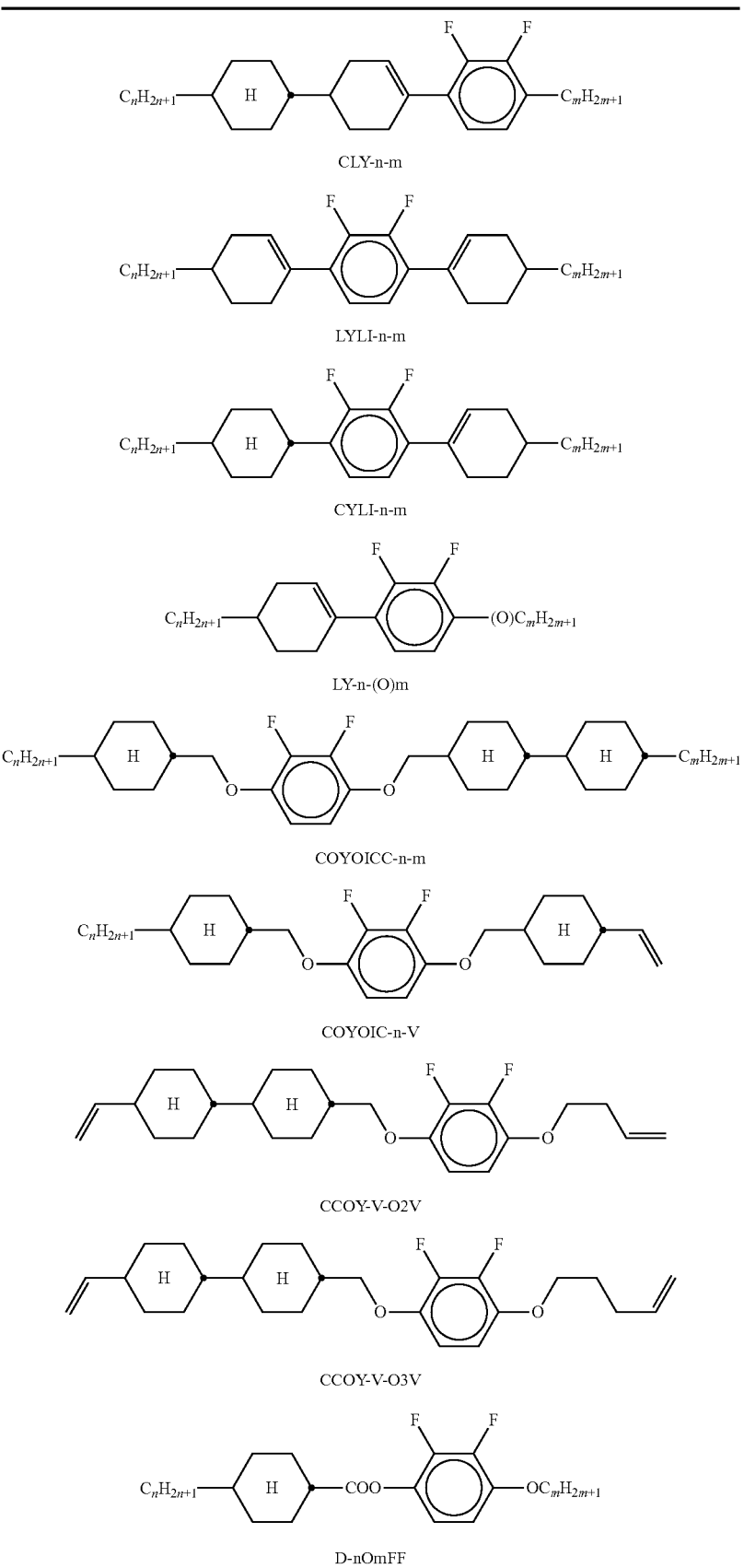

TABLE A-continued
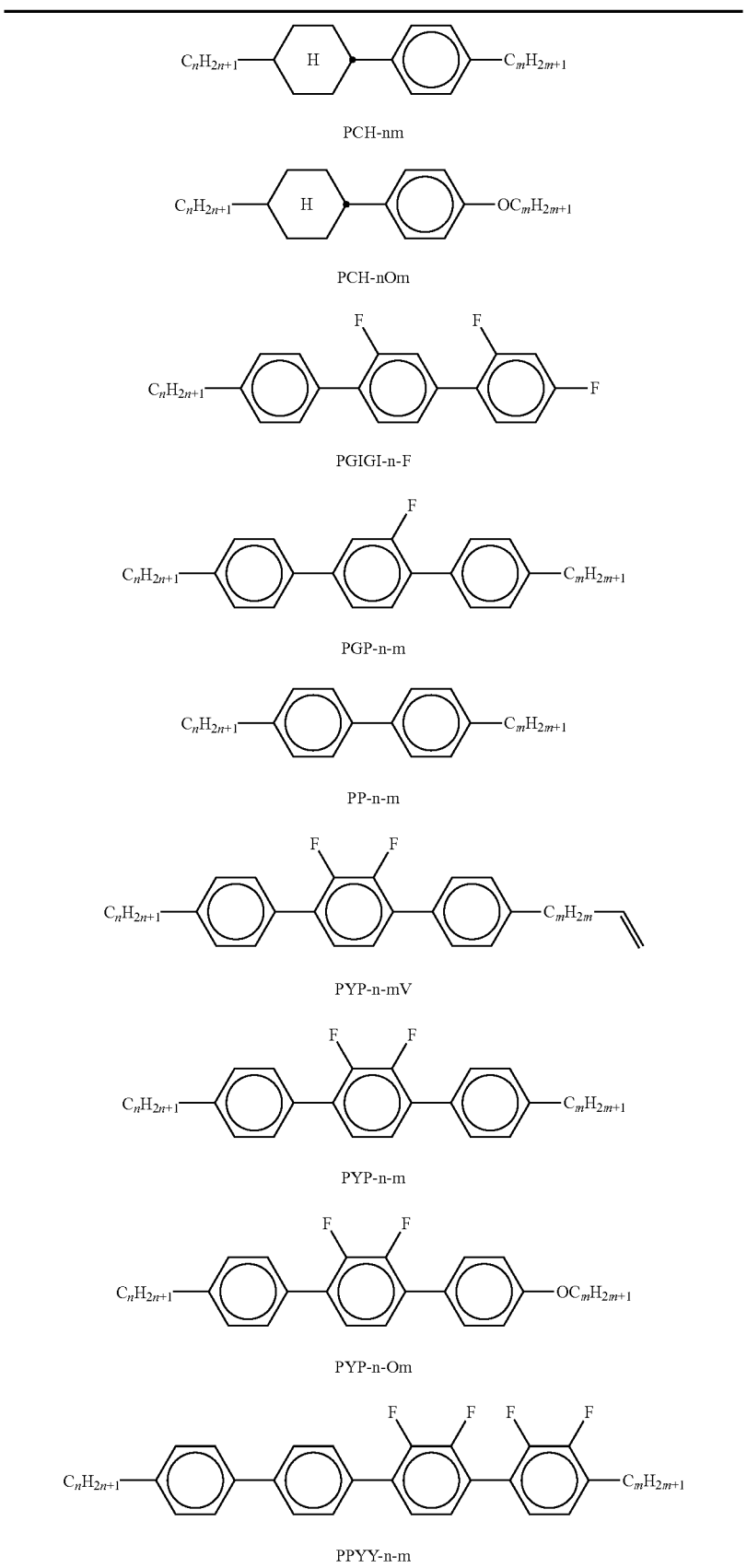

TABLE A-continued
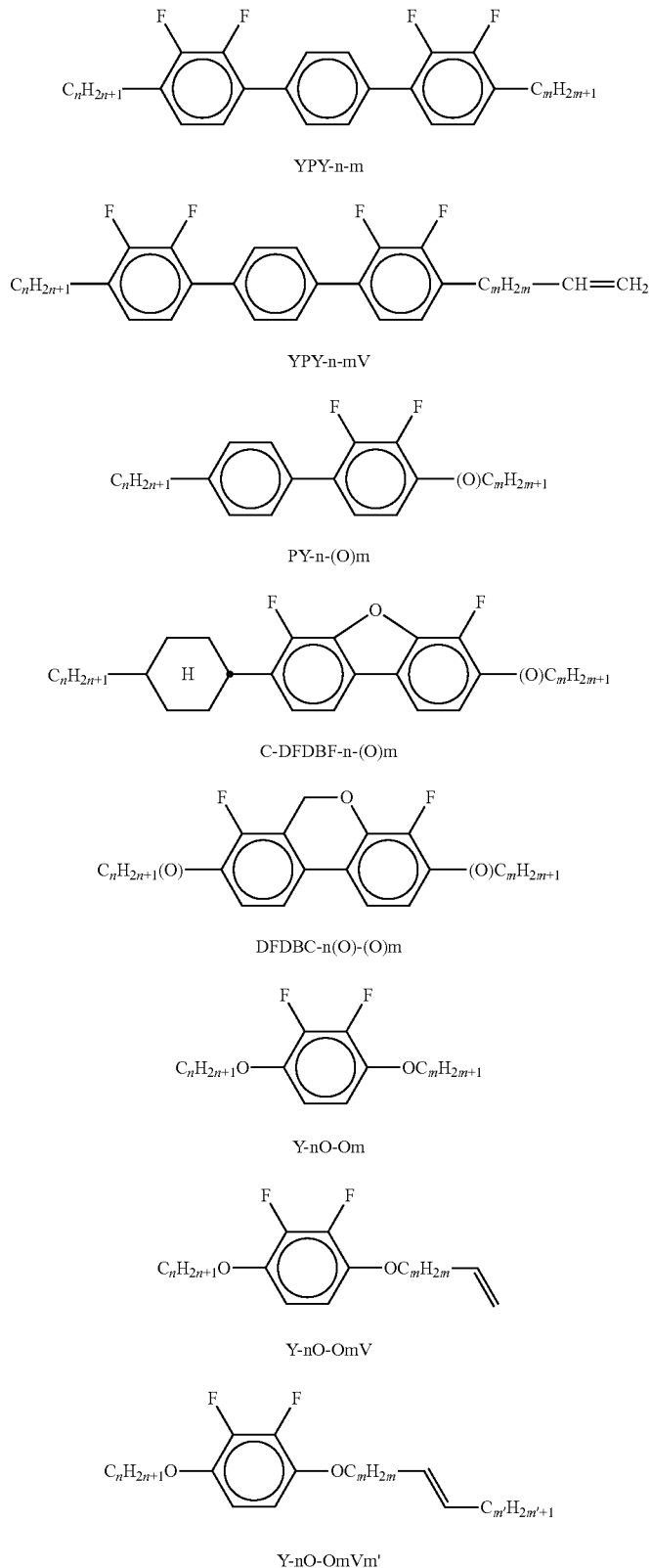
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, IPS, GH or ASM-VA LCD display that has been disclosed to date.

The dielectrics may also comprise further additives known to the person skilled in the art and described in the literature, such as, for example, UV absorbers, antioxidants, nanoparticles and free-radical scavengers. For example, 0-15% of pleochroic dyes, stabilisers or chiral dopants may be added. Suitable stabilisers for the mixtures according to the invention are, in particular, those listed in Table B.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table B shows possible dopants which can be added to the mixtures according to the invention. If the mixtures comprise a dopant, it is employed in amounts of 0.01-4% by weight, preferably 0.1-1.0% by weight.

TABLE B

C 15

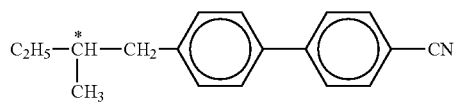

CB 15

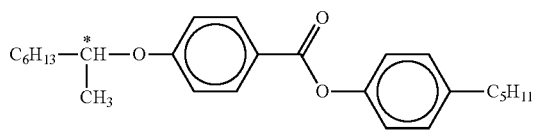

CM 21

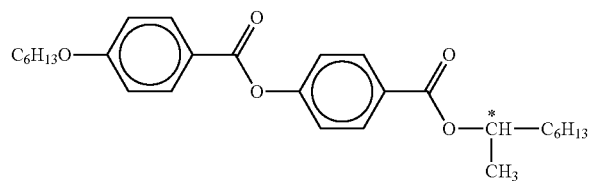

R/S-811

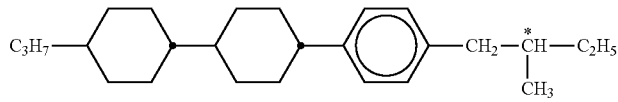

CM 44

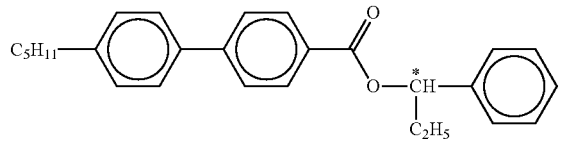

CM 45

TABLE B-continued
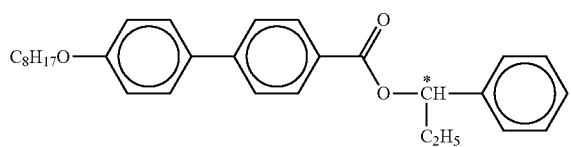
CM 47
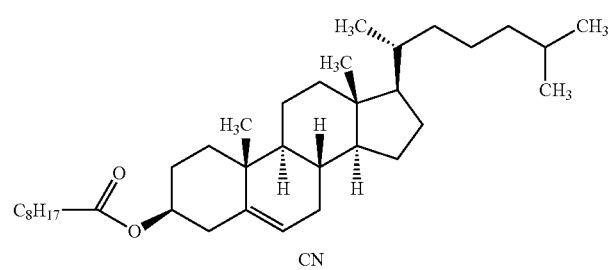
CN
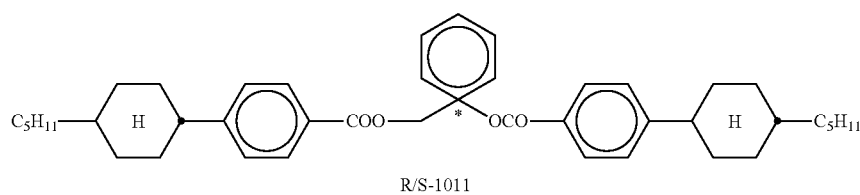
R/S-1011
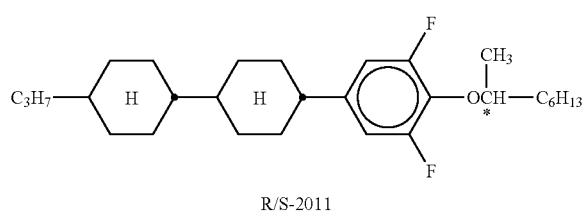
R/S-2011
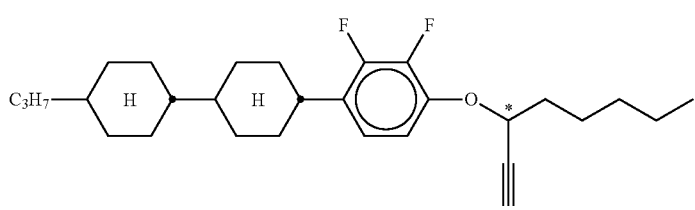
R/S-3011
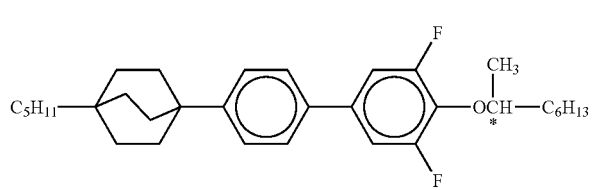
R/S-4011
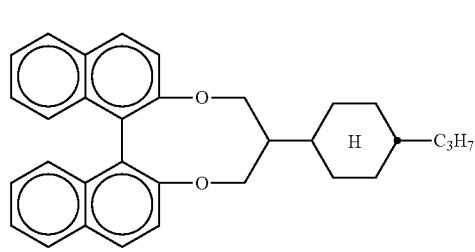
R/S-5011

Stabilisers which can be added, for example, to the mixtures according to the invention in amounts of up to 10% by weight, based on the total amount of the mixture, preferably 0.01 to 6% by weight, in particular 0.1 to 3% by weight, are shown below in Table C. Preferred stabilisers are, in particular, BHT derivatives, for example 2,6-di-tert-butyl-4-alkylphenols, and Tinuvin 770.
TABLE C
(n = 1-12)
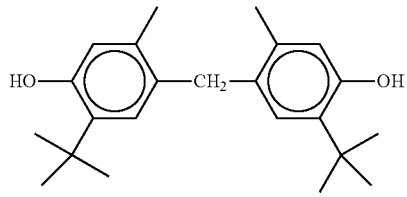
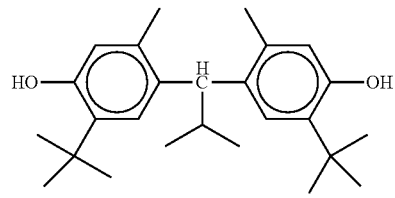
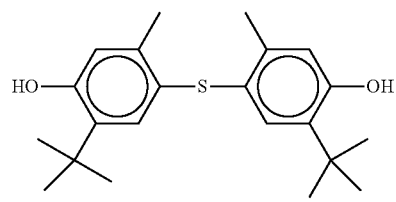
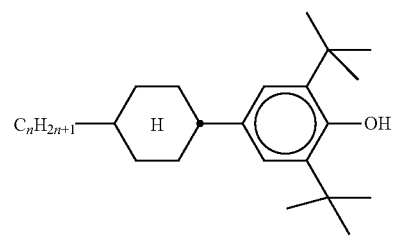
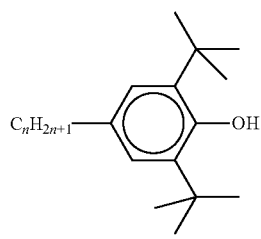
n = 1, 2, 3, 4, 5, 6 or 7
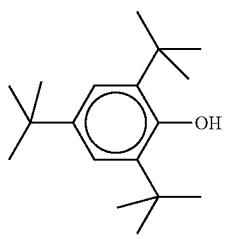
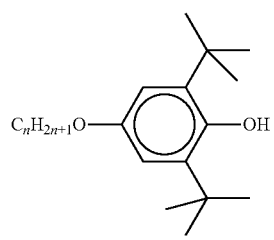
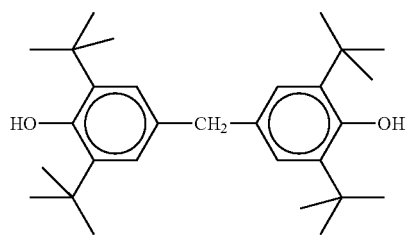
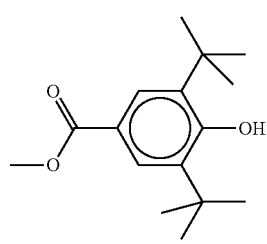
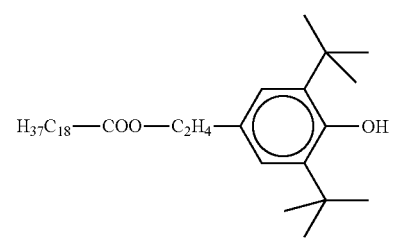
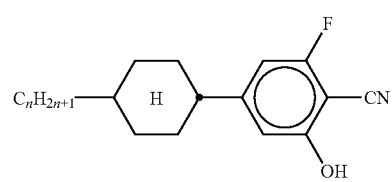
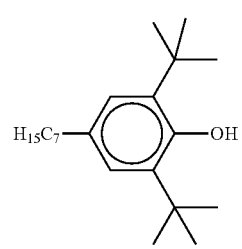

TABLE C-continued
(n = 1-12)
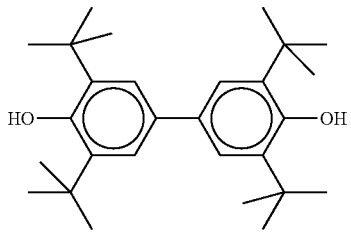
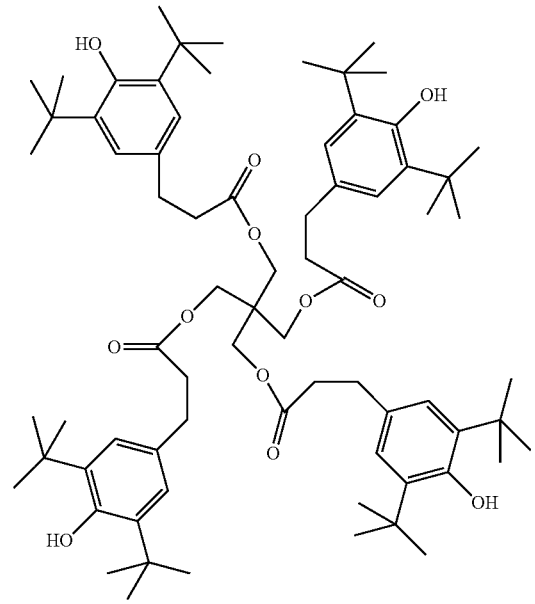 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
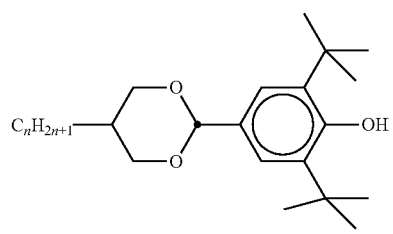
n = 1, 2, 3, 4, 5, 6 or 7
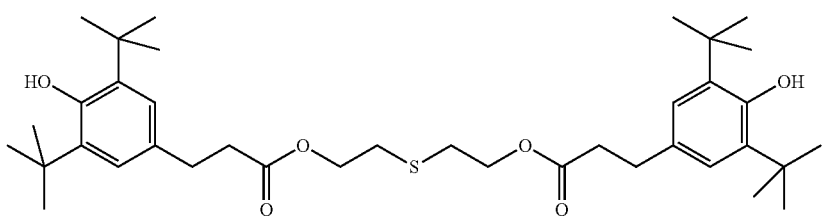 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
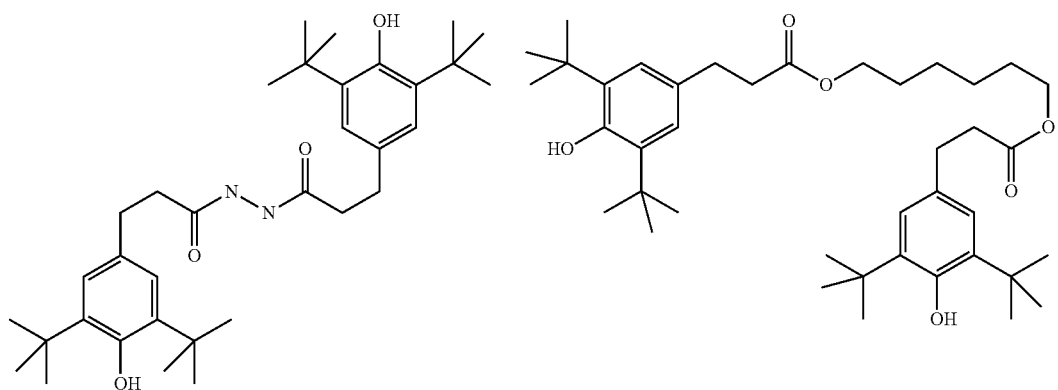

TABLE C-continued
(n = 1-12)
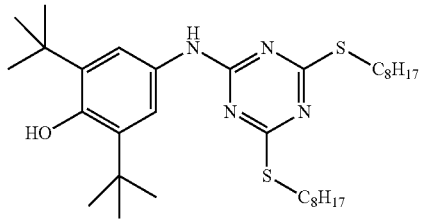
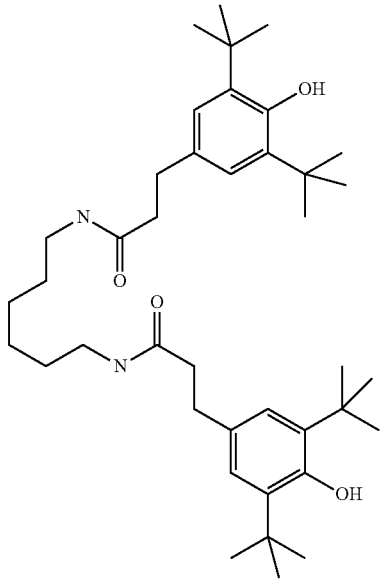 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
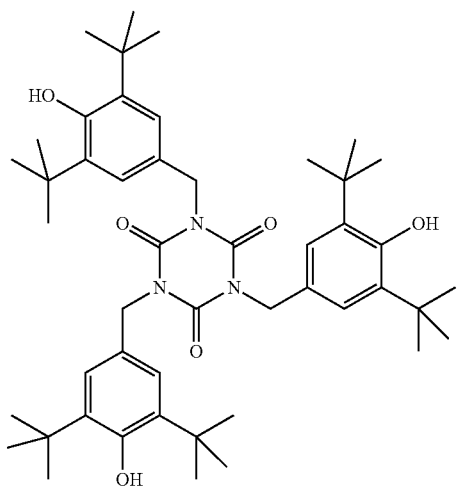 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
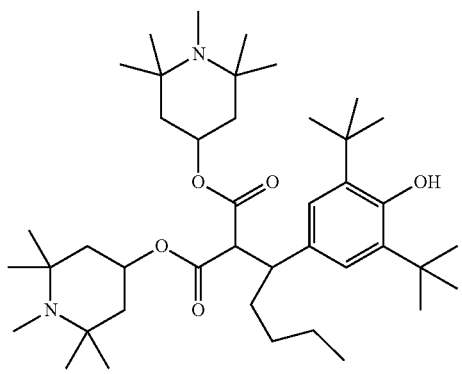 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
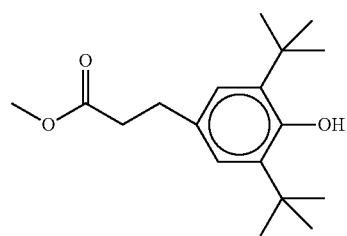
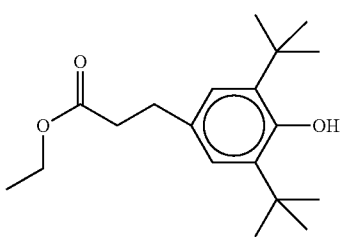
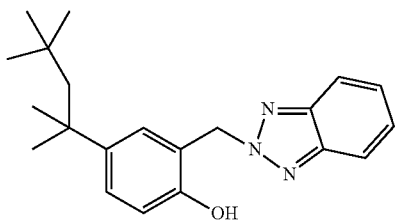 [SMILES: CC(C)(C)CC(C)(C)c1ccc(O)c(Cn2nc3ccccc3n2)c1]
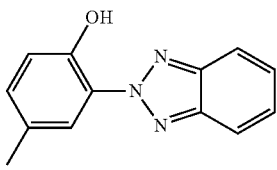 [SMILES: Cc1ccc(O)c(-n2nc3ccccc3n2)c1]

TABLE C-continued
(n = 1-12)
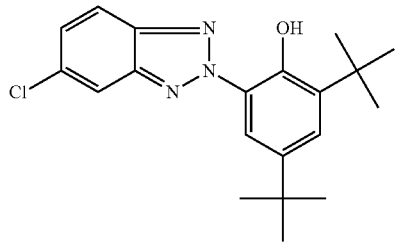 [SMILES: CC(C)(C)c1cc(-n2nc3ccc(Cl)cc3n2)c(O)c(C(C)(C)C)c1]
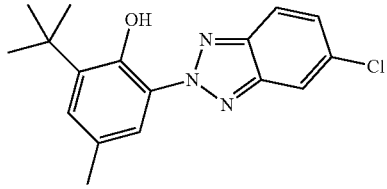 [SMILES: Cc1cc(-n2nc3ccc(Cl)cc3n2)c(O)c(C(C)(C)C)c1]
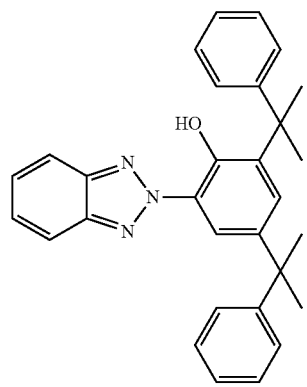 [SMILES: CC(C)(c1ccccc1)c1cc(-n2nc3ccccc3n2)c(O)c(C(C)(C)c2ccccc2)c1]
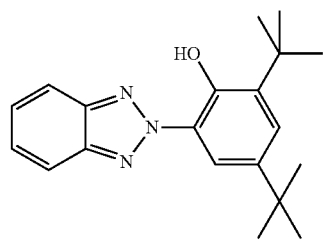 [SMILES: CC(C)(C)c1cc(-n2nc3ccccc3n2)c(O)c(C(C)(C)C)c1]
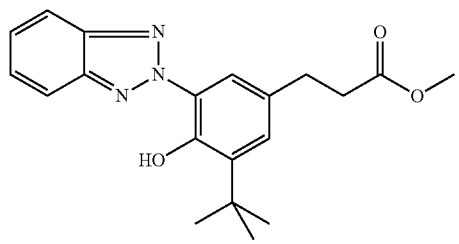 [SMILES: COC(=O)CCc1cc(-n2nc3ccccc3n2)c(O)c(C(C)(C)C)c1]
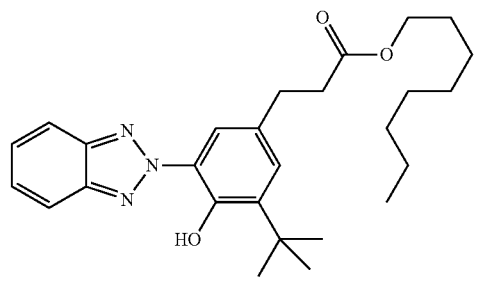 [SMILES: CCCCCCCCOC(=O)CCc1cc(-n2nc3ccccc3n2)c(O)c(C(C)(C)C)c1]
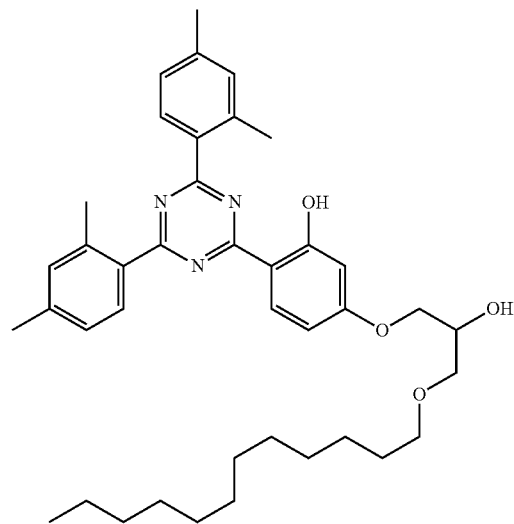 [SMILES: CCCCCCCCCCCCOCC(O)COc1ccc(-c2nc(-c3ccc(C)cc3C)nc(-c3ccc(C)cc3C)n2)c(O)c1]

TABLE C-continued
(n = 1-12)
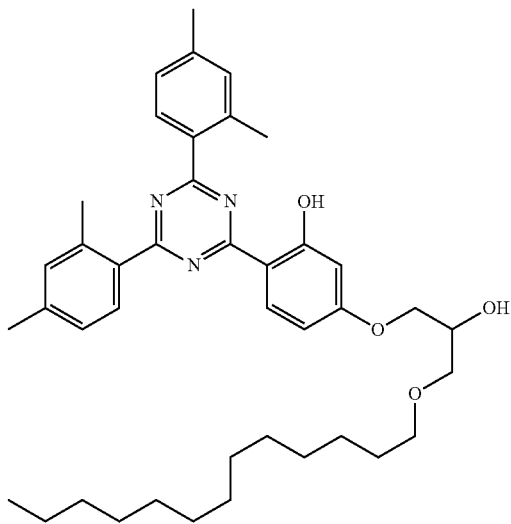 [SMILES: CCCCCCCCCCCCCOCC(O)COc1ccc(-c2nc(-c3ccc(C)cc3C)nc(-c3ccc(C)cc3C)n2)c(O)c1]
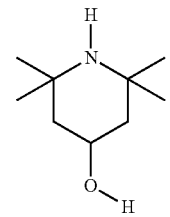
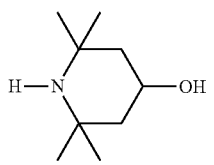
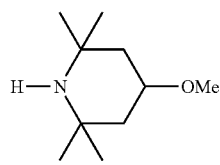
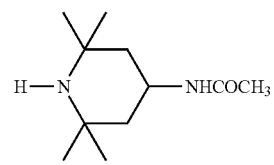
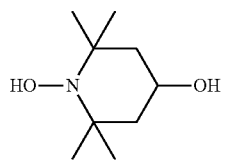
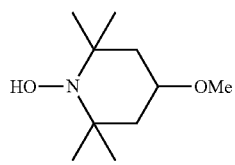
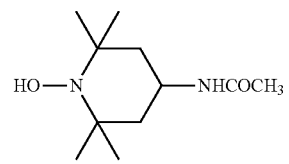
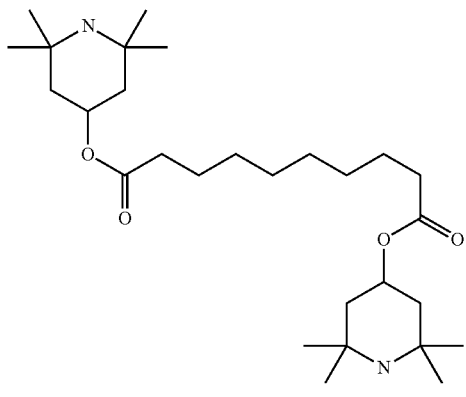
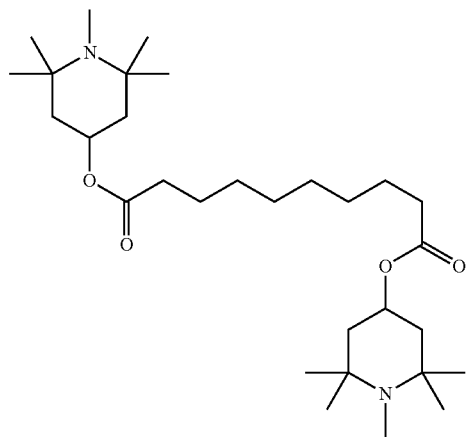
Suitable reactive mesogens for use in the mixtures according to the invention, preferably in PSA and PS-VA applications are shown in Table D below:

TABLE D
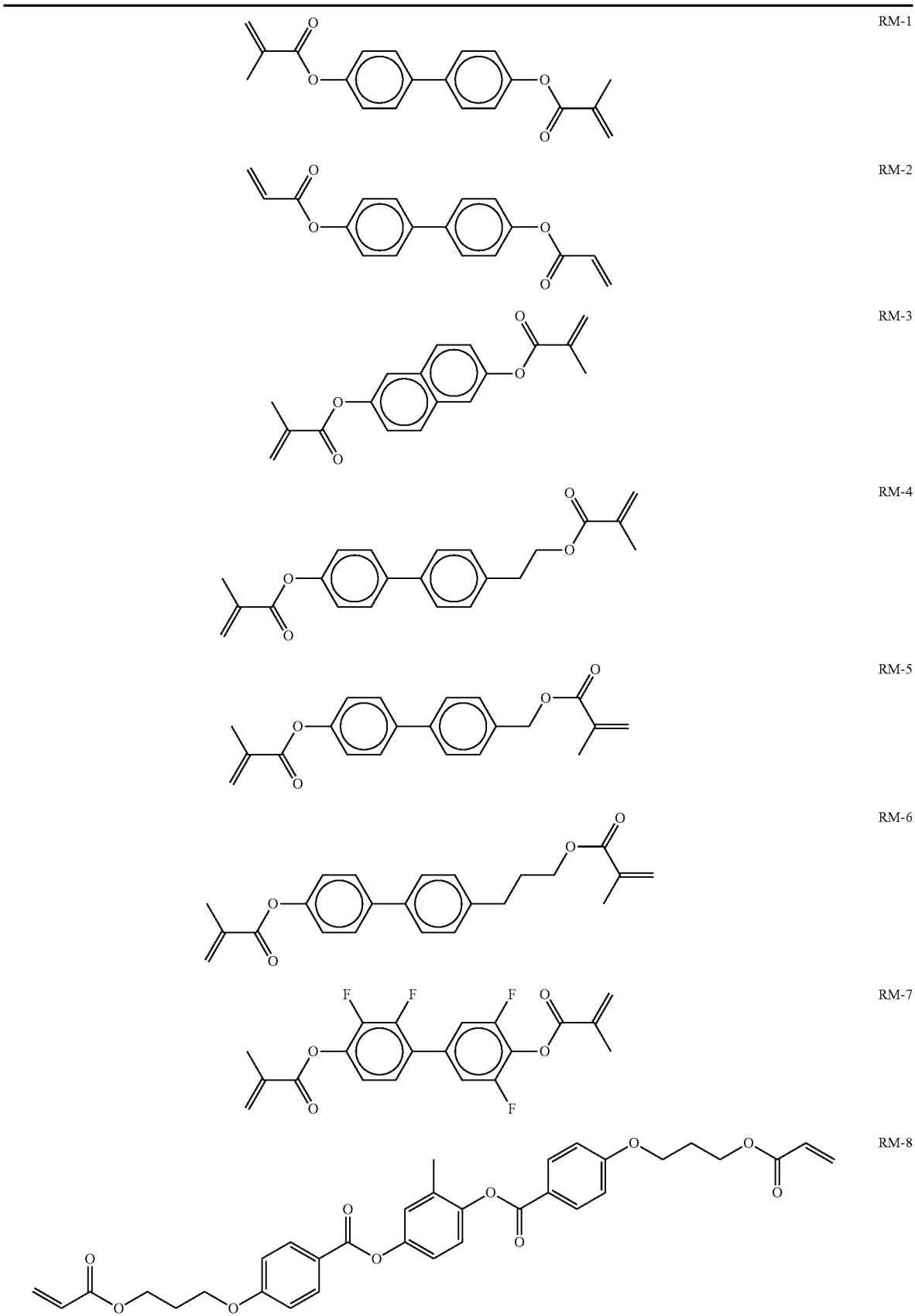

TABLE D-continued
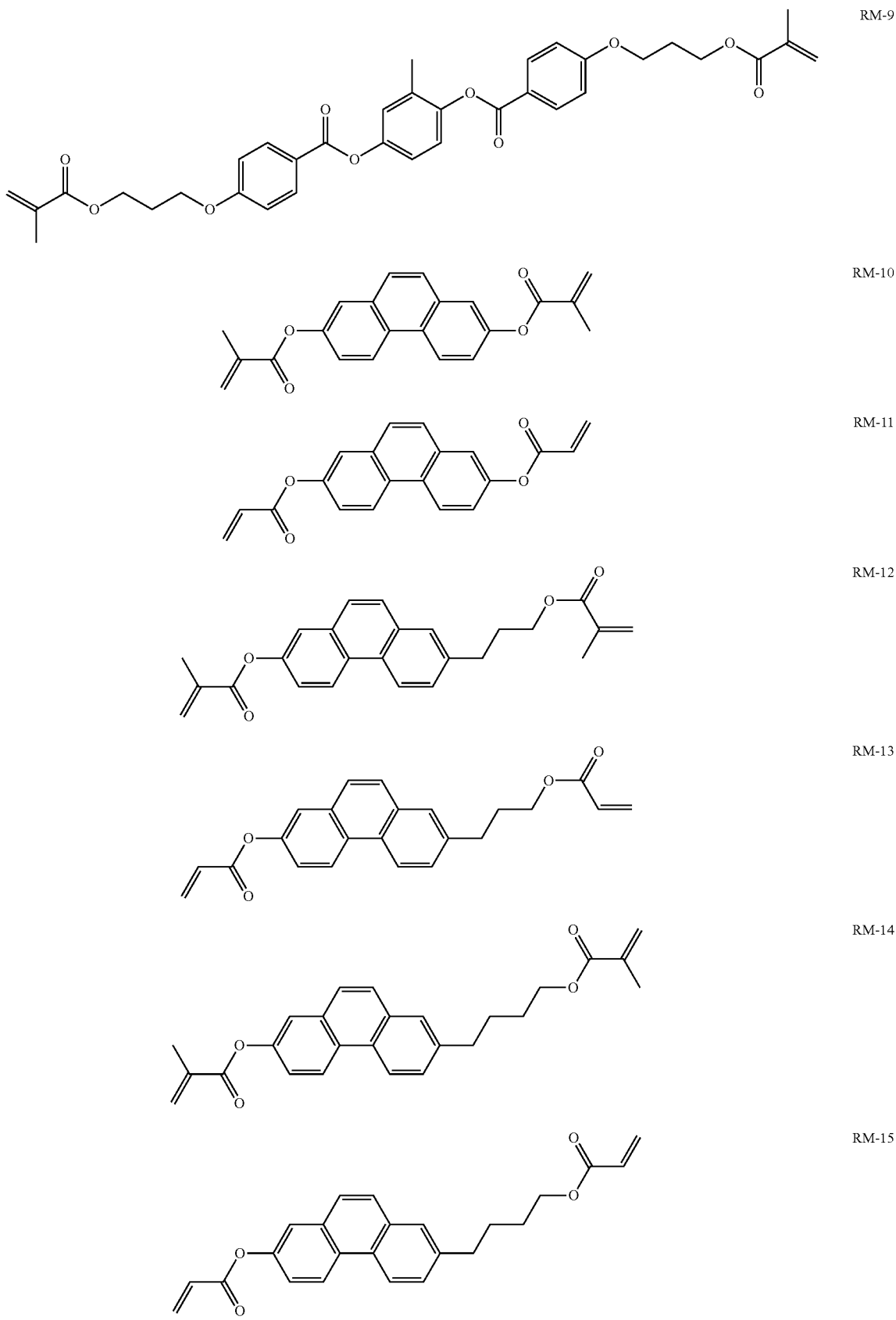

TABLE D-continued
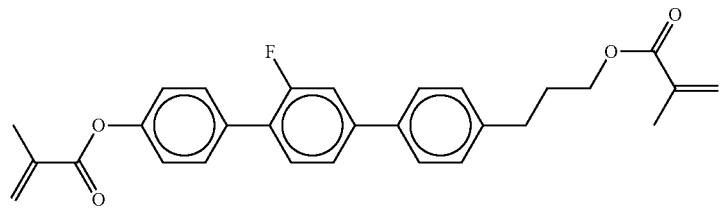 RM-16
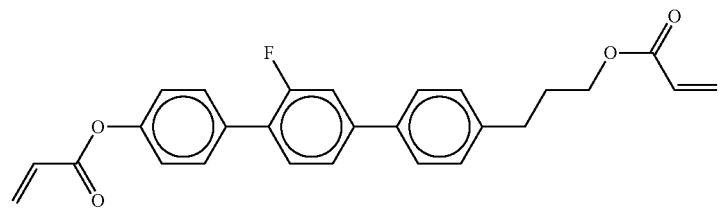 RM-17
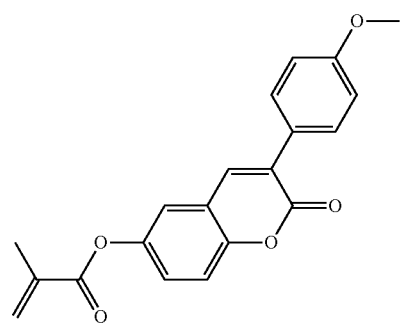 [SMILES: C=C(C)C(=O)Oc1ccc2oc(=O)c(-c3ccc(OC)cc3)cc2c1] RM-18
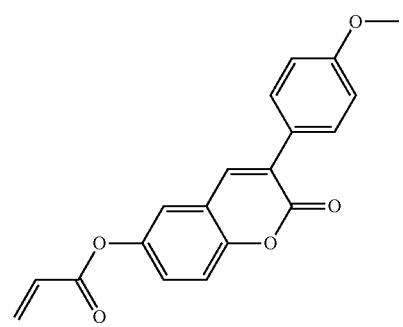 [SMILES: C=CC(=O)Oc1ccc2oc(=O)c(-c3ccc(OC)cc3)cc2c1] RM-19
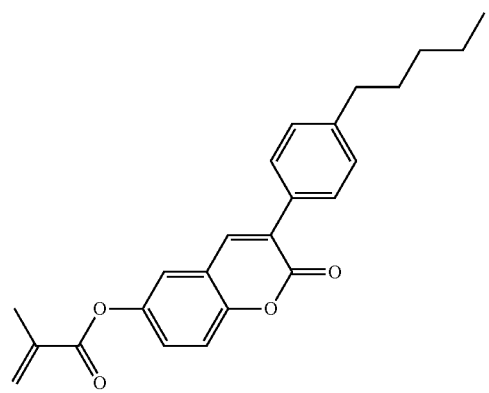 [SMILES: C=C(C)C(=O)Oc1ccc2oc(=O)c(-c3ccc(CCCCC)cc3)cc2c1] RM-20

TABLE D-continued
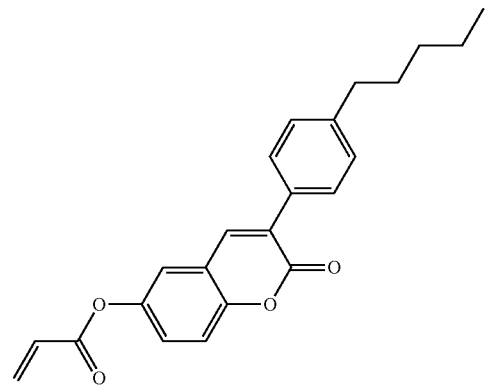 [SMILES: C=CC(=O)Oc1ccc2oc(=O)c(-c3ccc(CCCCC)cc3)cc2c1] RM-21
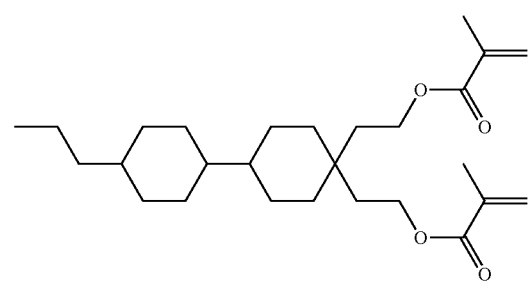 [SMILES: C=C(C)C(=O)OCCC1(CCOC(=O)C(=C)C)CCC(C2CCC(CCC)CC2)CC1] RM-22
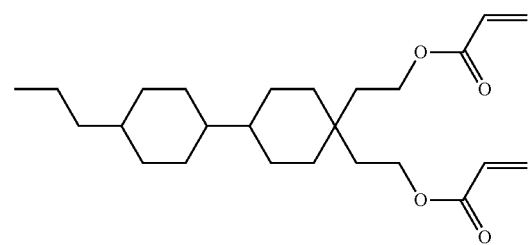 [SMILES: C=CC(=O)OCCC1(CCOC(=O)C=C)CCC(C2CCC(CCC)CC2)CC1] RM-23
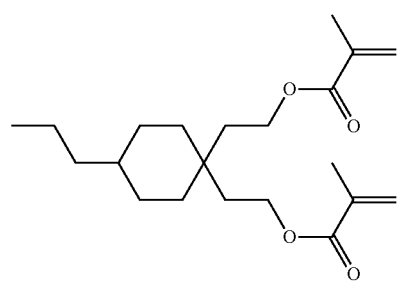 [SMILES: C=C(C)C(=O)OCCC1(CCOC(=O)C(=C)C)CCC(CCC)CC1] RM-24
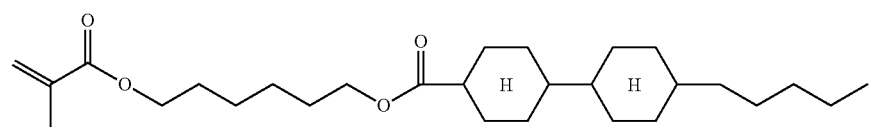 RM-25
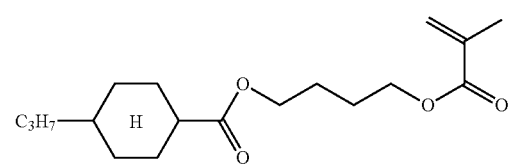 RM-26

TABLE D-continued
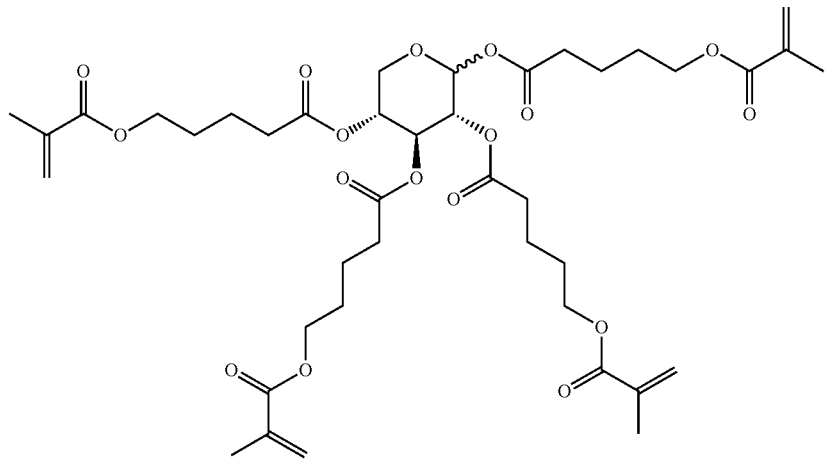 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-27
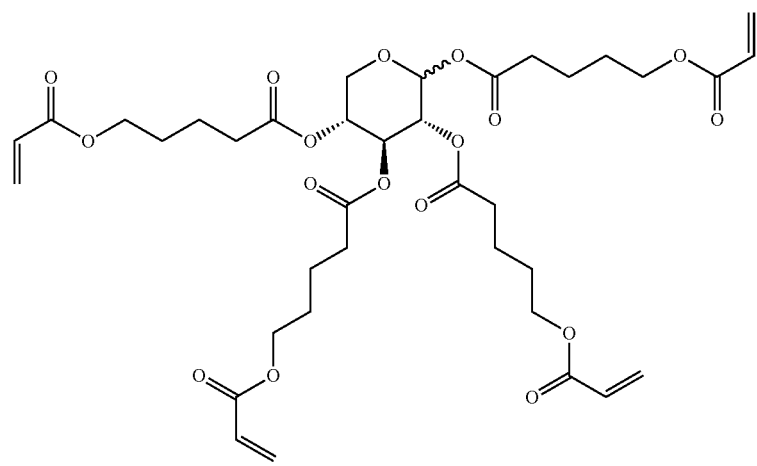 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-28
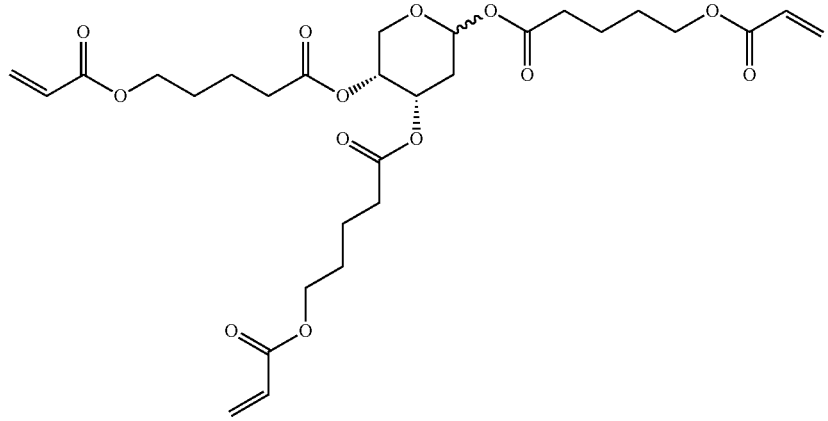 [SMILES: C=CC(=O)OCCCCC(=O)OC1C[C@H](OC(=O)CCCCOC(=O)C=C)[C@H](OC(=O)CCCCOC(=O)C=C)CO1]
RM-29
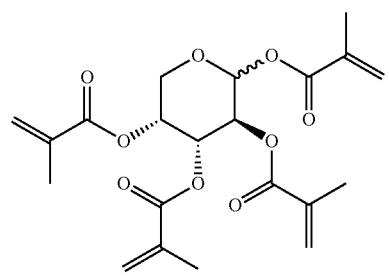 [SMILES: C=C(C)C(=O)OC1OC[C@@H](OC(=O)C(=C)C)[C@@H](OC(=O)C(=C)C)[C@@H]1OC(=O)C(=C)C]
RM-30

TABLE D-continued

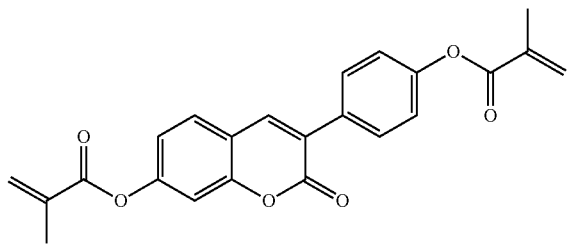 [SMILES: C=C(C)C(=O)Oc1ccc(-c2cc3ccc(OC(=O)C(=C)C)cc3oc2=O)cc1]

RM-31

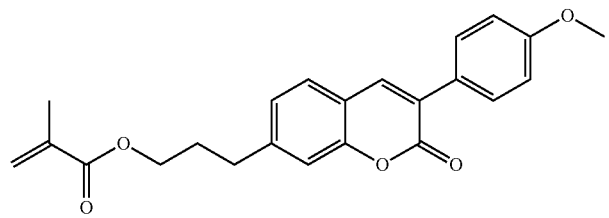 [SMILES: C=C(C)C(=O)OCCCc1ccc2cc(-c3ccc(OC)cc3)c(=O)oc2c1]

RM-32

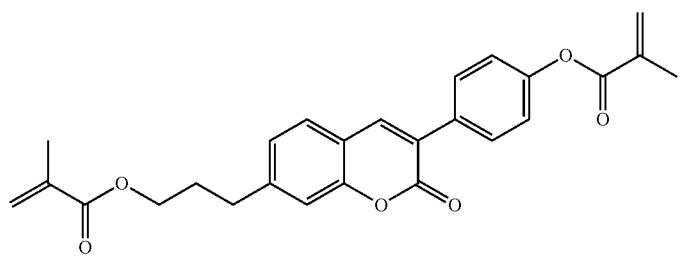 [SMILES: C=C(C)C(=O)OCCCc1ccc2cc(-c3ccc(OC(=O)C(=C)C)cc3)c(=O)oc2c1]

RM-33

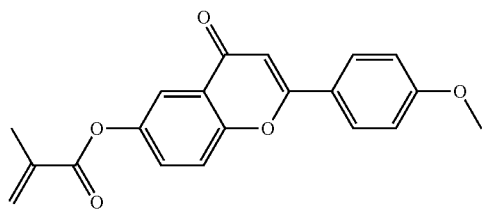 [SMILES: C=C(C)C(=O)Oc1ccc2oc(-c3ccc(OC)cc3)cc(=O)c2c1]

RM-34

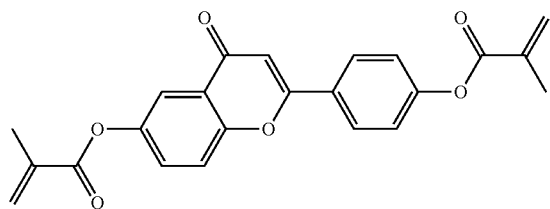 [SMILES: C=C(C)C(=O)Oc1ccc(-c2cc(=O)c3cc(OC(=O)C(=C)C)ccc3o2)cc1]

RM-35

WORKING EXAMPLES

The following examples are intended to explain the invention without restricting it. In the examples, m.p. denotes the melting point and C denotes the clearing point of a liquid-crystalline substance in degrees Celsius; boiling points are denoted by b.p. Furthermore:

C denotes crystalline solid state, S denotes smectic phase (the index denotes the phase type), N denotes nematic state, Ch denotes cholesteric phase, I denotes isotropic phase, $T_g$ denotes glass transition temperature. The number between two symbols indicates the conversion temperature in degrees Celsius.

The host mixture used for determination of the optical anisotropy Δn of the compounds of the formula I is the commercial mixture ZLI-4792 (Merck KGaA). The dielectric anisotropy Δε is determined using commercial mixture ZLI-2857. The physical data of the compound to be investigated are obtained from the change in the dielectric constants of the host mixture after addition of the compound to be investigated and extrapolation to 100% of the compound employed. In general, 10% of the compound to be investigated are dissolved in the host mixture, depending on the solubility.

Unless indicated otherwise, parts or percent data denote parts by weight or percent by weight.

Conventional work-up means: water is added, the mixture is extracted with methylene chloride, the phases are separated, the organic phase is dried and evaporated, and the product is purified by crystallisation and/or chromatography.

Example 1

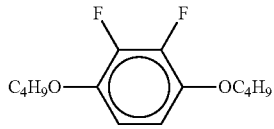

100 g (0.54 mol) of 2,3-difluorobutoxybenzene are initially introduced in 750 ml of THF and cooled to −70° C. 360 ml of a 1.6 M solution (0.57 mol) of n-butyllithium in hexane are then added dropwise. The mixture is stirred at −70° C. for a one further hour, and 66 ml (0.59 mol) of trimethyl borate in 100 ml of THF are subsequently added dropwise. The batch is warmed to 0° C., and 46 ml of glacial acetic acid and 100 ml of water are added. 140 ml of hydrogen peroxide (30%) are then added dropwise at 30° C. During this addition, the reaction mixture warms to about 45° C. The mixture is allowed to cool to room temperature and is stirred for a further 1 h, before being subjected to conventional work-up. This gives 78 g of crude product, which, without further purification, is dissolved in 200 ml of ethyl methyl ketone, and 0.4 mol of n-butyl bromide and 0.5 mol of potassium carbonate are added. The mixture is boiled under reflux overnight and subjected to conventional work-up. The final purification is carried out by distillation at 0.5 mbar and a boiling point of 107-110° C.

C −8 I; $\Delta n$=0.0832; $\Delta \epsilon$=−8.6

The following compounds of the formula

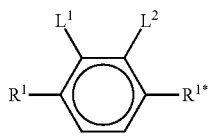

are prepared analogously:

| $R^1$ | $R^{1*}$ | $L^1$ | $L^2$ | |
|---|---|---|---|---|
| $C_2H_5O$ | $OC_3H_7$ | F | F | $T_g$ −77 I; $\Delta n$ = 0.0802; $\Delta \epsilon$ = −8.7 |
| $C_2H_5O$ | $OC_4H_9$ | F | F | $T_g$ −80 C −19 I; $\Delta n$ = 0.0876; $\Delta \epsilon$ = −9.4 |
| $C_2H_5O$ | $OC_5H_{11}$ | F | F | $T_g$ −81 C −8 I; $\Delta n$ = 0.0838; $\Delta \epsilon$ = −8.2 |
| $C_2H_5O$ | $OC_6H_{13}$ | F | F | C 8 I; $\Delta n$ = 0.0880; $\Delta \epsilon$ = −8.4 |
| $C_2H_5O$ | $OC_3H_7$ | F | Cl | |
| $C_2H_5O$ | $OC_4H_9$ | F | Cl | |
| $C_2H_5O$ | $OC_5H_{11}$ | F | Cl | |
| $C_2H_5O$ | $OC_6H_{13}$ | F | Cl | |
| $C_2H_5O$ | $OC_3H_7$ | Cl | F | |
| $C_2H_5O$ | $OC_4H_9$ | Cl | F | |
| $C_2H_5O$ | $OC_5H_{11}$ | Cl | F | |
| $C_2H_5O$ | $OC_6H_{13}$ | Cl | F | |
| $C_3H_7O$ | $OC_3H_7$ | F | F | C 0 I; $\Delta n$ = 0.0785; $\Delta \epsilon$ = −7.8 |
| $C_3H_7O$ | $OC_4H_9$ | F | F | C −12 I; $\Delta n$ = 0.0797; $\Delta \epsilon$ = −8.3 |
| $C_3H_7O$ | $OC_5H_{11}$ | F | F | C 4 I; $\Delta n$ = 0.0776; $\Delta \epsilon$ = −7.7 |
| $C_3H_7O$ | $OC_6H_{13}$ | F | F | C 4 I; $\Delta n$ = 0.0787; $\Delta \epsilon$ = −7.2 |
| $C_3H_7O$ | $OC_3H_7$ | F | Cl | |
| $C_3H_7O$ | $OC_4H_9$ | F | Cl | |
| $C_3H_7O$ | $OC_5H_{11}$ | F | Cl | |
| $C_3H_7O$ | $OC_6H_{13}$ | F | Cl | |
| $C_3H_7O$ | $OC_3H_7$ | Cl | F | |
| $C_3H_7O$ | $OC_4H_9$ | Cl | F | |
| $C_3H_7O$ | $OC_5H_{11}$ | Cl | F | |
| $C_3H_7O$ | $OC_6H_{13}$ | Cl | F | |
| $C_4H_9O$ | $OC_5H_{11}$ | F | F | C −6 I; $\Delta n$ = 0.0783; $\Delta \epsilon$ = −8.1 |
| $C_4H_9O$ | $OC_6H_{13}$ | F | F | C 1 I; $\Delta n$ = 0.0859; $\Delta \epsilon$ = −8.0 |
| $C_4H_9O$ | $OC_4H_9$ | F | Cl | |
| $C_4H_9O$ | $OC_5H_{11}$ | F | Cl | |
| $C_4H_9O$ | $OC_6H_{13}$ | F | Cl | |
| $C_4H_9O$ | $OC_4H_9$ | Cl | F | |
| $C_4H_9O$ | $OC_5H_{11}$ | Cl | F | |
| $C_4H_9O$ | $OC_6H_{13}$ | Cl | F | |
| $C_5H_{11}O$ | $OC_5H_{11}$ | F | F | C 21 I; $\Delta n$ = 0.0755; $\Delta \epsilon$ = −7.8 |
| $C_5H_{11}O$ | $OC_6H_{13}$ | F | F | C −1 I; $\Delta n$ = 0.0771; $\Delta \epsilon$ = −7.7 |
| $C_5H_{11}O$ | $OC_5H_{11}$ | F | Cl | |
| $C_5H_{11}O$ | $OC_6H_{13}$ | F | Cl | |
| $C_5H_{11}O$ | $OC_5H_{11}$ | Cl | F | |
| $C_5H_{11}O$ | $OC_6H_{13}$ | Cl | F | |
| $C_6H_{13}O$ | $OC_6H_{13}$ | F | F | C 17 I; $\Delta n$ = 0.0853; $\Delta \epsilon$ = −7.8 |
| $C_6H_{13}O$ | $OC_6H_{13}$ | F | Cl | |
| $C_6H_{13}O$ | $OC_6H_{13}$ | Cl | F | |

Example 2

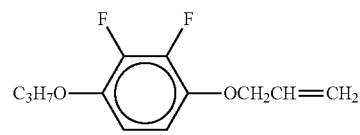

10 g of 4-propoxy-2,3-difluorophenol (53 mmol) are boiled under reflux overnight with 8.4 g of 3-bromo-1-propene (69 mmol) and 8.1 g of potassium carbonate. The mixture is subjected to conventional work-up, and the residue is distilled at 0.5 mbar and a boiling point of 88-90° C.

$T_g$ −86 C −38 I; $\Delta n$=0.0873; $\Delta \epsilon$=−7.7

The following compounds of the formula

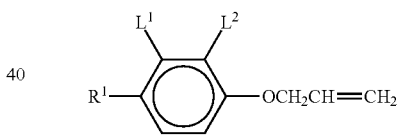

are prepared analogously:

| $R^1$ | $L^1$ | $L^2$ |
|---|---|---|
| $C_3H_7O$ | F | F |
| $C_3H_7O$ | F | Cl |
| $C_3H_7O$ | Cl | F |
| $C_4H_9O$ | F | F |
| $C_4H_9O$ | F | Cl |
| $C_4H_9O$ | Cl | F |
| $C_5H_{11}O$ | F | F |
| $C_5H_{11}O$ | F | Cl |
| $C_5H_{11}O$ | Cl | F |
| $C_6H_{13}O$ | F | F |
| $C_6H_{13}O$ | F | Cl |
| $C_6H_{13}O$ | Cl | F |

Above and below, $V_0$ denotes the threshold voltage, capacitive [V] at 20° C.

$\Delta n$ denotes the optical anisotropy measured at 20° C. and 589 nm $\Delta \epsilon$ denotes the dielectric anisotropy at 20° C. and 1 kHz cl.p. denotes the clearing point [° C.]

$K_1$ denotes the elastic constant, "splay" deformation at 20° C. [pN]

$K_3$ denotes the elastic constant, "bend" deformation at 20° C. [pN]

$\gamma_1$ denotes the rotational viscosity measured at 20° C. [mPa·s], determined by the rotation method in a magnetic field LTS denotes the low-temperature stability (nematic phase), determined in test cells The display used for measurement of the threshold voltage has two plane-parallel outer plates at a separation of 20 μm and electrode layers with overlying alignment layers of SE-1211 (Nissan Chemicals) on the insides of the outer plates, which effect a homeotropic alignment of the liquid crystals.

All concentrations in this application relate to the corresponding mixture or mixture component, unless explicitly indicated otherwise. All physical properties are determined as described in "Merck Liquid Crystals, Physical Properties of Liquid Crystals", status November 1997, Merck KGaA, Germany, and apply for a temperature of 20° C., unless explicitly indicated otherwise.

MIXTURE EXAMPLES

Example M1

| | | | |
|---|---|---|---|
| CY-3-O2 | 16.00% | Clearing point [° C.]: | 80.5 |
| CCY-3-O2 | 7.00% | Δn [589 nm, 20° C.]: | 0.0950 |
| CCY-4-O2 | 3.00% | Δε [1 kHz, 20° C.]: | -2.8 |
| CPY-2-O2 | 8.00% | $\epsilon_\parallel$ [1 kHz, 20° C.]: | 3.4 |
| CPY-3-O2 | 10.00% | $\epsilon_\perp$ [1 kHz, 20° C.]: | 6.2 |
| CCH-34 | 6.00% | $K_3$ [pN, 20° C.]: | 14.9 |
| CCH-23 | 22.00% | $K_3/K_1$ [20° C.]: | 1.03 |
| CCP-3-3 | 7.00% | $\gamma_1$ [mPa · s, 20° C.]: | 104 |
| CCP-3-1 | 8.00% | $V_0$ [20° C., V]: | 2.45 |
| BCH-32 | 6.00% | | |
| PCH-301 | 3.00% | | |
| Y-2O-O4 | 4.00% | | |

Example M2

| | | | |
|---|---|---|---|
| CY-3-O2 | 13.00% | Clearing point [° C.]: | 80.5 |
| CCY-3-O2 | 7.00% | Δn [589 nm, 20° C.]: | 0.0932 |
| CCY-4-O2 | 3.00% | Δε [1 kHz, 20° C.]: | -2.9 |
| CPY-2-O2 | 8.00% | $\epsilon_\parallel$ [1 kHz, 20° C.]: | 3.6 |
| CPY-3-O2 | 10.00% | $\epsilon_\perp$ [1 kHz, 20° C.]: | 6.5 |
| CCH-34 | 6.00% | $K_3$ [pN, 20° C.]: | 14.8 |
| CCH-23 | 22.00% | $K_3/K_1$ [20° C.]: | 1.02 |
| CCP-3-3 | 9.00% | $\gamma_1$ [mPa · s, 20° C.]: | 103 |
| CCP-3-1 | 9.00% | $V_0$ [20° C., V]: | 2.40 |
| BCH-32 | 6.00% | | |
| Y-2O-O4 | 7.00% | | |

Example M3

| | | | |
|---|---|---|---|
| CY-3-O2 | 8.50% | Clearing point [° C.]: | 80.5 |
| CCY-3-O2 | 9.50% | Δn [589 nm, 20° C.]: | 0.0950 |
| CPY-2-O2 | 8.00% | Δε [1 kHz, 20° C.]: | -2.8 |
| CPY-3-O2 | 10.00% | $\epsilon_\parallel$ [1 kHz, 20° C.]: | 3.7 |
| CCH-34 | 6.00% | $\epsilon_\perp$ [1 kHz, 20° C.]: | 6.5 |
| CCH-23 | 21.00% | $K_3$ [pN, 20° C.]: | 14.7 |
| CCP-3-3 | 9.00% | $K_3/K_1$ [20° C.]: | 1.01 |
| CCP-3-1 | 11.00% | $\gamma_1$ [mPa · s, 20° C.]: | 98 |
| BCH-32 | 7.00% | $V_0$ [20° C., V]: | 2.43 |
| Y-2O-O4 | 10.00% | | |

Example M4

| | | | |
|---|---|---|---|
| CY-3-O2 | 3.50% | Clearing point [° C.]: | 74.5 |
| CCY-3-O2 | 5.00% | Δn [589 nm, 20° C.]: | 0.0943 |
| CLY-3-O2 | 7.00% | Δε [1 kHz, 20° C.]: | -2.6 |
| CPY-2-O2 | 9.00% | $\epsilon_\parallel$ [1 kHz, 20° C.]: | 3.6 |
| CPY-3-O2 | 10.00% | $\epsilon_\perp$ [1 kHz, 20° C.]: | 6.2 |
| PYP-2-3 | 3.00% | $K_3$ [pN, 20° C.]: | 14.5 |
| CC-3-V | 40.00% | $K_3/K_1$ [20° C.]: | 1.16 |
| CCP-V-1 | 14.00% | $\gamma_1$ [mPa · s, 20° C.]: | 68 |
| Y-2O-O4 | 8.50% | $V_0$ [20° C., V]: | 2.52 |

Example M5

| | | | |
|---|---|---|---|
| CY-3-O2 | 14.50% | Clearing point [° C.]: | 79.5 |
| CCY-3-O2 | 11.00% | Δn [589 nm, 20° C.]: | 0.0946 |
| CPY-2-O2 | 8.50% | Δε [1 kHz, 20° C.]: | -3.0 |
| CPY-3-O2 | 10.00% | $\epsilon_\parallel$ [1 kHz, 20° C.]: | 3.6 |
| CCH-34 | 5.00% | $\epsilon_\perp$ [1 kHz, 20° C.]: | 6.6 |
| CCH-23 | 22.00% | $K_3$ [pN, 20° C.]: | 14.7 |
| CCP-3-3 | 8.00% | $K_3/K_1$ [20° C.]: | 1.01 |
| CCP-3-1 | 8.00% | $\gamma_1$ [mPa · s, 20° C.]: | 109 |
| BCH-32 | 6.00% | $V_0$ [20° C., V]: | 2.33 |
| Y-4O-O5 | 7.00% | | |

Example M6

| | | | |
|---|---|---|---|
| CY-3-O2 | 11.00% | Clearing point [° C.]: | 79.5 |
| CCY-3-O2 | 11.00% | Δn [589 nm, 20° C.]: | 0.0941 |
| CCY-4-O2 | 4.00% | Δε [1 kHz, 20° C.]: | -3.0 |
| CPY-2-O2 | 2.00% | $\epsilon_\parallel$ [1 kHz, 20° C.]: | 3.8 |
| CPY-3-O2 | 11.00% | $\epsilon_\perp$ [1 kHz, 20° C.]: | 6.8 |
| CCH-34 | 6.00% | $K_3$ [pN, 20° C.]: | 14.8 |
| CCH-23 | 22.00% | $K_3/K_1$ [20° C.]: | 1.03 |
| CCP-3-3 | 6.00% | $\gamma_1$ [mPa · s, 20° C.]: | 102 |
| CCP-3-1 | 8.00% | $V_0$ [20° C., V]: | 2.34 |
| BCH-32 | 6.00% | | |
| Y-2O-O4 | 10.00% | | |
| CPGP-4-3 | 3.00% | | |

Example M7

| | | | |
|---|---|---|---|
| CY-3-O2 | 16.00% | Clearing point [° C.]: | 80.0 |
| CCY-3-O2 | 5.00% | Δn [589 nm, 20° C.]: | 0.0941 |
| CPY-2-O2 | 10.00% | Δε [1 kHz, 20° C.]: | -2.9 |
| CPY-3-O2 | 10.00% | $\epsilon_\parallel$ [1 kHz, 20° C.]: | 3.6 |
| CCH-34 | 6.00% | $\epsilon_\perp$ [1 kHz, 20° C.]: | 6.5 |
| CCH-23 | 22.00% | $K_3$ [pN, 20° C.]: | 14.5 |
| CCP-3-1 | 9.00% | $K_3/K_1$ [20° C.]: | 1.04 |
| BCH-32 | 7.00% | $\gamma_1$ [mPa · s, 20° C.]: | 96 |
| Y-2O-O4 | 7.00% | $V_0$ [20° C., V]: | 2.39 |
| CCVC-3-V | 8.00% | | |

Example M8

| | | | |
|---|---|---|---|
| CY-3-O2 | 6.00% | Clearing point [° C.]: | 76.0 |
| CCY-3-O2 | 9.00% | Δn [589 nm, 20° C.]: | 0.0964 |
| CLY-3-O2 | 9.00% | Δε [1 kHz, 20° C.]: | -3.1 |
| CPY-2-O2 | 10.00% | $\epsilon_\parallel$ [1 kHz, 20° C.]: | 3.7 |
| CPY-3-O2 | 10.00% | $\epsilon_\perp$ [1 kHz, 20° C.]: | 6.8 |

-continued

| | | | |
|---|---|---|---|
| PYP-2-3 | 2.00% | $K_3$ [pN, 20° C.]: | 14.8 |
| CC-3-V | 44.00% | $K_3/K_1$ [20° C.]: | 1.14 |
| Y-2O-O4 | 7.00% | $\gamma_1$ [mPa·s, 20° C.]: | 78 |
| CPGP-4-3 | 3.00% | $V_0$ [20° C., V]: | 2.32 |

Example M9

| | | | |
|---|---|---|---|
| CY-3-O2 | 13.00% | Clearing point [° C.]: | 79.5 |
| CCY-3-O2 | 9.00% | $\Delta n$ [589 nm, 20° C.]: | 0.0946 |
| CPY-2-O2 | 9.00% | $\Delta\epsilon$ [1 kHz, 20° C.]: | −2.8 |
| CPY-3-O2 | 10.00% | $\epsilon_\parallel$ [1 kHz, 20° C.]: | 3.7 |
| CCH-34 | 6.00% | $\epsilon_\perp$ [1 kHz, 20° C.]: | 6.5 |
| CCH-23 | 22.00% | $K_3$ [pN, 20° C.]: | 14.6 |
| CCP-3-3 | 9.00% | $K_3/K_1$ [20° C.]: | 1.02 |
| CCP-3-1 | 8.00% | $\gamma_1$ [mPa·s, 20° C.]: | 100 |
| BCH-32 | 7.00% | $V_0$ [20° C., V]: | 2.39 |
| Y-2O-O3 | 7.00% | | |

Example M10

| | | | |
|---|---|---|---|
| CY-3-O2 | 13.00% | Clearing point [° C.]: | 79.0 |
| CCY-3-O2 | 9.00% | $\Delta n$ [589 nm, 20° C.]: | 0.0943 |
| CPY-2-O2 | 9.00% | $\Delta\epsilon$ [1 kHz, 20° C.]: | −2.8 |
| CPY-3-O2 | 10.00% | $\epsilon_\parallel$ [1 kHz, 20° C.]: | 3.6 |
| CCH-34 | 6.00% | $\epsilon_\perp$ [1 kHz, 20° C.]: | 6.4 |
| CCH-23 | 22.00% | $K_3$ [pN, 20° C.]: | 14.3 |
| CCP-3-3 | 9.00% | $K_3/K_1$ [20° C.]: | 1.01 |
| CCP-3-1 | 8.00% | $\gamma_1$ [mPa·s, 20° C.]: | 101 |
| BCH-32 | 7.00% | $V_0$ [20° C., V]: | 2.39 |
| Y-3O-O3 | 7.00% | | |

Example M11

| | | | |
|---|---|---|---|
| CY-3-O2 | 4.00% | Clearing point [° C.]: | 74.5 |
| CCY-3-O2 | 9.00% | $\Delta n$ [589 nm, 20° C.]: | 0.0967 |
| CLY-3-O2 | 10.00% | $\Delta\epsilon$ [1 kHz, 20° C.]: | −3.0 |
| CPY-2-O2 | 10.00% | $\epsilon_\parallel$ [1 kHz, 20° C.]: | 3.8 |
| CPY-3-O2 | 10.00% | $\epsilon_\perp$ [1 kHz, 20° C.]: | 6.8 |
| PYP-2-3 | 5.00% | $K_3$ [pN, 20° C.]: | 14.3 |
| CC-3-V | 43.00% | $K_3/K_1$ [20° C.]: | 1.13 |
| CCP-V-1 | 2.00% | $\gamma_1$ [mPa·s, 20° C.]: | 85 |
| Y-3O-O3 | 7.00% | $V_0$ [20° C., V]: | 2.29 |

Example M12

| | | | |
|---|---|---|---|
| CY-3-O2 | 4.00% | Clearing point [° C.]: | 75.0 |
| CCY-3-O2 | 10.00% | $\Delta n$ [589 nm, 20° C.]: | 0.0958 |
| CLY-3-O2 | 10.00% | $\Delta\epsilon$ [1 kHz, 20° C.]: | −3.1 |
| CPY-2-O2 | 10.00% | $\epsilon_\parallel$ [1 kHz, 20° C.]: | 3.6 |
| CPY-3-O2 | 10.00% | $\epsilon_\perp$ [1 kHz, 20° C.]: | 6.7 |
| PYP-2-3 | 5.00% | $K_3$ [pN, 20° C.]: | 15.2 |
| CC-3-V | 44.00% | $K_3/K_1$ [20° C.]: | 1.12 |
| Y-3O-O5 | 7.00% | $\gamma_1$ [mPa·s, 20° C.]: | 77 |
| | | $V_0$ [20° C., V]: | 2.28 |

Example M13

| | | | |
|---|---|---|---|
| CY-3-O2 | 14.50% | Clearing point [° C.]: | 80.0 |
| CCY-3-O2 | 11.00% | $\Delta n$ [589 nm, 20° C.]: | 0.0952 |
| CPY-2-O2 | 8.50% | $\Delta\epsilon$ [1 kHz, 20° C.]: | −3.1 |
| CPY-3-O2 | 10.00% | $\epsilon_\parallel$ [1 kHz, 20° C.]: | 3.5 |
| CCH-34 | 5.00% | $\epsilon_\perp$ [1 kHz, 20° C.]: | 6.6 |
| CCH-23 | 22.00% | $K_3$ [pN, 20° C.]: | 15.1 |
| CCP-3-3 | 8.00% | $K_3/K_1$ [20° C.]: | 1.01 |
| CCP-3-1 | 8.00% | $\gamma_1$ [mPa·s, 20° C.]: | 111 |
| BCH-32 | 6.00% | $V_0$ [20° C., V]: | 2.35 |
| Y-4O-O6 | 7.00% | | |

Example M14

| | | | |
|---|---|---|---|
| CY-3-O2 | 15.00% | Clearing point [° C.]: | 80.0 |
| CCY-3-O2 | 11.00% | $\Delta n$ [589 nm, 20° C.]: | 0.0948 |
| CPY-2-O2 | 8.00% | $\Delta\epsilon$ [1 kHz, 20° C.]: | −3.0 |
| CPY-3-O2 | 10.00% | $\epsilon_\parallel$ [1 kHz, 20° C.]: | 3.4 |
| CCH-34 | 5.00% | $\epsilon_\perp$ [1 kHz, 20° C.]: | 6.4 |
| CCH-23 | 22.00% | $K_3$ [pN, 20° C.]: | 14.8 |
| CCP-3-3 | 8.00% | $K_3/K_1$ [20° C.]: | 1.00 |
| CCP-3-1 | 8.00% | $\gamma_1$ [mPa·s, 20° C.]: | 113 |
| BCH-32 | 6.00% | $V_0$ [20° C., V]: | 2.36 |
| Y-6O-O6 | 7.00% | LTS [bulk, −30° C.]: | >1000 h |

Example M15

| | | | |
|---|---|---|---|
| CCY-3-O2 | 10.00% | Clearing point [° C.]: | 61.0 |
| CLY-3-O2 | 10.00% | $\Delta n$ [589 nm, 20° C.]: | 0.0915 |
| CPY-2-O2 | 4.00% | $\Delta\epsilon$ [1 kHz, 20° C.]: | −3.1 |
| CPY-3-O2 | 10.00% | $\epsilon_\parallel$ [1 kHz, 20° C.]: | 4.0 |
| PYP-2-3 | 8.00% | $\epsilon_\perp$ [1 kHz, 20° C.]: | 7.1 |
| CC-3-V | 45.00% | $K_3$ [pN, 20° C.]: | 12.1 |
| Y-2O-O4 | 13.00% | $K_3/K_1$ [20° C.]: | 1.11 |
| | | $\gamma_1$ [mPa·s, 20° C.]: | 58 |
| | | $V_0$ [20° C., V]: | 2.10 |

Example M16

| | | | |
|---|---|---|---|
| CLY-3-O2 | 10.00% | Clearing point [° C.]: | 80.0 |
| CCY-3-O2 | 9.00% | $\Delta n$ [589 nm, 20° C.]: | 0.0948 |
| CPY-2-O2 | 6.00% | $\Delta\epsilon$ [1 kHz, 20° C.]: | −2.9 |
| CPY-3-O2 | 10.00% | $\epsilon_\parallel$ [1 kHz, 20° C.]: | 3.7 |
| CCH-34 | 3.00% | $\epsilon_\perp$ [1 kHz, 20° C.]: | 6.6 |
| CCH-23 | 30.00% | $K_3$ [pN, 20° C.]: | 14.4 |
| CCP-3-1 | 10.00% | $K_3/K_1$ [20° C.]: | 0.96 |
| CCP-3-3 | 2.00% | $\gamma_1$ [mPa·s, 20° C.]: | 94 |
| PYP-2-3 | 2.00% | $V_0$ [20° C., V]: | 2.36 |
| BCH-32 | 6.00% | | |
| Y-2O-O5 | 12.00% | | |

Example M17

| | | | |
|---|---|---|---|
| CY-3-O2 | 4.00% | Clearing point [° C.]: | 75.5 |
| CCY-3-O2 | 9.00% | $\Delta n$ [589 nm, 20° C.]: | 0.0972 |
| CLY-3-O2 | 10.00% | $\Delta\epsilon$ [1 kHz, 20° C.]: | −3.1 |
| CPY-2-O2 | 10.00% | $\epsilon_\parallel$ [1 kHz, 20° C.]: | 3.5 |

-continued

| | | | |
|---|---|---|---|
| CPY-3-O2 | 10.00% | $\epsilon_\perp$ [1 kHz, 20° C.]: | 6.6 |
| PYP-2-3 | 5.00% | $K_3$ [pN, 20° C.]: | 14.7 |
| CC-3-V | 43.50% | $K_3/K_1$ [20° C.]: | 1.11 |
| CCP-V-1 | 1.50% | $\gamma_1$ [mPa·s, 20° C.]: | 76 |
| Y-4O-O4 | 7.00% | $V_0$ [20° C., V]: | 2.32 |

Example M18

| | | | |
|---|---|---|---|
| CY-3-O2 | 14.00% | Clearing point [° C.]: | 79.5 |
| CCY-3-O2 | 11.00% | $\Delta n$ [589 nm, 20° C.]: | 0.0949 |
| CPY-2-O2 | 10.00% | $\Delta\epsilon$ [1 kHz, 20° C.]: | −3.0 |
| CPY-3-O2 | 10.00% | $\epsilon_\parallel$ [1 kHz, 20° C.]: | 3.7 |
| CCH-34 | 6.00% | $\epsilon_\perp$ [1 kHz, 20° C.]: | 6.7 |
| CCH-23 | 22.00% | $K_3$ [pN, 20° C.]: | 14.7 |
| CCP-3-3 | 6.50% | $K_3/K_1$ [20° C.]: | 1.03 |
| CCP-3-1 | 9.00% | $\gamma_1$ [mPa·s, 20° C.]: | 104 |
| BCH-32 | 5.00% | $V_0$ [20° C., V]: | 2.32 |
| Y-3O-O1V | 6.50% | | |

Example M19

| | | | |
|---|---|---|---|
| CY-3-O2 | 4.00% | Clearing point [° C.]: | 76.0 |
| CCY-3-O2 | 9.00% | $\Delta n$ [589 nm, 20° C.]: | 0.0973 |
| CLY-3-O2 | 10.00% | $\Delta\epsilon$ [1 kHz, 20° C.]: | −3.0 |
| CPY-2-O2 | 10.00% | $\epsilon_\parallel$ [1 kHz, 20° C.]: | 3.7 |
| CPY-3-O2 | 10.00% | $\epsilon_\perp$ [1 kHz, 20° C.]: | 6.7 |
| PYP-2-3 | 5.00% | $K_3$ [pN, 20° C.]: | 14.7 |
| CC-3-V | 43.00% | $K_3/K_1$ [20° C.]: | 1.12 |
| CCP-V-1 | 2.00% | $\gamma_1$ [mPa·s, 20° C.]: | 76 |
| Y-2O-O5 | 7.00% | $V_0$ [20° C., V]: | 2.32 |

Example M20

| | | | |
|---|---|---|---|
| CY-3-O2 | 4.00% | Clearing point [° C.]: | 75.5 |
| CCY-3-O2 | 9.00% | $\Delta n$ [589 nm, 20° C.]: | 0.0970 |
| CLY-3-O2 | 10.00% | $\Delta\epsilon$ [1 kHz, 20° C.]: | −3.1 |
| CPY-2-O2 | 10.00% | $\epsilon_\parallel$ [1 kHz, 20° C.]: | 3.6 |
| CPY-3-O2 | 10.00% | $\epsilon_\perp$ [1 kHz, 20° C.]: | 6.7 |
| PYP-2-3 | 5.00% | $K_3$ [pN, 20° C.]: | 14.6 |
| CC-3-V | 43.00% | $K_3/K_1$ [20° C.]: | 1.12 |
| CCP-V-1 | 2.00% | $\gamma_1$ [mPa·s, 20° C.]: | 77 |
| Y-3O-O4 | 7.00% | | |

Example M21

| | | | |
|---|---|---|---|
| CY-3-O2 | 4.50% | Clearing point [° C.]: | 76.0 |
| CCY-3-O2 | 10.00% | $\Delta n$ [589 nm, 20° C.]: | 0.0963 |
| CLY-3-O2 | 10.00% | $\Delta\epsilon$ [1 kHz, 20° C.]: | −3.0 |
| CPY-2-O2 | 10.00% | $\epsilon_\parallel$ [1 kHz, 20° C.]: | 3.6 |
| CPY-3-O2 | 10.00% | $\epsilon_\perp$ [1 kHz, 20° C.]: | 6.6 |
| PYP-2-3 | 5.00% | $K_3$ [pN, 20° C.]: | 14.5 |
| CC-3-V | 44.00% | $K_3/K_1$ [20° C.]: | 1.10 |
| Y-5O-O5 | 6.50% | $\gamma_1$ [mPa·s, 20° C.]: | 79 |
| | | $V_0$ [20° C., V]: | 2.32 |

Example M22

| | | | |
|---|---|---|---|
| CLY-3-O2 | 10.00% | Clearing point [° C.]: | 80.5 |
| CCY-3-O2 | 9.00% | $\Delta n$ [589 nm, 20° C.]: | 0.0949 |
| CPY-2-O2 | 6.00% | $\Delta\epsilon$ [1 kHz, 20° C.]: | −2.9 |
| CPY-3-O2 | 10.00% | $\epsilon_\parallel$ [1 kHz, 20° C.]: | 3.6 |
| CCH-34 | 3.00% | $\epsilon_\perp$ [1 kHz, 20° C.]: | 6.5 |
| CCH-23 | 30.00% | $K_3$ [pN, 20° C.]: | 14.8 |
| CCP-3-1 | 10.00% | $K_3/K_1$ [20° C.]: | 0.95 |
| CCP-3-3 | 2.00% | $\gamma_1$ [mPa·s, 20° C.]: | 95 |
| PYP-2-3 | 2.00% | $V_0$ [20° C., V]: | 2.37 |
| BCH-32 | 6.00% | | |
| Y-4O-O4 | 12.00% | | |

Example M23

| | | | |
|---|---|---|---|
| CLY-3-O2 | 10.00% | Clearing point [° C.]: | 80.5 |
| CCY-3-O2 | 10.00% | $\Delta n$ [589 nm, 20° C.]: | 0.0931 |
| CPY-2-O2 | 6.50% | $\Delta\epsilon$ [1 kHz, 20° C.]: | −3.1 |
| CPY-3-O2 | 10.00% | $\epsilon_\parallel$ [1 kHz, 20° C.]: | 3.6 |
| CCH-34 | 10.00% | $\epsilon_\perp$ [1 kHz, 20° C.]: | 6.7 |
| CCH-23 | 20.00% | $K_3$ [pN, 20° C.]: | 15.0 |
| CCP-3-1 | 10.00% | $K_3/K_1$ [20° C.]: | 0.98 |
| CCP-3-3 | 3.00% | $\gamma_1$ [mPa·s, 20° C.]: | 98 |
| BCH-32 | 4.00% | $V_0$ [20° C., V]: | 2.33 |
| Y-4O-O4 | 12.50% | | |
| PCH-301 | 4.00% | | |

Example M24

| | | | |
|---|---|---|---|
| CLY-3-O2 | 10.00% | Clearing point [° C.]: | 79.0 |
| CCY-3-O2 | 10.00% | $\Delta n$ [589 nm, 20° C.]: | 0.0932 |
| CPY-2-O2 | 4.00% | $\Delta\epsilon$ [1 kHz, 20° C.]: | −3.0 |
| CPY-3-O2 | 10.00% | $\epsilon_\parallel$ [1 kHz, 20° C.]: | 3.6 |
| CCH-23 | 30.00% | $\epsilon_\perp$ [1 kHz, 20° C.]: | 6.6 |
| CCP-3-1 | 10.00% | $K_3$ [pN, 20° C.]: | 15.1 |
| CCP-3-3 | 4.00% | $K_3/K_1$ [20° C.]: | 1.02 |
| BCH-32 | 3.00% | $\gamma_1$ [mPa·s, 20° C.]: | 99 |
| Y-4O-O4 | 13.00% | $V_0$ [20° C., V]: | 2.36 |
| PCH-301 | 3.00% | | |
| CPYP-3-2 | 3.00% | | |

Example M25

| | | | |
|---|---|---|---|
| PCH-302 | 11.00% | Clearing point [° C.]: | 75.5 |
| CCH-34 | 18.00% | $\Delta n$ [589 nm, 20° C.]: | 0.0914 |
| CCH-25 | 5.00% | $\Delta\epsilon$ [1 kHz, 20° C.]: | −2.7 |
| CCH-35 | 5.00% | $\gamma_1$ [mPa·s, 20° C.]: | 102 |
| CEY-3-O2 | 14.00% | | |
| CCP-3-1 | 9.00% | | |
| CCP-3-O1 | 5.00% | | |
| CPY-2-O2 | 6.00% | | |
| CCP-3-3 | 2.00% | | |
| CPY-3-O2 | 10.00% | | |
| CPY-5-O2 | 4.00% | | |
| CCY(F,Cl)-3-O2 | 4.00% | | |
| Y-4O-O4 | 7.00% | | |

Example M26

| | | | |
|---|---|---|---|
| CY-3-O2 | 7.00% | Clearing point [° C.]: | 84.0 |
| CCY-3-O2 | 12.00% | Δn [589 nm, 20° C.]: | 0.1170 |
| CPY-2-O2 | 8.00% | Δε [1 kHz, 20° C.]: | −2.5 |
| CPY-3-O2 | 11.00% | γ₁ [mPa · s, 20° C.]: | 102 |
| CCH-34 | 6.00% | | |
| CCH-23 | 22.00% | | |
| CCP-3-3 | 10.00% | | |
| CCP-3-1 | 10.00% | | |
| BCH-32 | 2.00% | | |
| PCH-301 | 5.00% | | |
| Y-4O-O4 | 4.00% | | |
| Y-2O-O5 | 3.00% | | |

Example M27

| | | | |
|---|---|---|---|
| CCY-3-O2 | 10.00% | Clearing point [° C.]: | 95.0 |
| CCY-4-O2 | 7.00% | Δn [589 nm, 20° C.]: | 0.0996 |
| CCY-3-O3 | 6.00% | Δε [1 kHz, 20° C.]: | −3.2 |
| CPY-2-O2 | 6.00% | γ₁ [mPa · s, 20° C.]: | 127 |
| CPY-3-O2 | 9.00% | | |
| CCP-V-1 | 11.00% | | |
| CC-5-V | 10.00% | | |
| CC-3-V1 | 10.00% | | |
| CC-4-V | 10.00% | | |
| PYP-2-4 | 4.00% | | |
| CCH-35 | 5.00% | | |
| C-Naph-5-02 | 5.00% | | |
| Y-4O-O4 | 7.00% | | |

Example M28

| | | | |
|---|---|---|---|
| PY-3-O2 | 9.50% | Clearing point [° C.]: | 75.0 |
| CCY-3-O2 | 4.50% | Δn [589 nm, 20° C.]: | 0.1181 |
| CLY-3-O2 | 10.00% | Δε [1 kHz, 20° C.]: | −2.9 |
| CPY-3-O2 | 11.00% | ε∥ [1 kHz, 20° C.]: | 3.7 |
| CCH-34 | 8.00% | ε⊥ [1 kHz, 20° C.]: | 6.6 |
| CCH-23 | 22.00% | K₃ [pN, 20° C.]: | 13.7 |
| PYP-2-3 | 10.00% | K₃/K₁ [20° C.]: | 0.94 |
| PYP-2-4 | 5.00% | γ₁ [mPa · s, 20° C.]: | 101 |
| CCP-3-1 | 7.00% | V₀ [20° C., V]: | 2.28 |
| BCH-32 | 5.00% | | |
| Y-4O-O4 | 8.00% | | |

Example M29

| | | | |
|---|---|---|---|
| BCH-32 | 6.00% | Clearing point [° C.]: | 75.0 |
| CC-3-V | 30.00% | Δn [589 nm, 20° C.]: | 0.0922 |
| CC-3-V1 | 8.00% | Δε [1 kHz, 20° C.]: | −3.4 |
| CCY-3-O2 | 10.00% | γ₁ [mPa · s, 20° C.]: | 91 |
| CCY-3-O3 | 8.00% | | |
| CK-3-F | 3.00% | | |
| CK-4-F | 3.00% | | |
| CK-5-F | 2.00% | | |
| CPY-2-O2 | 8.00% | | |
| CPY-3-O2 | 10.00% | | |
| CY-3-O4 | 4.00% | | |
| Y-4O-O4 | 8.00% | | |

Example M30

| | | | |
|---|---|---|---|
| CC-3-V | 27.00% | Clearing point [° C.]: | 75.0 |
| CC-3-V1 | 8.00% | Δn [589 nm, 20° C.]: | 0.0929 |
| CCP-V-1 | 11.00% | Δε [1 kHz, 20° C.]: | −3.4 |
| CCY-3-O2 | 10.00% | γ₁ [mPa · s, 20° C.]: | 88 |
| CK-3-F | 4.00% | | |
| CK-4-F | 4.00% | | |
| CK-5-F | 4.00% | | |
| CLY-3-O2 | 8.00% | | |
| CPY-3-O2 | 9.00% | | |
| PYP-2-3 | 5.00% | | |
| Y-4O-O4 | 10.00% | | |

Example M31

| | | | |
|---|---|---|---|
| CCY-3-O2 | 10.00% | Clearing point [° C.]: | 79.0 |
| CCY-3-O3 | 9.00% | Δn [589 nm, 20° C.]: | 0.0911 |
| CCY-4-O2 | 9.00% | Δε [1 kHz, 20° C.]: | −3.7 |
| CPY-2-O2 | 10.00% | ε∥ [1 kHz, 20° C.]: | 3.8 |
| CPY-3-O2 | 10.00% | ε⊥ [1 kHz, 20° C.]: | 7.5 |
| PYP-2-3 | 3.00% | K₃ [pN, 20° C.]: | 14.0 |
| CCH-23 | 14.00% | K₃/K₁ [20° C.]: | 1.04 |
| CCH-34 | 8.00% | V₀ [20° C., V]: | 2.0 |
| CCH-35 | 7.00% | | |
| CCH-301 | 75.00% | | |
| PCH-301 | 3.00% | | |
| Y-4O-O4 | 10.00% | | |

For the preparation of a PS-VA mixture, 0.2% of the polymerisable compound of the formula

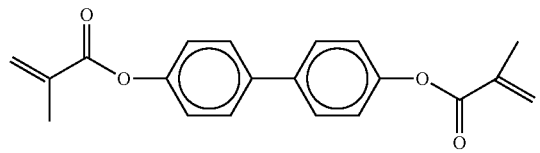

is added to 99.8% of the mixture from Example M31.

The PS-VA mixture is introduced into a cell with homeotropic alignment. After application of a voltage of 24 V, the cell is irradiated with UV light with a power of 100 mW/cm². The following tilt angles then arise:

| Irradiation duration | Tilt angle |
|---|---|
| 0 min | 89° |
| 1 min | 83° |
| 4 min | 66° |
| 6 min | 65° |

Example M32

| | | | |
|---|---|---|---|
| PY-3-O2 | 9.50% | Clearing point [° C.]: | 75.0 |
| CPTP-302FF | 7.00% | Δn [589 nm, 20° C.]: | 0.1194 |
| CLY-3-O2 | 10.00% | Δε [1 kHz, 20° C.]: | −2.9 |
| CPY-3-O2 | 11.00% | ε∥ [1 kHz, 20° C.]: | 3.6 |
| CCH-34 | 8.00% | ε⊥ [1 kHz, 20° C.]: | 6.5 |
| CCH-23 | 22.00% | K₃ [pN, 20° C.]: | 14.2 |
| PYP-2-3 | 8.00% | K₃/K₁ [20° C.]: | 1.02 |
| CCP-3-1 | 6.50% | γ₁ [mPa · s, 20° C.]: | 100 |

-continued

| | | | |
|---|---|---|---|
| BCH-32 | 5.00% | $V_0$ [20° C., V]: | 2.35 |
| Y-4O-O4 | 8.00% | | |
| PCH-301 | 5.00% | | |

Example M33

| | | | |
|---|---|---|---|
| CY-3-O2 | 3.50% | Clearing point [° C.]: | 79.0 |
| CCY-3-O2 | 8.00% | Δn [589 nm, 20° C.]: | 0.1063 |
| CPY-3-O2 | 8.00% | Δε [1 kHz, 20° C.]: | −3.0 |
| PYP-2-3 | 8.00% | $\epsilon_\parallel$ [1 kHz, 20° C.]: | 3.7 |
| PYP-2-4 | 3.00% | $\epsilon_\perp$ [1 kHz, 20° C.]: | 6.7 |
| CLY-3-O2 | 7.00% | $K_3$ [pN, 20° C.]: | 14.6 |
| CCY-3-O1 | 4.00% | $K_3/K_1$ [20° C.]: | 0.99 |
| CCP-3-3 | 5.00% | $\gamma_1$ [mPa · s, 20° C.]: | 106 |
| CCP-3-1 | 9.00% | $V_0$ [20° C., V]: | 2.32 |
| CCH-23 | 16.00% | LTS [Zelle, −30° C.]: | >1000 h |
| CCH-34 | 5.00% | LTS [bulk, −20° C.]: | >1000 h |
| CCH-35 | 3.00% | | |
| BCH-32 | 6.00% | | |
| PCH-301 | 2.00% | | |
| Y-4O-O4 | 12.50% | | |

Example M34

| | | | |
|---|---|---|---|
| CY-3-O2 | 3.00% | Clearing point [° C.]: | 80.0 |
| CCY-3-O2 | 8.00% | Δn [589 nm, 20° C.]: | 0.1052 |
| CPY-3-O2 | 8.00% | Δε [1 kHz, 20° C.]: | −3.0 |
| PYP-2-3 | 8.00% | $\epsilon_\parallel$ [1 kHz, 20° C.]: | 3.7 |
| PYP-2-4 | 3.00% | $\epsilon_\perp$ [1 kHz, 20° C.]: | 6.7 |
| CLY-3-O2 | 7.00% | $K_3$ [pN, 20° C.]: | 14.5 |
| CCY-3-O1 | 4.00% | $K_3/K_1$ [20° C.]: | 0.95 |
| CCP-3-3 | 5.00% | $\gamma_1$ [mPa · s, 20° C.]: | 105 |
| CCP-3-1 | 9.00% | $V_0$ [20° C., V]: | 2.32 |
| CCH-23 | 16.00% | LTS [bulk, −30° C.]: | >1000 h |
| CCH-34 | 8.00% | | |
| CCH-35 | 2.00% | | |
| BCH-32 | 6.00% | | |
| Y-4O-O4 | 13.00% | | |

Example M35

| | | | |
|---|---|---|---|
| CY-3-O2 | 3.00% | Clearing point [° C.]: | 73.0 |
| CCY-3-O2 | 9.00% | Δn [589 nm, 20° C.]: | 0.1050 |
| CLY-3-O2 | 9.00% | Δε [1 kHz, 20° C.]: | −3.3 |
| CCY-3-O1 | 3.00% | $\epsilon_\parallel$ [1 kHz, 20° C.]: | 3.8 |
| CPY-2-O2 | 2.00% | $\epsilon_\perp$ [1 kHz, 20° C.]: | 7.1 |
| CPY-3-O2 | 9.00% | $K_3$ [pN, 20° C.]: | 14.9 |
| PYP-2-3 | 8.00% | $K_3/K_1$ [20° C.]: | 1.12 |
| CC-3-V | 31.00% | $\gamma_1$ [mPa · s, 20° C.]: | 88 |
| CC-3-V1 | 10.00% | $V_0$ [20° C., V]: | 2.23 |
| Y-4O-O4 | 11.00% | | |
| PPYY-5-3 | 5.00% | | |

Example M36

| | | | |
|---|---|---|---|
| PY-3-O2 | 8.00% | Clearing point [° C.]: | 78.0 |
| CPTP-302FF | 7.00% | Δn [589 nm, 20° C.]: | 0.1286 |
| CLY-3-O2 | 8.00% | Δε [1 kHz, 20° C.]: | −2.9 |
| CPY-3-O2 | 11.00% | $\epsilon_\parallel$ [1 kHz, 20° C.]: | 3.6 |
| CCH-34 | 8.00% | $\epsilon_\perp$ [1 kHz, 20° C.]: | 6.6 |

-continued

| | | | |
|---|---|---|---|
| CCH-23 | 22.00% | $K_3$ [pN, 20° C.]: | 14.8 |
| PYP-2-3 | 5.50% | $K_3/K_1$ [20° C.]: | 1.01 |
| PTP-302FF | 6.00% | $\gamma_1$ [mPa · s, 20° C.]: | 107 |
| CCP-3-1 | 7.00% | $V_0$ [20° C., V]: | 2.39 |
| BCH-32 | 8.00% | | |
| Y-4O-O4 | 8.00% | | |
| PCH-301 | 1.50% | | |

Example M37

| | | | |
|---|---|---|---|
| CY-3-O2 | 4.00% | Clearing point [° C.]: | 75.0 |
| Y-4O-O4 | 6.00% | Δn [589 nm, 20° C.]: | 0.1002 |
| CCY-3-O3 | 11.00% | Δε [1 kHz, 20° C.]: | −3.1 |
| CCY-4-O2 | 12.00% | $\epsilon_\parallel$ [1 kHz, 20° C.]: | 3.6 |
| CPY-2-O2 | 5.00% | $K_3$ [pN, 20° C.]: | 12.7 |
| CPY-3-O2 | 10.00% | $K_3/K_1$ [20° C.]: | 0.98 |
| CCH-34 | 10.00% | $V_0$ [20° C., V]: | 2.15 |
| CCH-23 | 22.00% | | |
| PYP-2-3 | 12.00% | | |
| PCH-301 | 8.00% | | |

Example M38

For the preparation of a PS-VA mixture, 0.3% of the polymerisable compound of the formula

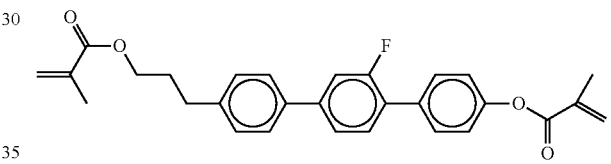

is added to 99.7% of the mixture from Example M37.

The PS-VA mixture is introduced into a cell with homeotropic alignment. After application of a voltage of 24 V, the cell is irradiated with UV light with a power of 100 mW/cm².

Example M39

For the preparation of a PS-VA mixture, 0.3% of the polymerisable compound of the formula

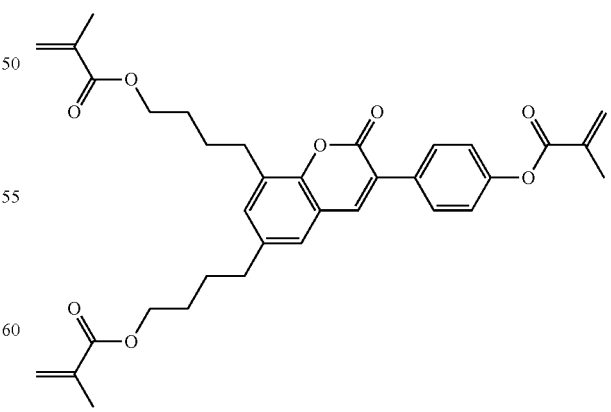

is added to 99.7% of the mixture from Example M37.

The PS-VA mixture is introduced into a cell with homeotropic alignment. After application of a voltage of 24 V, the cell is irradiated with UV light with a power of 100 mW/cm².

Example M40

For the preparation of a PS-VA mixture, 0.3% of the polymerisable compound of the formula

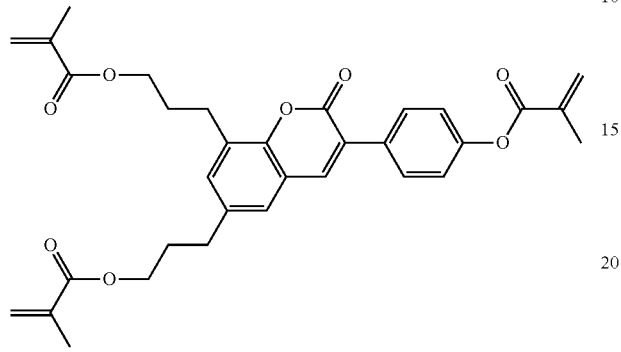

is added to 99.7% of the mixture from Example M37.

The PS-VA mixture is introduced into a cell with homeotropic alignment. After application of a voltage of 24 V, the cell is irradiated with UV light with a power of 100 mW/cm².

The invention claimed is:

1. A liquid-crystalline medium comprising a mixture of polar compounds, said mixture comprises at least one compound of the formula I,

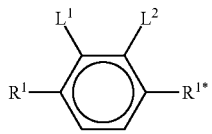
I in which
R$^1$ and R$^{1*}$ each, independently of one another, denote an alkyl or alkoxy Radical having 1 to 15 C atoms, wherein one or more CH$_2$ groups in these radicals is optionally replaced, independently of one another, by —C≡C—, —CF$_2$O—, —CH=CH—,

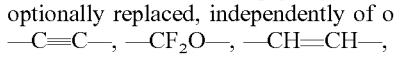

—O—, —CO—O—, —O—CO— in such a way that O atoms are not linked directly to one another, and wherein one or more H atoms may be replaced by halogen, and L$^1$ and L$^2$ each, independently of one another, denote F, Cl, CF$_3$ or CHF$_2$.

2. The liquid-crystalline medium according to claim 1, further comprising one or more compounds of formulae IIA, IIB and IIC,

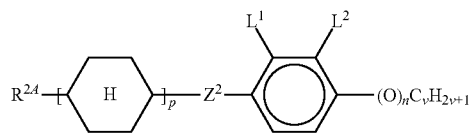
IIA

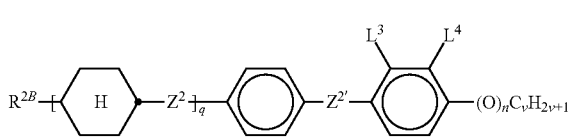
IB in which
R$^{2A}$, R$^{2B}$ and R$^{2C}$ each, independently of one another, denote H, an alkyl radical having up to 15 C atoms which is unsubstituted, monosubstituted by CN or CF$_3$ or at least monosubstituted by halogen, wherein one or more CH$_2$ groups in these radicals is optionally replaced by —O—, —S—,

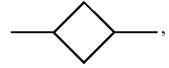

—CH=CH—, —C≡C—, —CF$_2$O—, —OCF$_2$—, —OC—O— or —O—CO— in such a way that O atoms are not linked directly to one another,
L$^{1-4}$ each, independently of one another, denote F or Cl,
Z$^2$ and Z$^{2'}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O—,
n denotes 0 or 1,
p denotes 1 or 2,
q denotes 0 or 1, and
v denotes 1 to 6.

3. The liquid-crystalline medium according to claim 1, further comprising one or more compounds of the formula III,

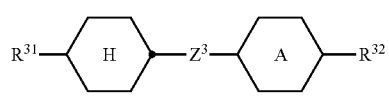
III in which
R$^{31}$ and R$^{32}$ each, independently of one another, denote a straight-chain alkyl, alkoxyalkyl or alkoxy radical having up to 12 C atoms, and

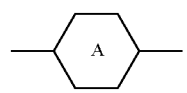

denotes

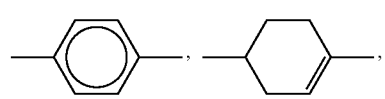

-continued

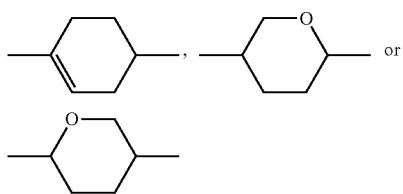

$Z^3$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —C$_4$H$_9$—, —CF=CF—.

4. The liquid-crystalline medium according to claim 1, comprising at least compound of the formulae I-1 to I-10,

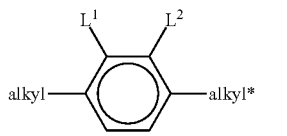 I-1

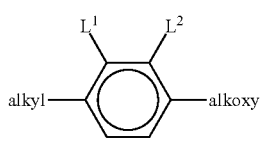 I-2

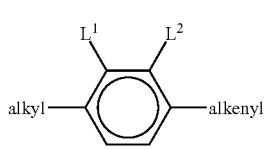 I-3

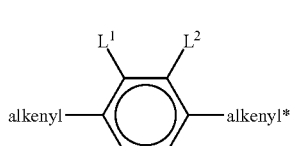 I-4

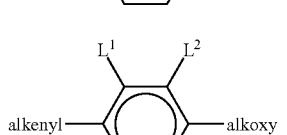 I-5

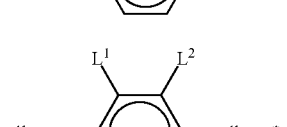 I-6

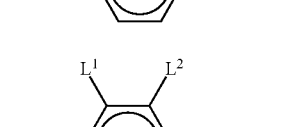 I-7

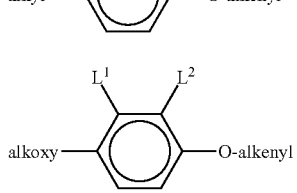 I-8

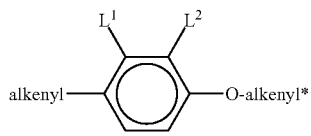 I-9

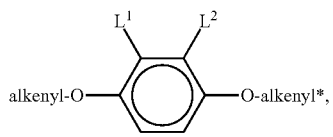 I-10 in which
alkyl and alkyl* each, independently of one another, denote a straight-chain alkyl radical having 1-6 C atoms,
alkenyl and alkenyl* each, independently of one another, denote a straight-chain alkenyl radical having 2-6 C atoms,
alkoxy and alkoxy* each, independently of one another, denote a straight-chain alkoxy radical having 1-6 C atoms, and
$L^1$ and $L^2$ each, independently of one another, denote F or Cl.

5. The liquid-crystalline medium according to claim 1, further comprising at least one compound of the formulae L-1 to L-11,

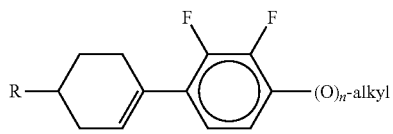 L-1

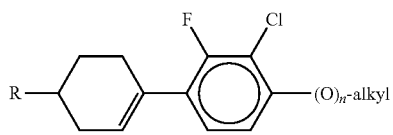 L-2

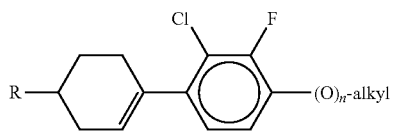 L-3

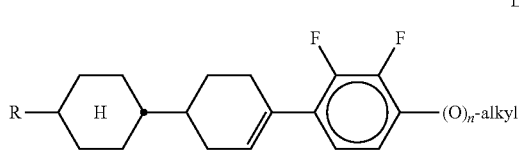 L-4

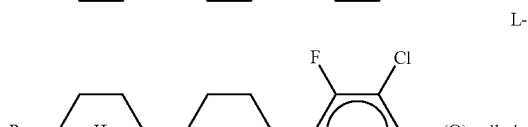 L-5

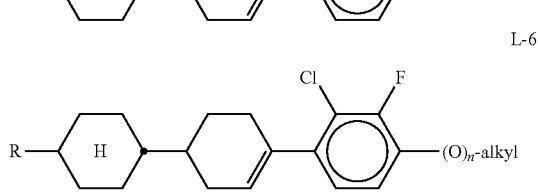 L-6

-continued

L-7
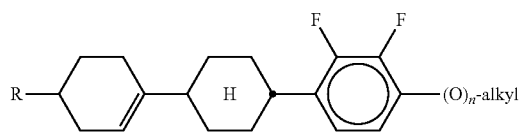

L-8
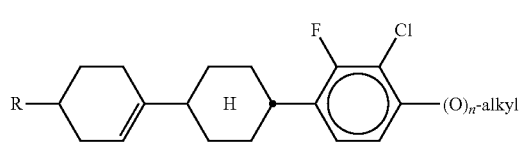

L-9
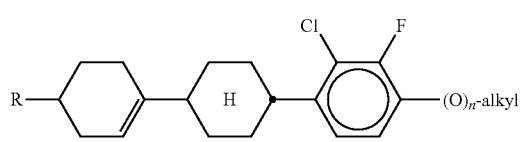

L-10
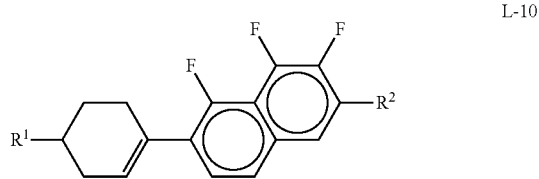

L-11
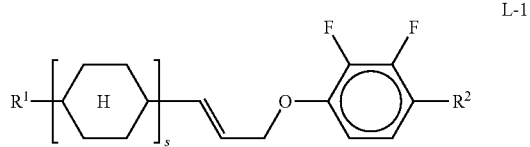

in which
R, R¹ and R² each, independently of one another, denote H, an alkyl radical having up to 15 C atoms which is unsubstituted, monosubstituted by CN or CF₃ or at least monosubstituted by halogen, wherein one or more CH₂ groups in these radicals is optionally replaced by —O—, —S—,

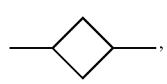

—C≡C—, —CF₂O—, —OCF₂—, —OC—O— or —O—CO— in such a way that O atoms are not linked directly to one another,
alkyl denotes an alkyl radical having 1-6 C atoms,
n denotes 0 or 1, and
s denotes 1 or 2.

6. The liquid-crystalline medium according to claim 1, further comprising one or more terphenyls of the formulae T-1 to T-21, T-1
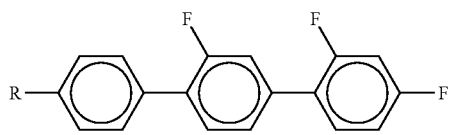

T-2
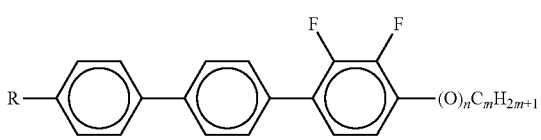

T-3
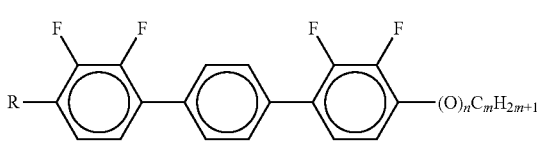

T-4
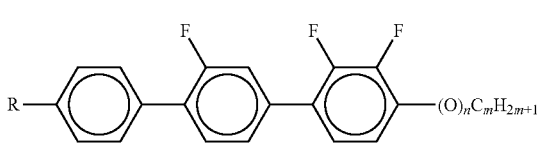

T-5
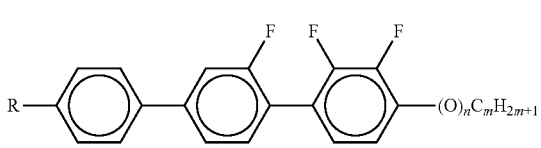

T-6
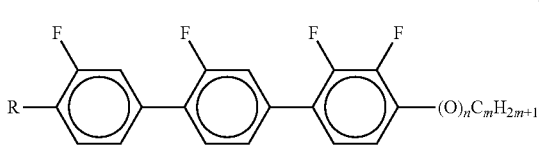

T-7
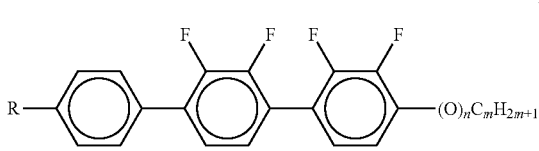

T-8
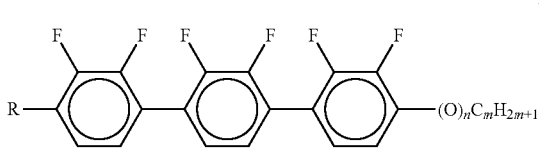

T-9
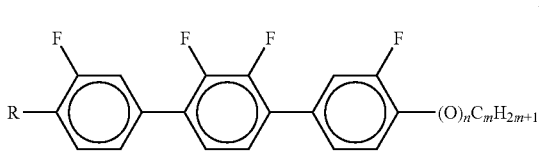

T-10
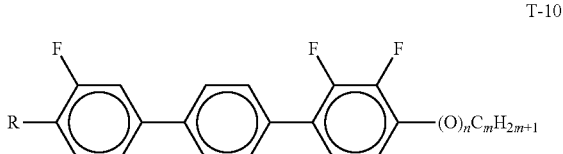

-continued
T-11
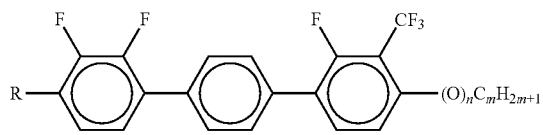
T-12
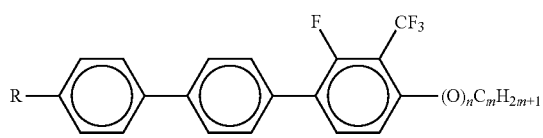
T-13
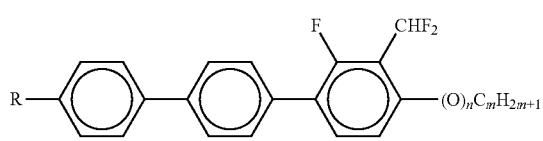
T-14
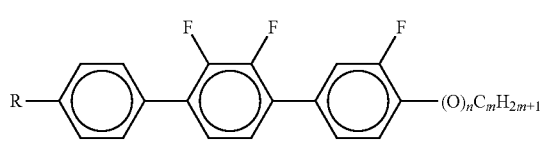
T-15
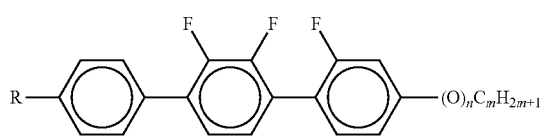
T-16
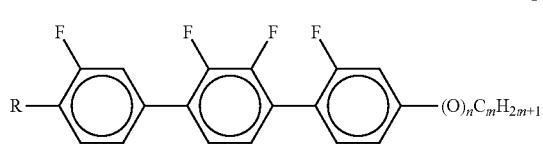
T-17
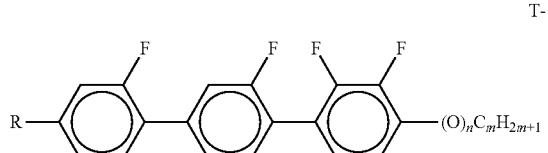
T-18
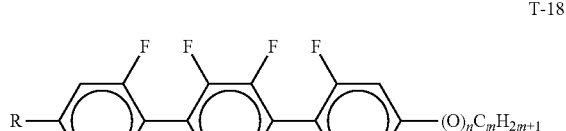
T-19
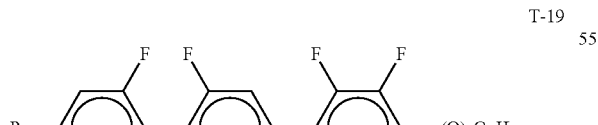
T-20
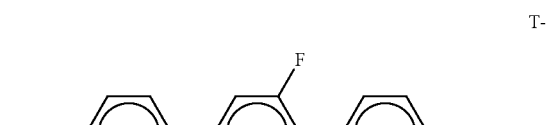
-continued
T-21
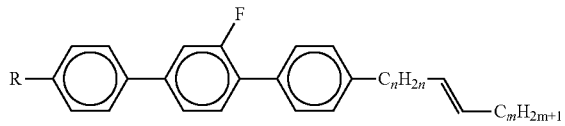
in which
R denotes a straight-chain alkyl or alkoxy radical having 1-7 C atoms,
x denotes 0-4,
n denotes 0 or 1,
m denotes 1-6.
7. The liquid-crystalline medium according to claim 1, further comprising one or more compounds of the formulae O-1 to O-16,
O-1
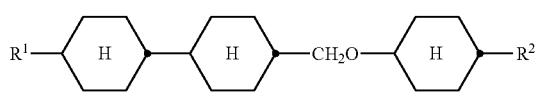
O-2
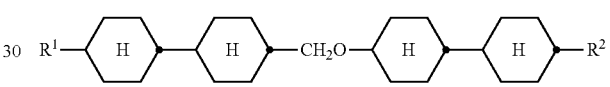
O-3
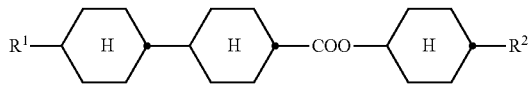
O-4
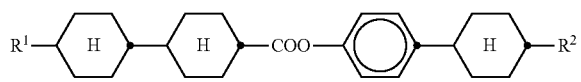
O-5
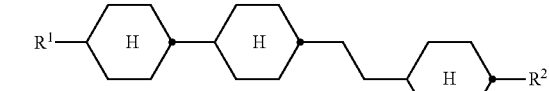
O-6
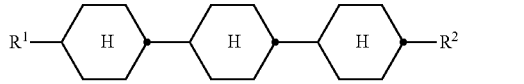
O-7
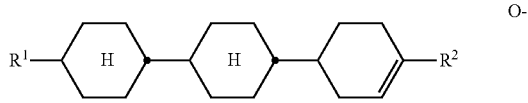
O-8
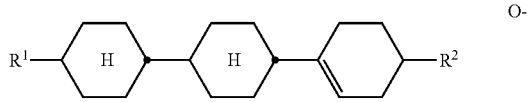
O-9
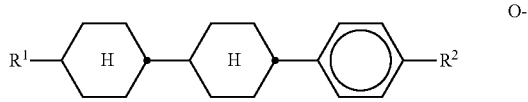

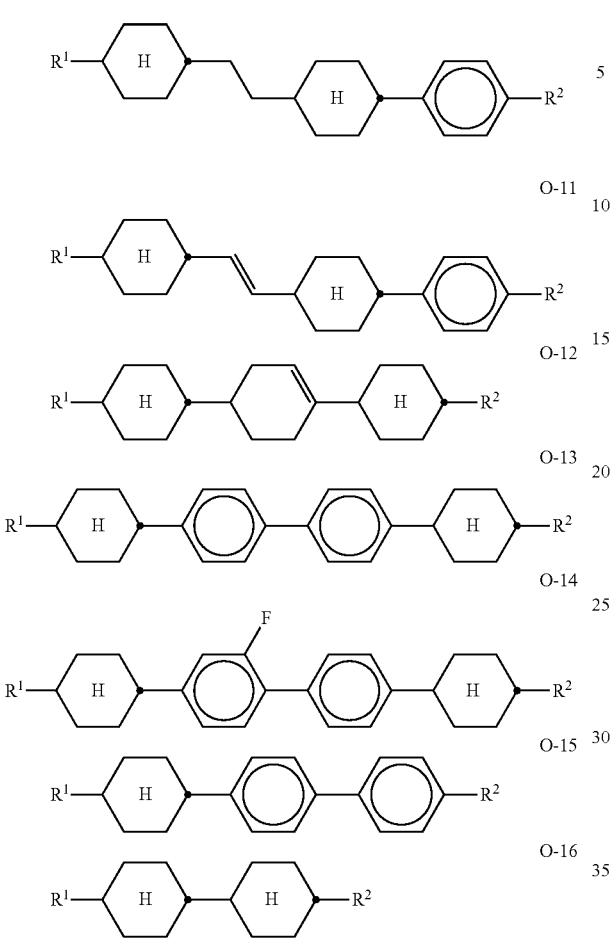

O-10

O-11

O-12

O-13

O-14

O-15

O-16 in which
R¹ and R² each, independently of one another, denote H, an alkyl radical having up to 15 C atoms which is unsubstituted, monosubstituted by CN or CF₃ or at least monosubstituted by halogen, wherein one or more CH₂ groups in these radicals is optionally replaced by —O—, —S—,

—C≡C—, —CF₂O—, —OCF₂—, —OC—O— or —O—CO— in such a way that O atoms are not linked directly to one another.

8. The liquid-crystalline medium according to claim 1, further comprising one or more indane compounds of the formula In,

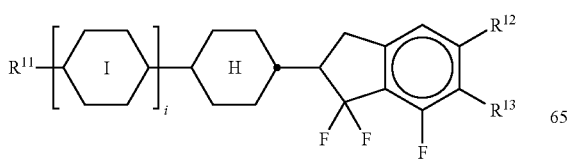

In in which
$R^{11}$, $R^{12}$, $R^{13}$ denote a straight-chain alkyl, alkoxy, alkoxyalkyl or alkenyl radical having 1-5 C atoms,
$R^{12}$ and $R^{13}$ can also denote halogen,

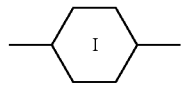

denotes

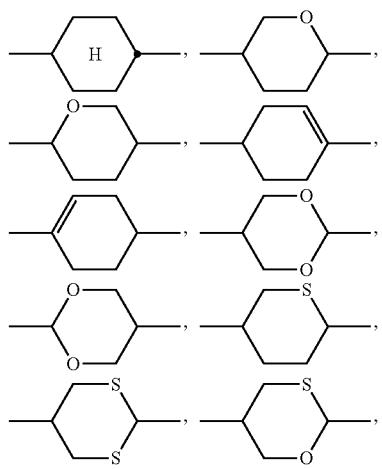

i denotes 0, 1 or 2.

9. The liquid-crystalline medium according to claim 1, having a proportion of compounds of the formula I in the mixture as a whole is ≥1% by weight.

10. A process for the preparation of a liquid-crystalline medium according to claim 1, comprising mixing at least one compound of the formula I with at least one further liquid-crystalline compound, and additives are optionally added.

11. An electro-optical display, comprising a liquid-crystalline medium according to claim 1.

12. An electro-optical display having active-matrix addressing, comprising, as dielectric, a liquid-crystalline medium according to claim 1.

13. An electro-optical display according to claim 12, that is a VA, PSA, PS-VA, PALC, FFS or IPS display.

14. A compound, which is one of the following compounds

I-6A-1

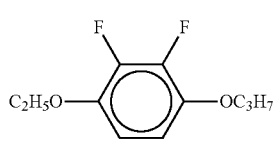

I-6A-2

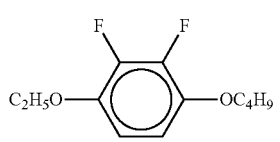

I-6A-3
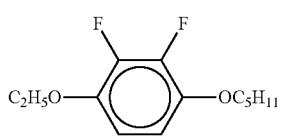
I-6A-4
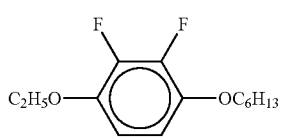
I-6A-5
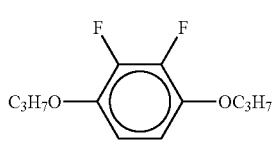
I-6A-6
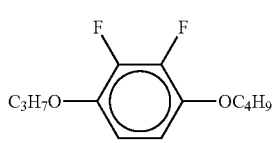
I-6A-7
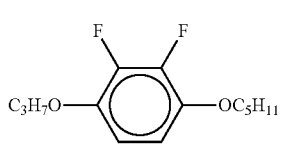
I-6A-8
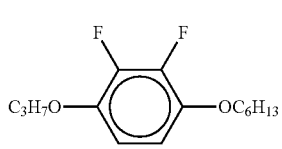
I-6A-9
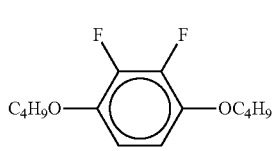
I-6A-10
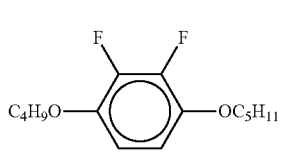
I-6A-11
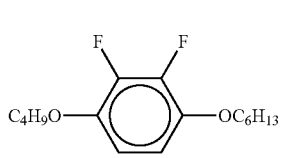
I-6A-12
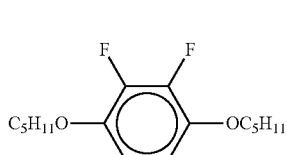
I-6A-13
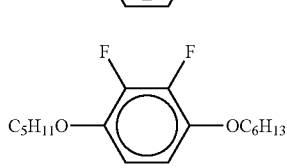
I-6A-14
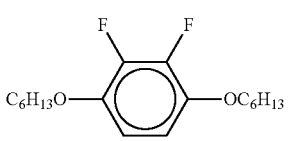
I-8A-1
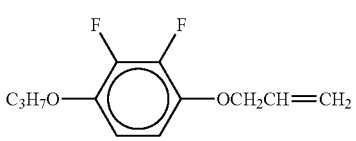
I-8A-2
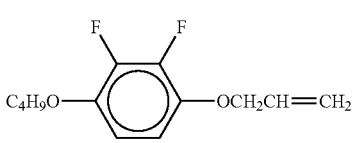
I-8A-3
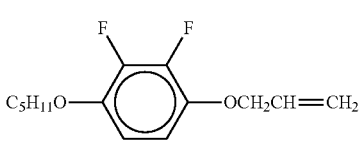
I-8A-4
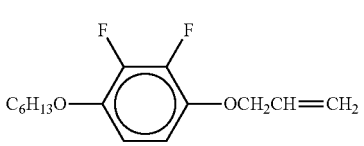
I-8A-5
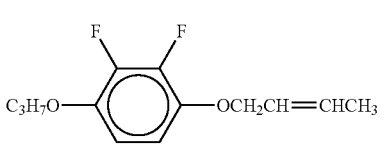
I-8A-6
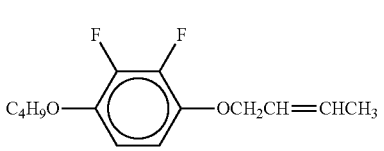
I-8A-7
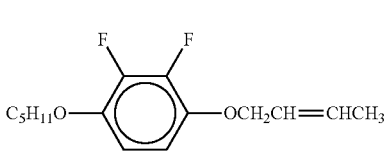
I-8A-8
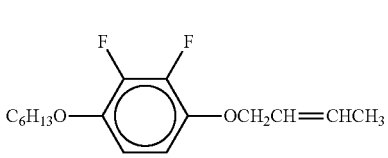
I-8A-9
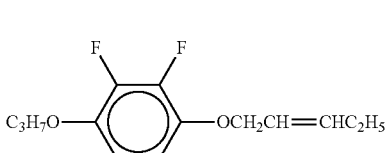
I-8A-10
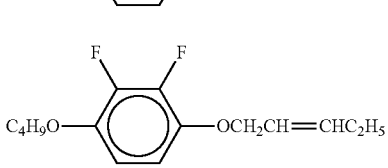

-continued
I-8A-11
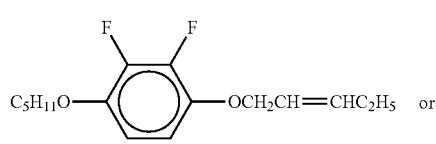 or
I-8A-12
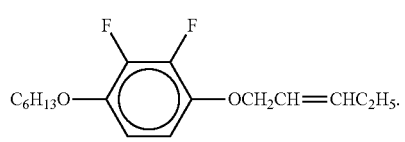
* * * * *